United States Patent [19]
Nagasaka et al.

[11] Patent Number: 5,856,669
[45] Date of Patent: Jan. 5, 1999

[54] LASER BEAM SCANNING OPTICAL APPARATUS HAVING MEANS FOR GENERATING MOIRE FRINGES

[75] Inventors: Yasushi Nagasaka, Gamagoori; Kenji Takeshita, Aichi-Ken; Hiroshi Hiraguchi; Jun Kohsaka, both of Toyokawa; Nobuo Kanai; Keiji Ogoh, both of Toyohashi, all of Japan

[73] Assignee: Minolta Co., Ltd., Osaka, Japan

[21] Appl. No.: 696,066

[22] Filed: Aug. 13, 1996

[30] Foreign Application Priority Data

Aug. 22, 1995 [JP] Japan ................................ 7-213756
Feb. 21, 1996 [JP] Japan ................................ 8-033595
Jul. 22, 1996 [JP] Japan ................................ 8-191713
Aug. 5, 1996 [JP] Japan ................................ 8-205813

[51] Int. Cl.$^6$ ..................................................... G02B 26/10
[52] U.S. Cl. .................. 250/235; 250/201.2; 250/237 G; 358/481; 358/494
[58] Field of Search .................................... 250/234, 235, 250/236, 237 G, 237 R, 201.2, 201.3, 201.4, 201.5, 201.6, 201.7, 201.8; 358/474, 475, 480, 481, 494, 496

[56] References Cited

U.S. PATENT DOCUMENTS

| | | | |
|---|---|---|---|
| 4,775,788 | 10/1988 | Harshberger, Jr. et al. | 250/237 G |
| 4,800,547 | 1/1989 | Kessels et al. | |
| 4,837,588 | 6/1989 | Imakawa et al. | 250/237 G |
| 4,850,673 | 7/1989 | Velzel et al. | 250/201.5 |
| 4,962,312 | 10/1990 | Mataura et al. | 250/23 G |
| 4,972,075 | 11/1990 | Hamada et al. | 250/201.5 |
| 4,990,771 | 2/1991 | Minoura et al. | 250/236 |
| 5,019,701 | 5/1991 | Yagoto et al. | |
| 5,122,658 | 6/1992 | Ando. | |
| 5,231,280 | 7/1993 | Imakawa. | |
| 5,241,174 | 8/1993 | Ando. | |
| 5,418,638 | 5/1995 | Hirasawa. | |

*Primary Examiner*—David C. Nelms
*Assistant Examiner*—John R. Lee
*Attorney, Agent, or Firm*—Burns, Doane, Swecker & Mathis, LLP

[57] ABSTRACT

A laser beam scanning optical apparatus which has Moire fringes generating elements which is located near a position optically equivalent to a scanning surface and modulates a laser beam emitted from a laser source to generate Moire fringes. The Moire fringes generating elements comprises, for example, a first filter which has spatial grating and a second filter which has spatial grating which slants slightly with respect to the spatial grating of the first filter, the first filter and the second filter being arranged upstream and downstream respectively in an optical path. The laser beam scanning optical apparatus further has a light receiving element for receiving the Moire fringes generated by the Moire fringes generating elements. Focusing means for correcting a position of an image point of the laser beam is driven in accordance with an output of the light receiving element. For example, the light receiving element is a photoelectric element with a plurality of light receiving surfaces, each of which generates an electric signal in accordance with the laser beam incident thereto, and from a phase difference between the electric signals, the position of the image point is detected.

36 Claims, 62 Drawing Sheets

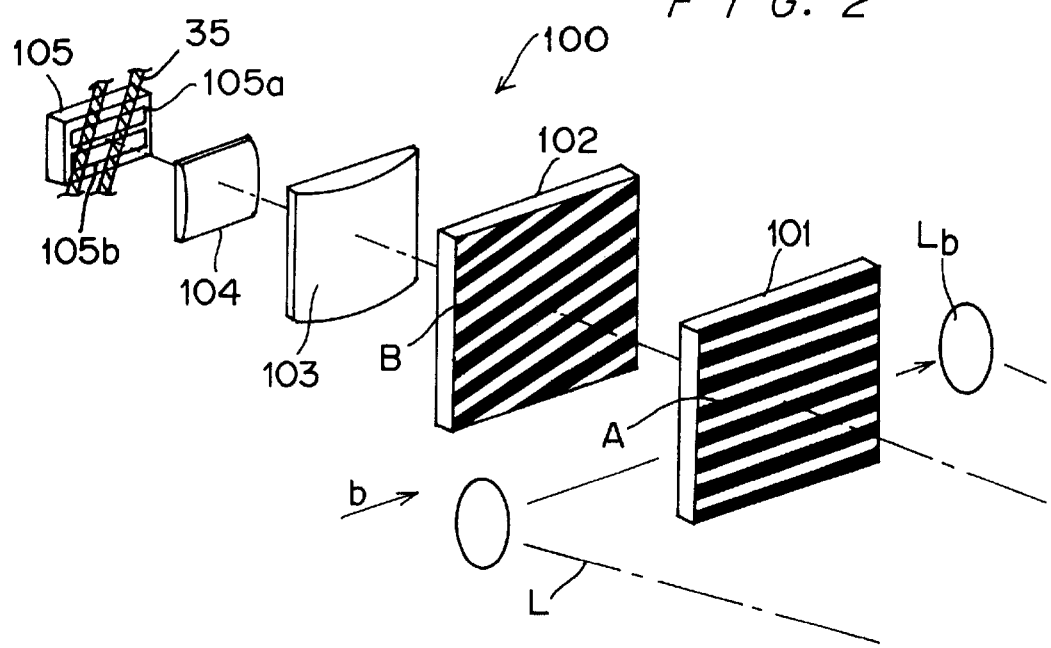
F I G. 2
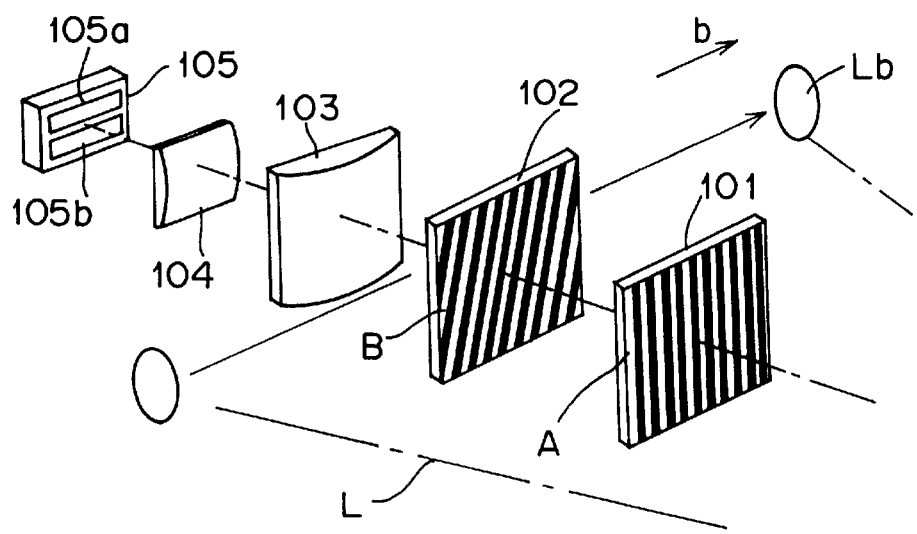
F I G. 3

F I G. 8
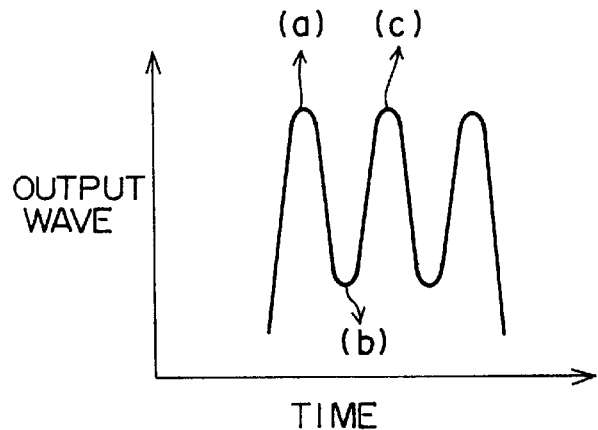
F I G. 9a    F I G. 9b    F I G. 9c
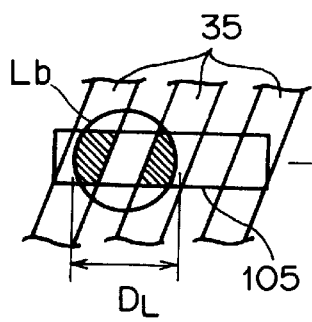 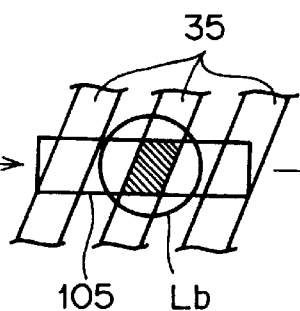 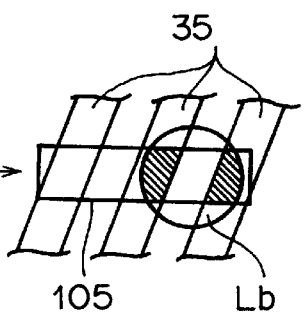
F I G. 10
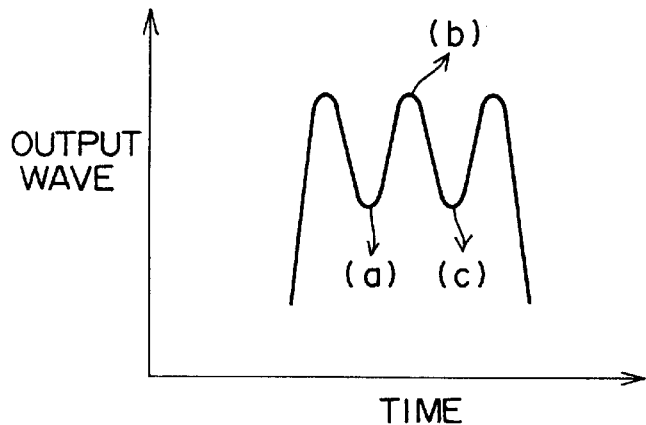

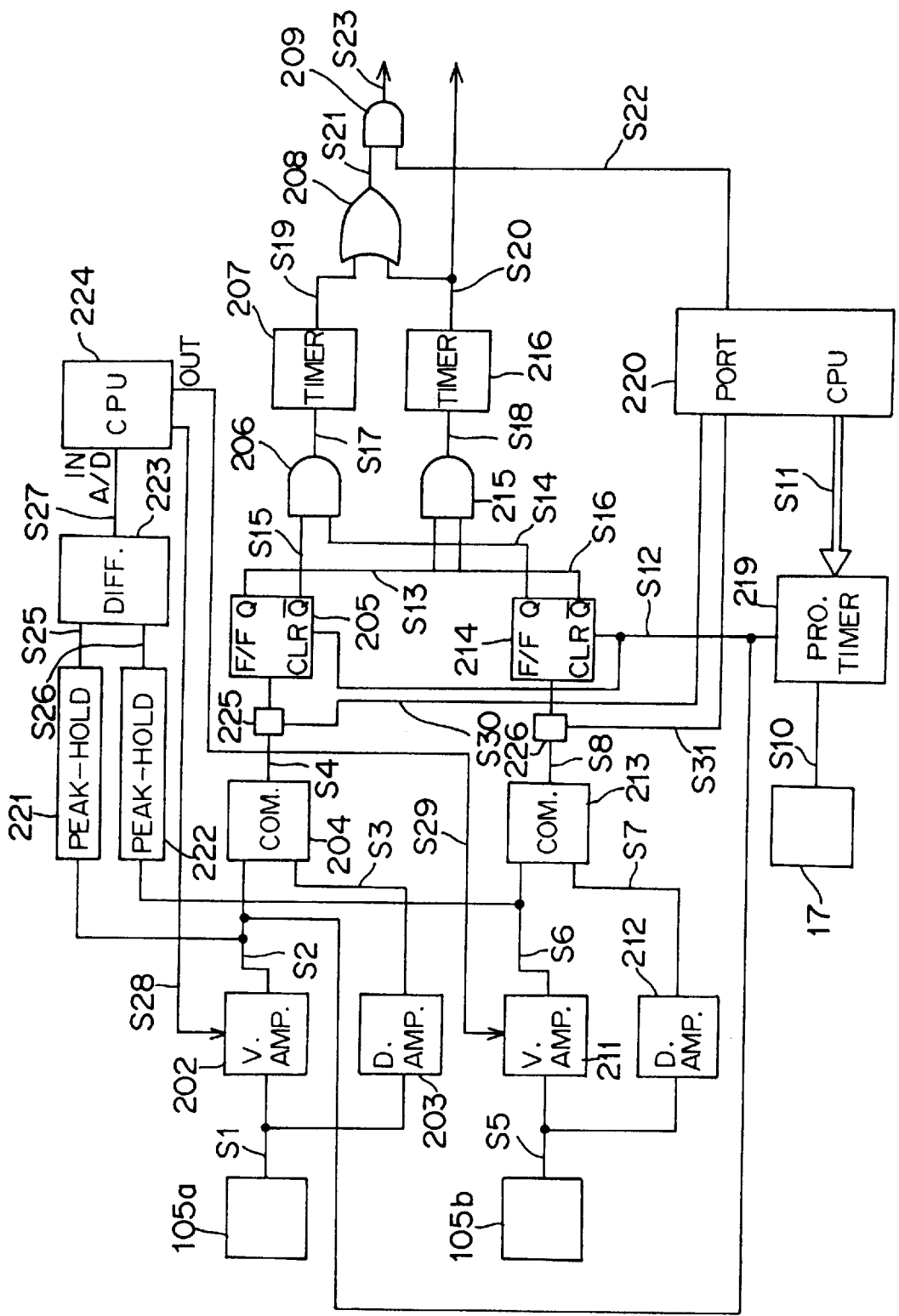
F I G. 15

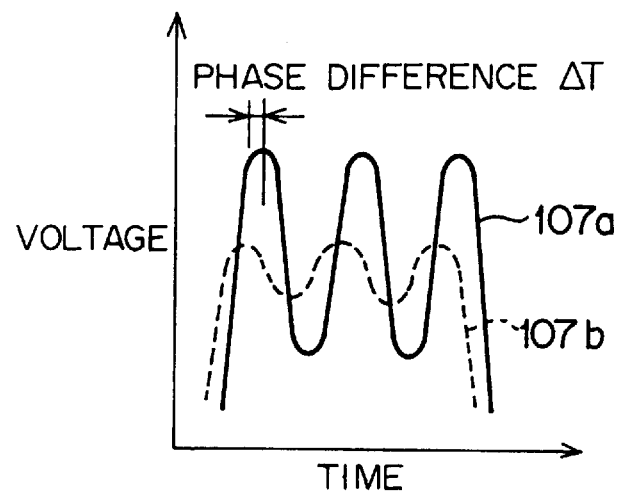
F I G. 18
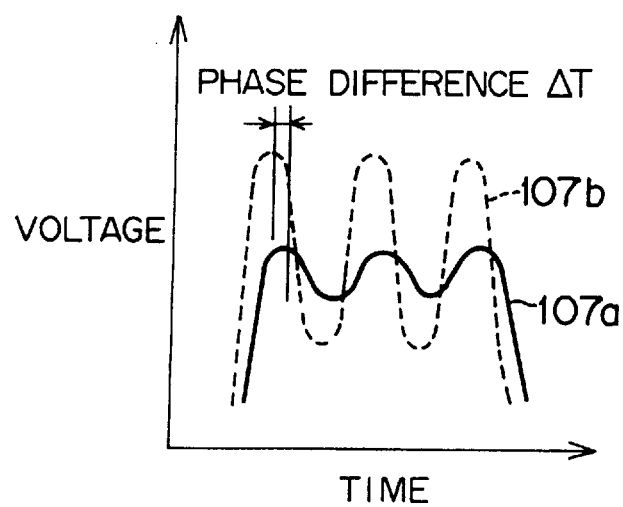
F I G. 19

F I G. 20
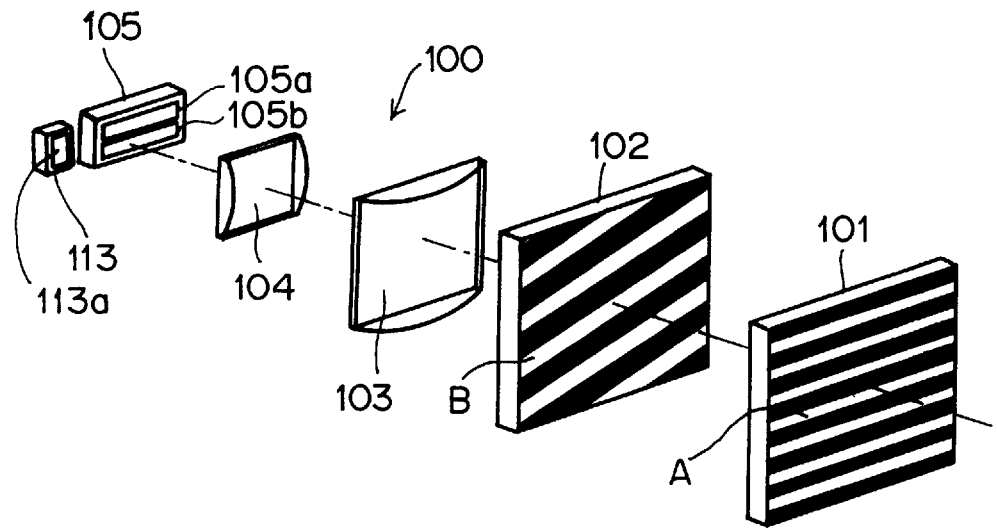
F I G. 21
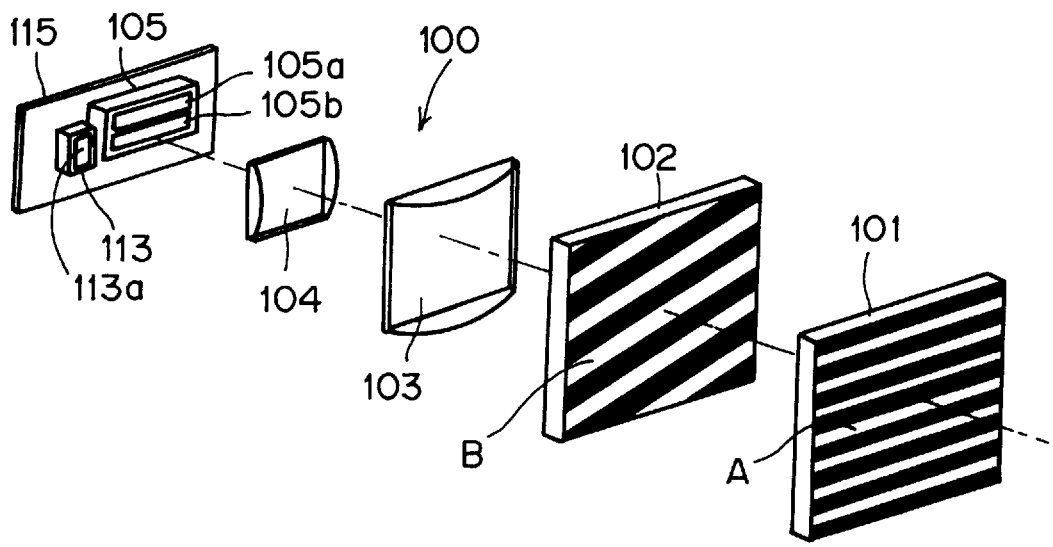

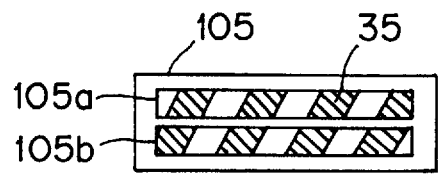
FIG. 35
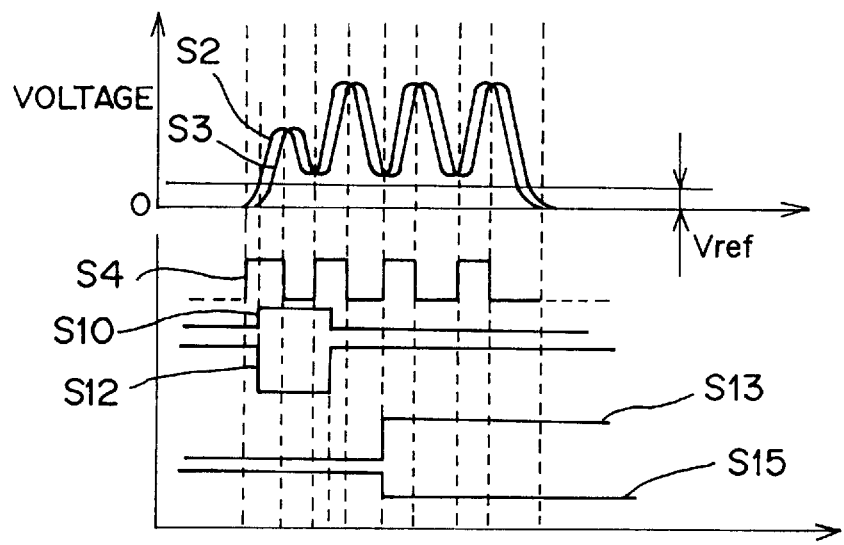
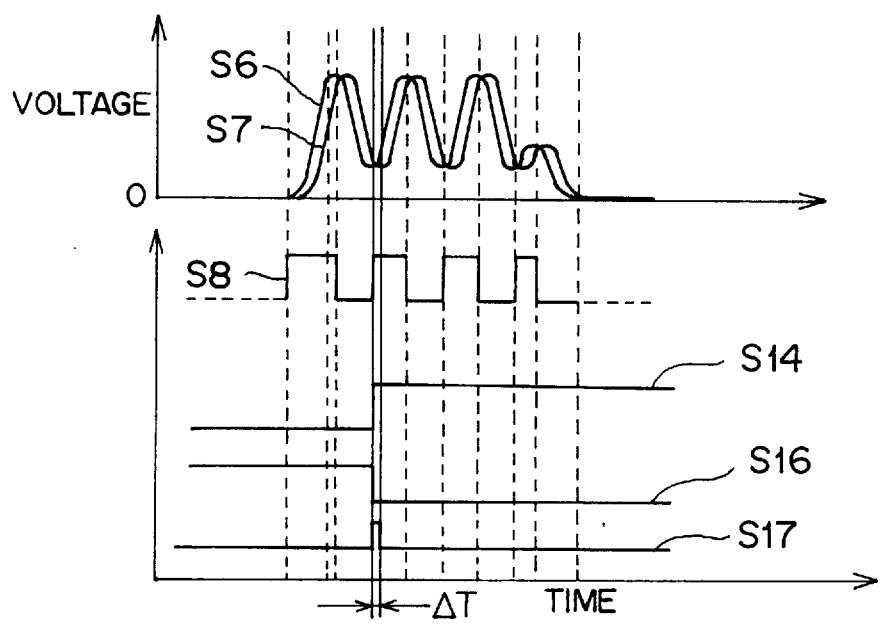

F I G. 36
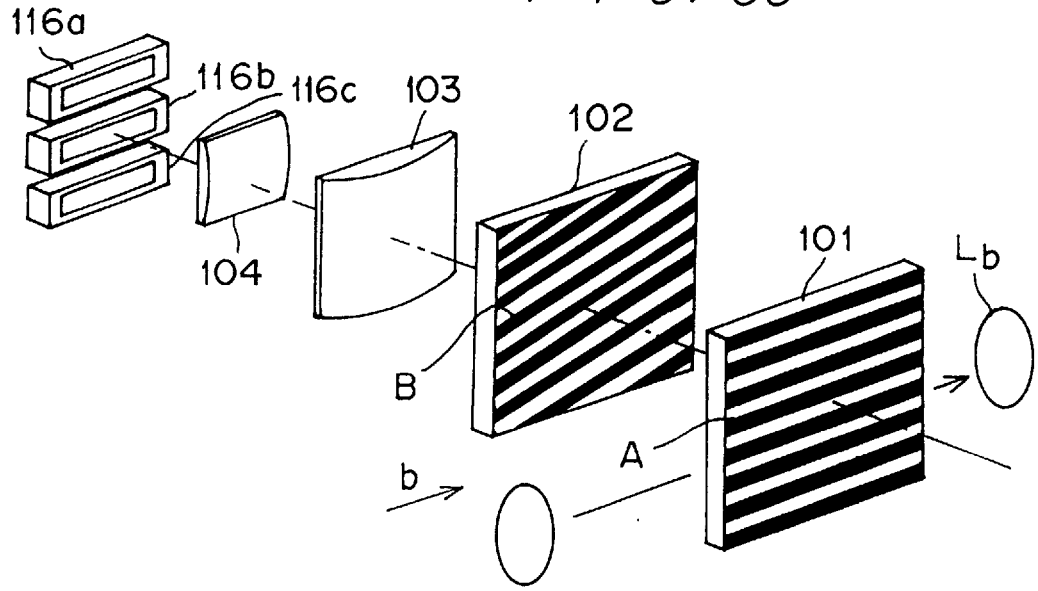
F I G. 37
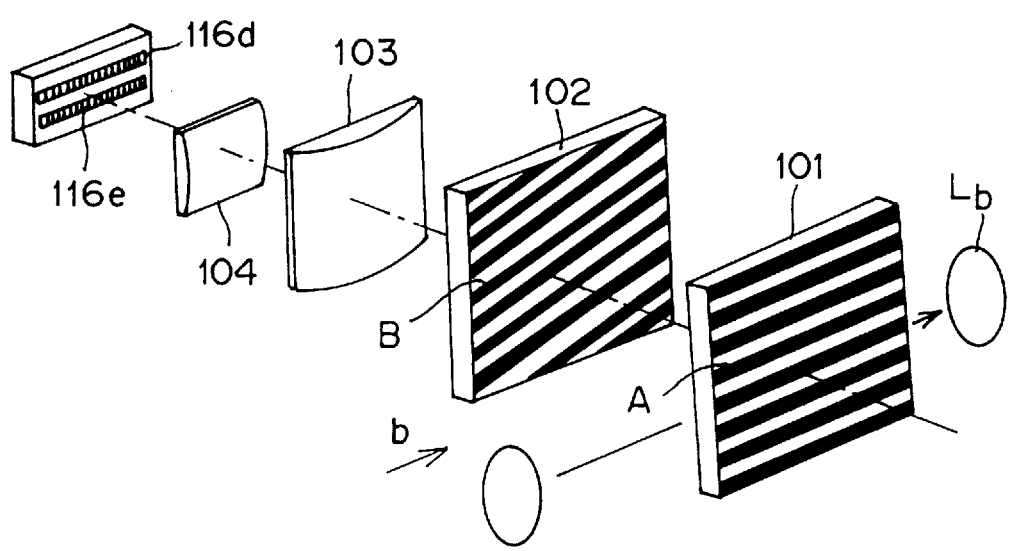

F / G. 42
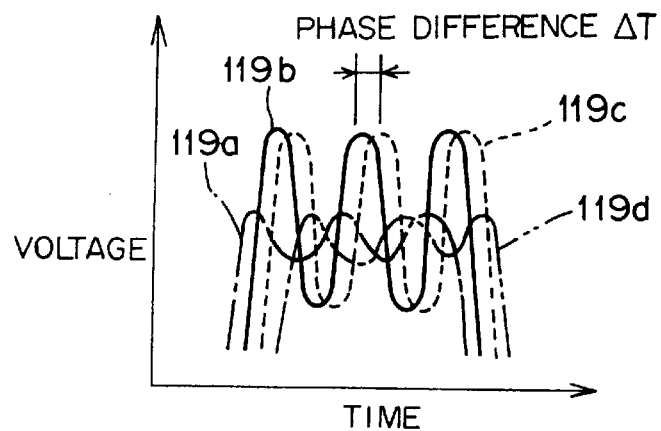
F / G. 43
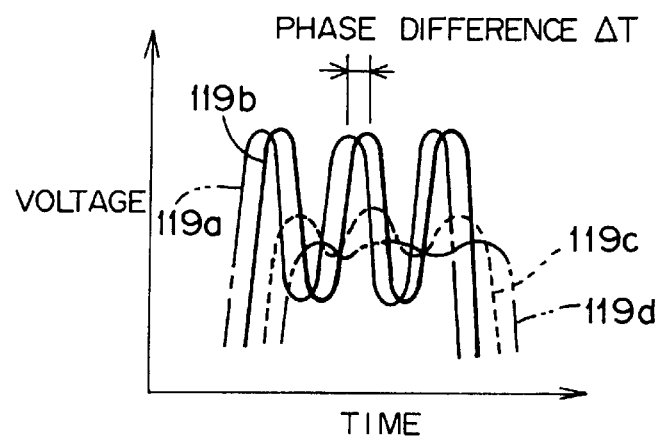
F / G. 44
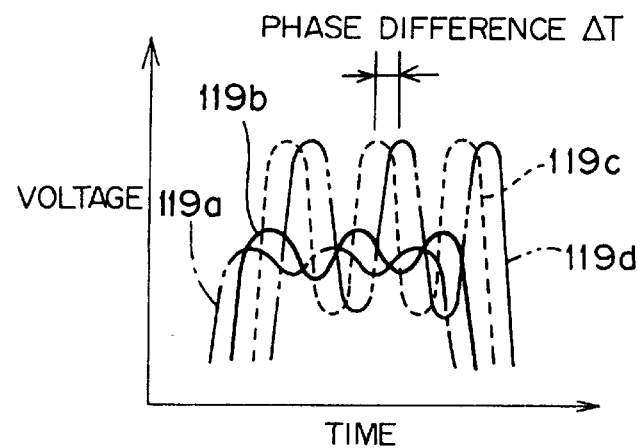

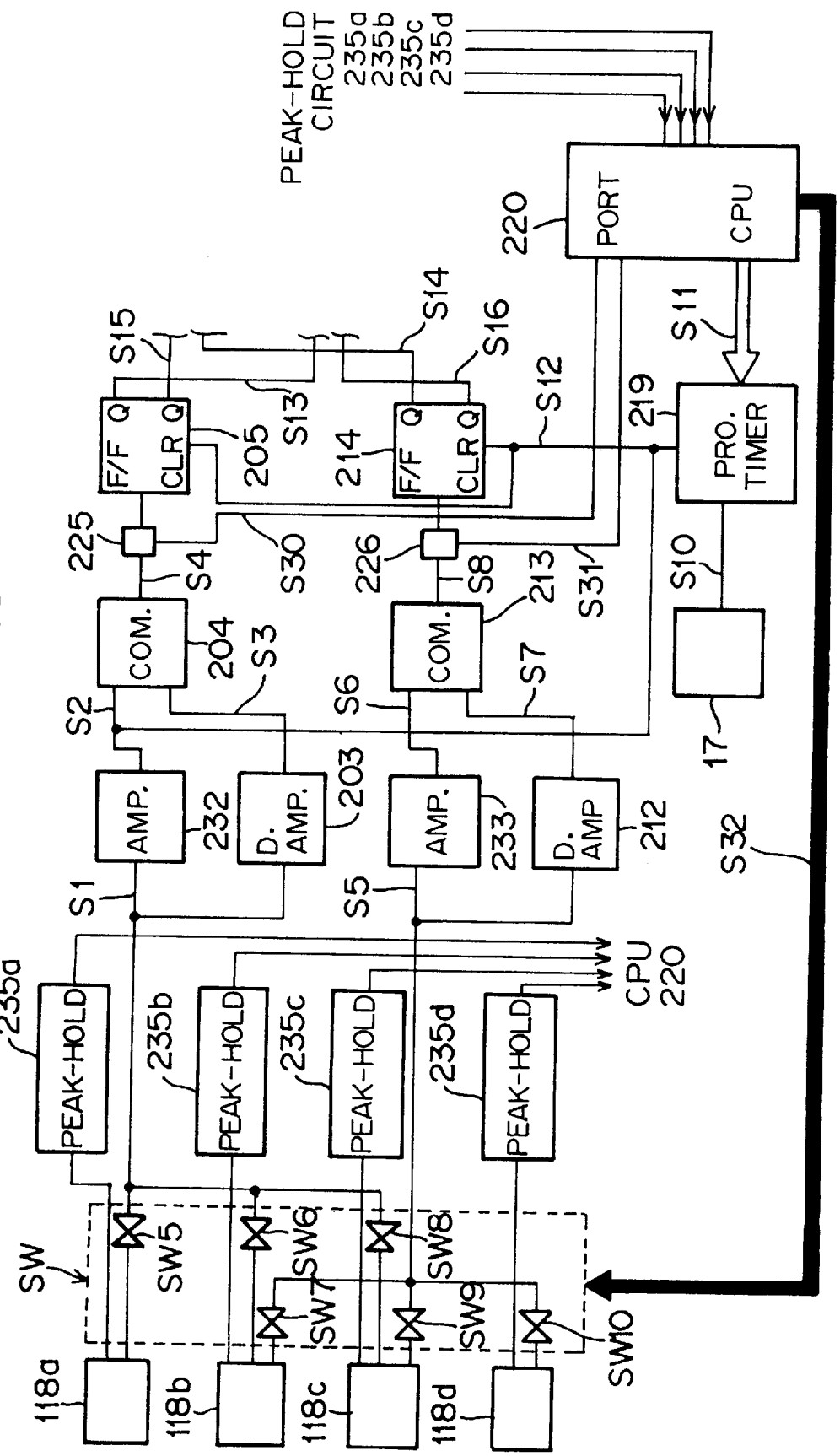
F I G. 45

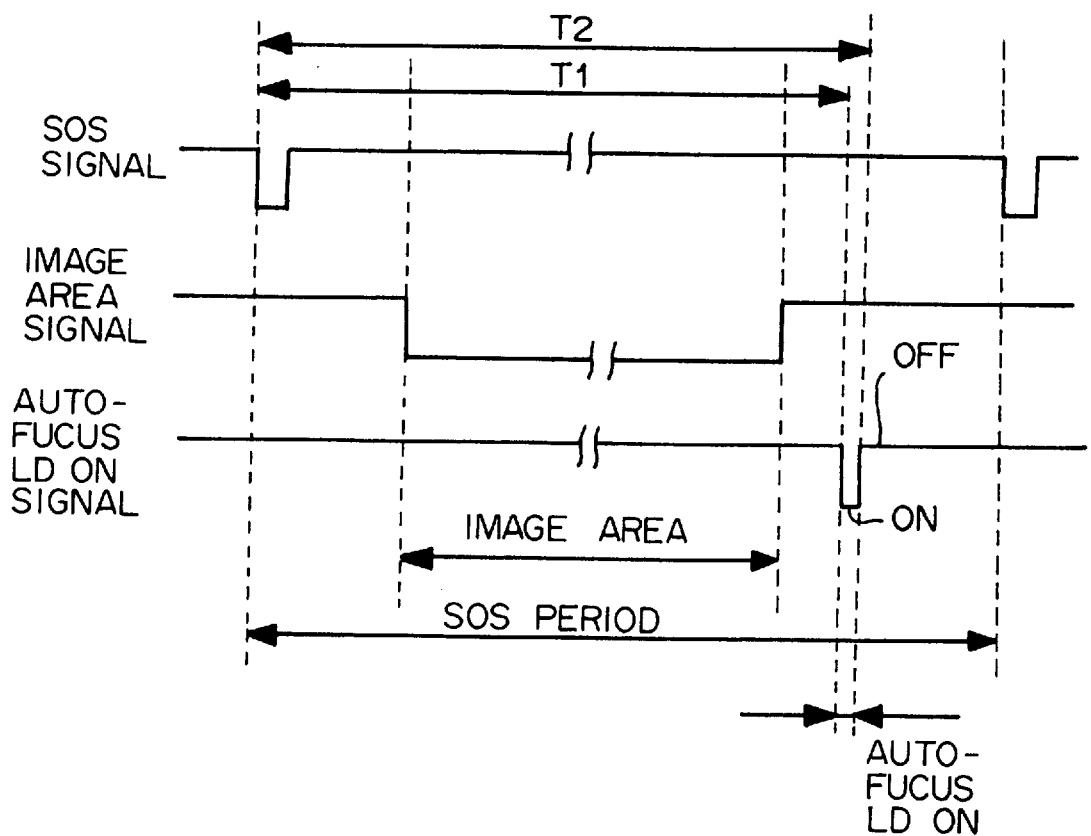
F I G. 50

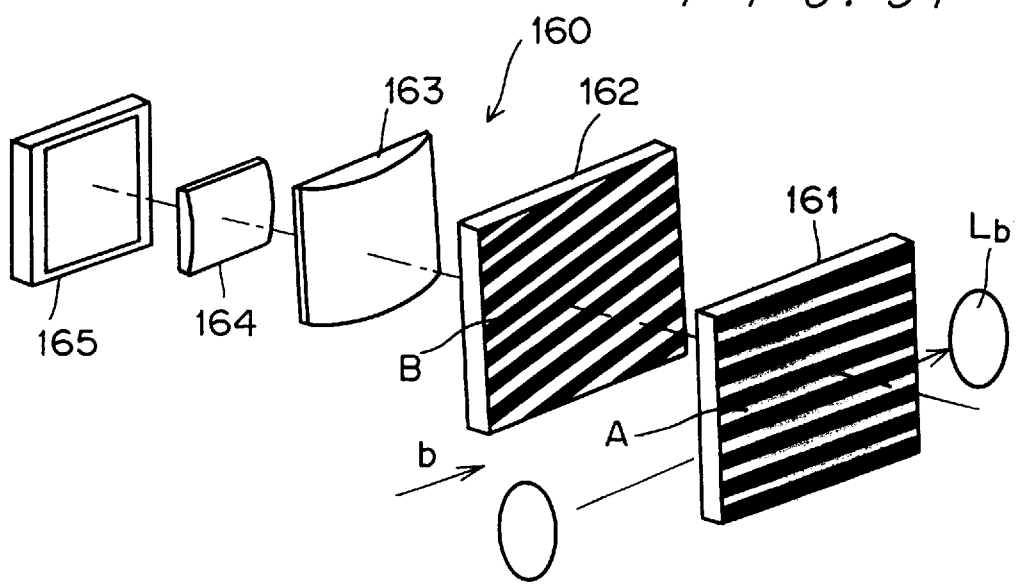
F / G. 51
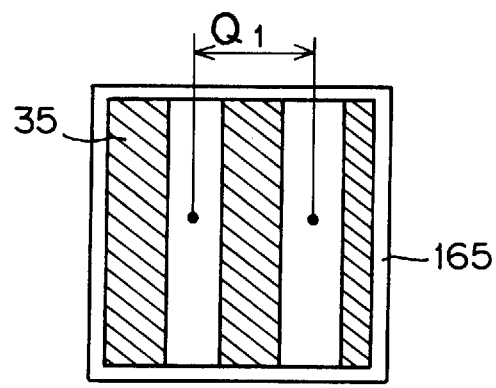
F / G. 52
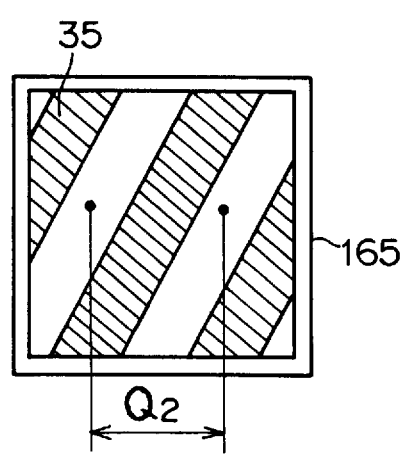
F / G. 53

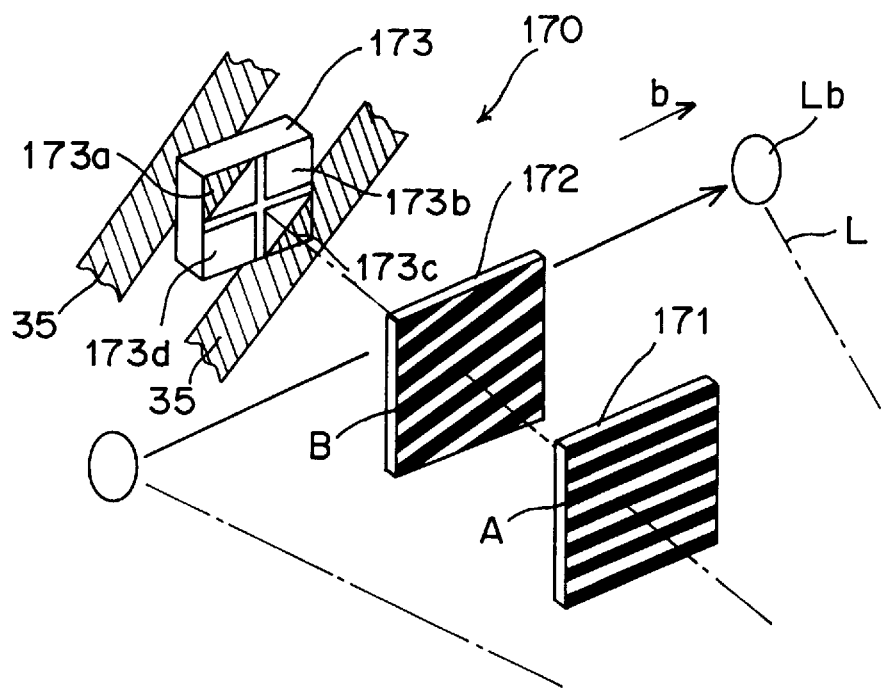
F I G. 58

F I G. 63
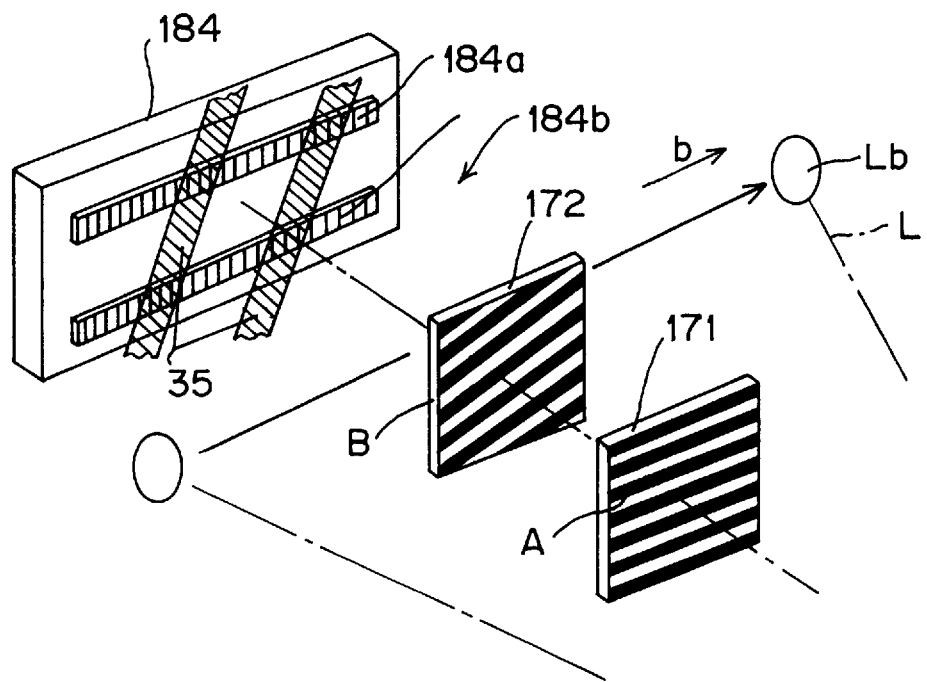
F I G. 64
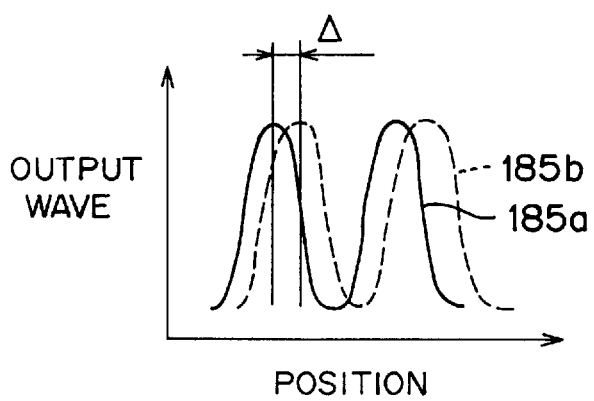

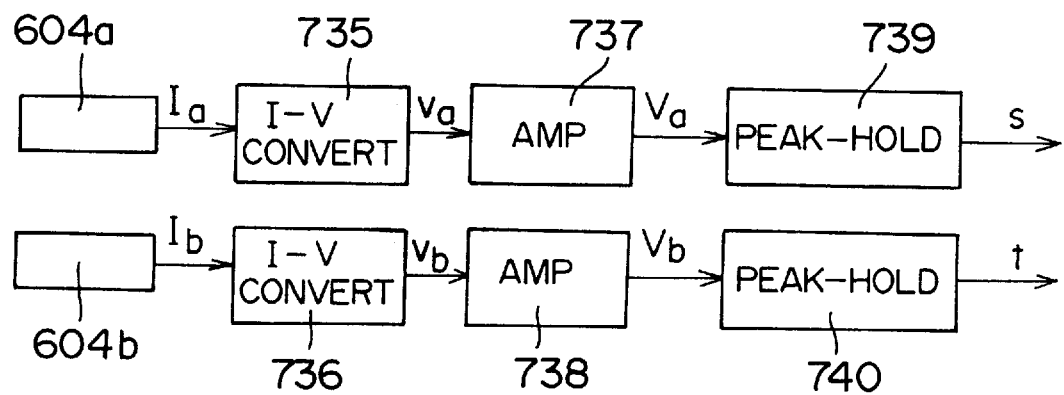
F I G. 76

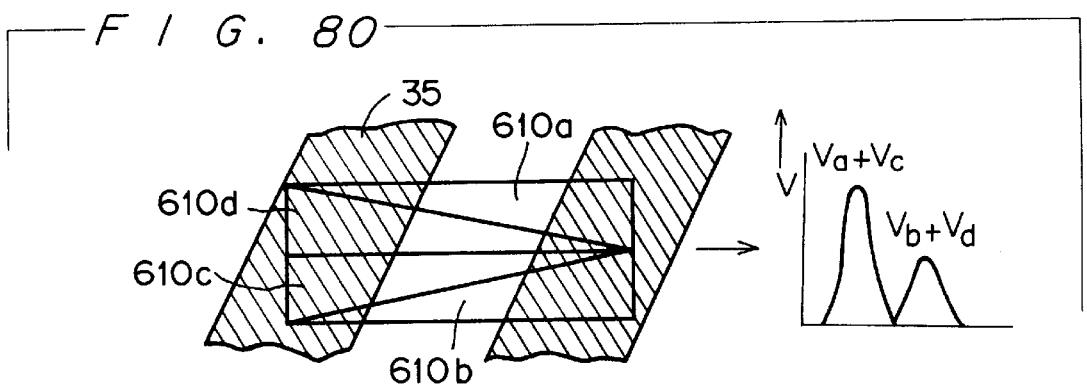
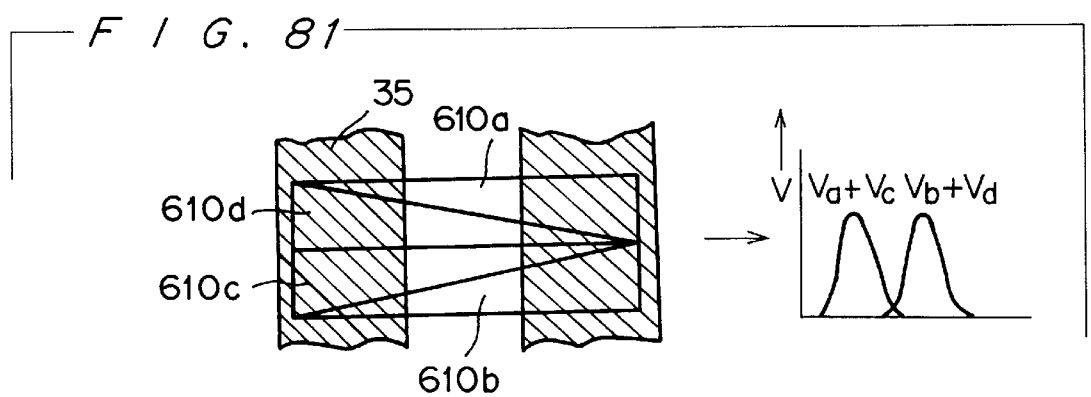
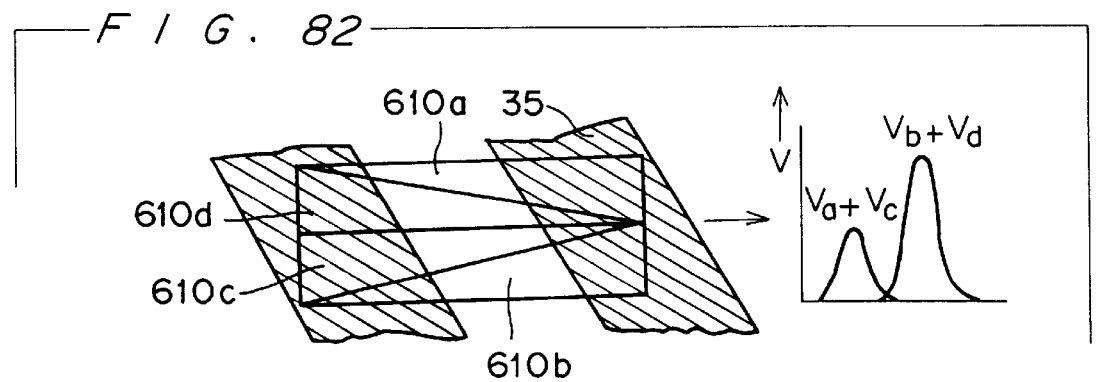

F I G. 84
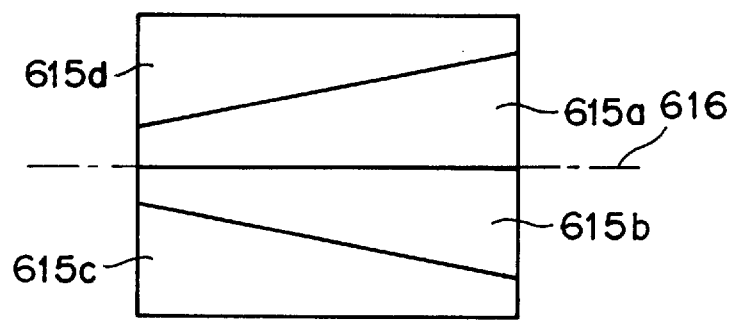

F I G. 85
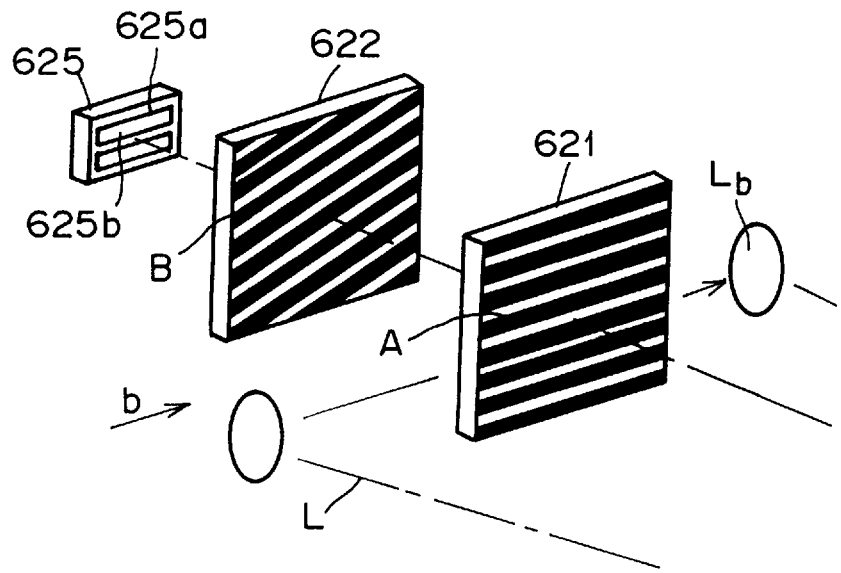
F I G. 86
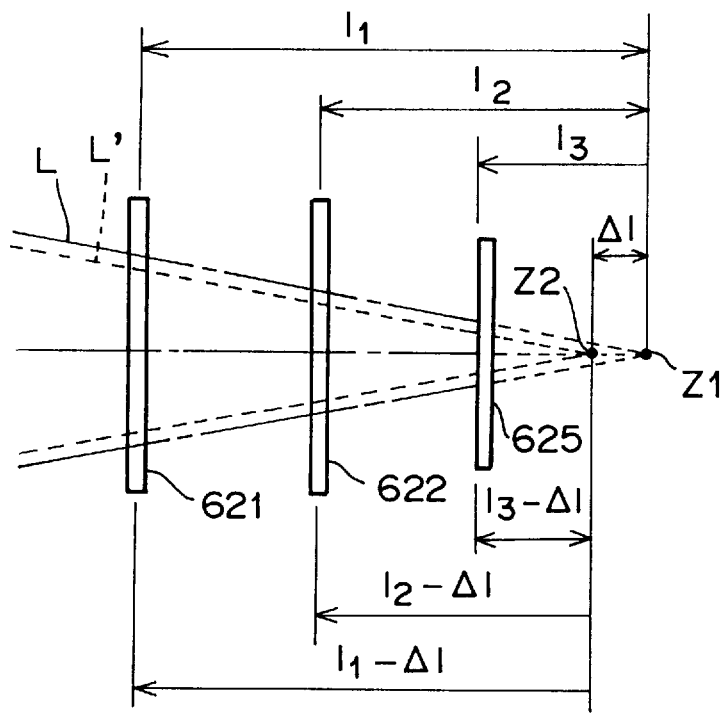

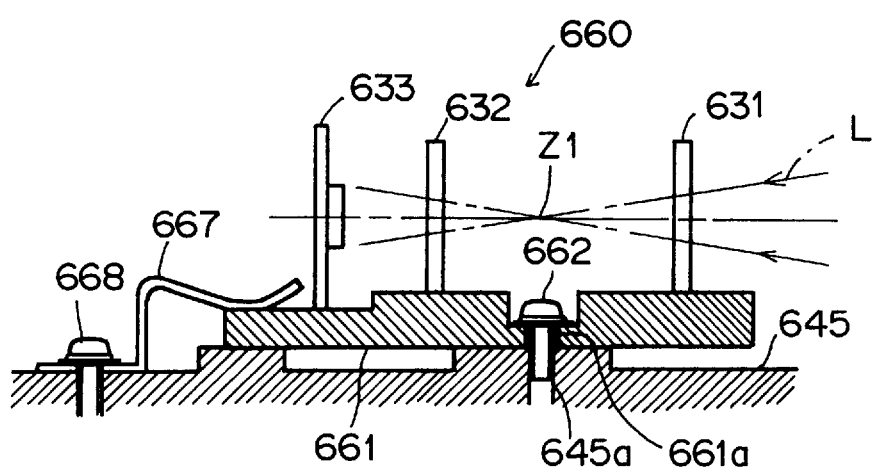
F I G. 97

F I G. 98
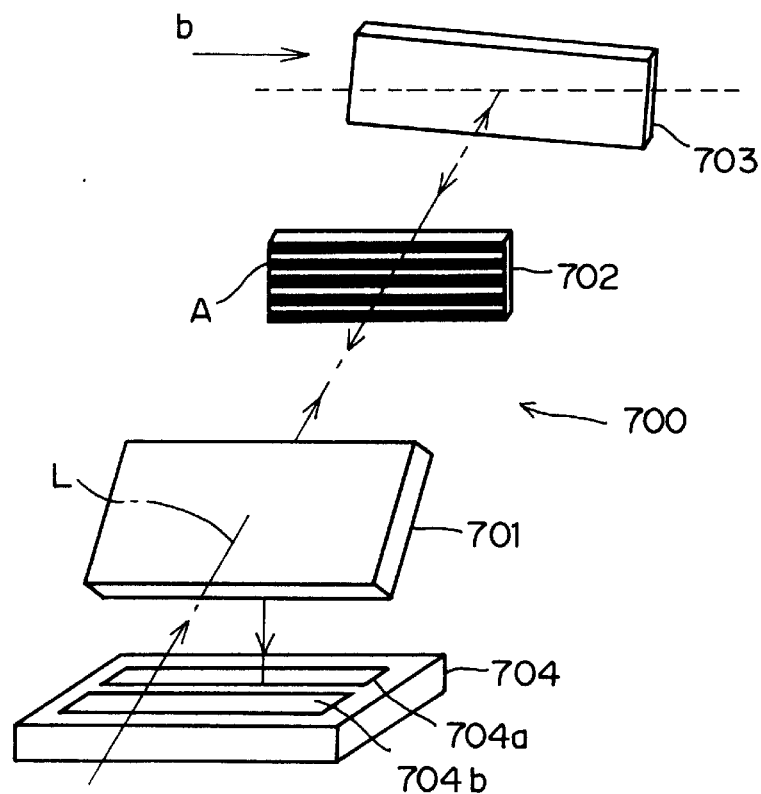
F I G. 99
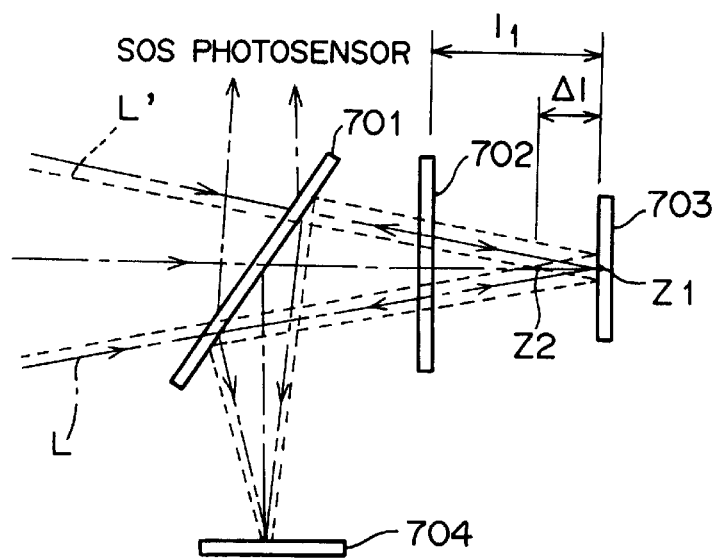

F I G. 100
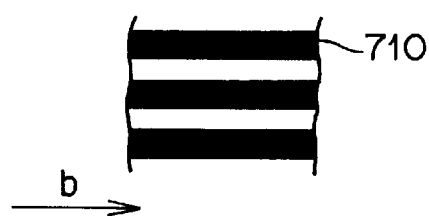
F I G. 101
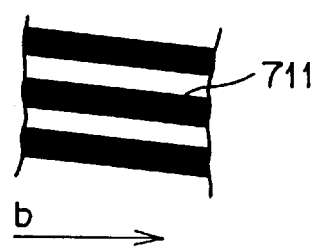

F I G. 102
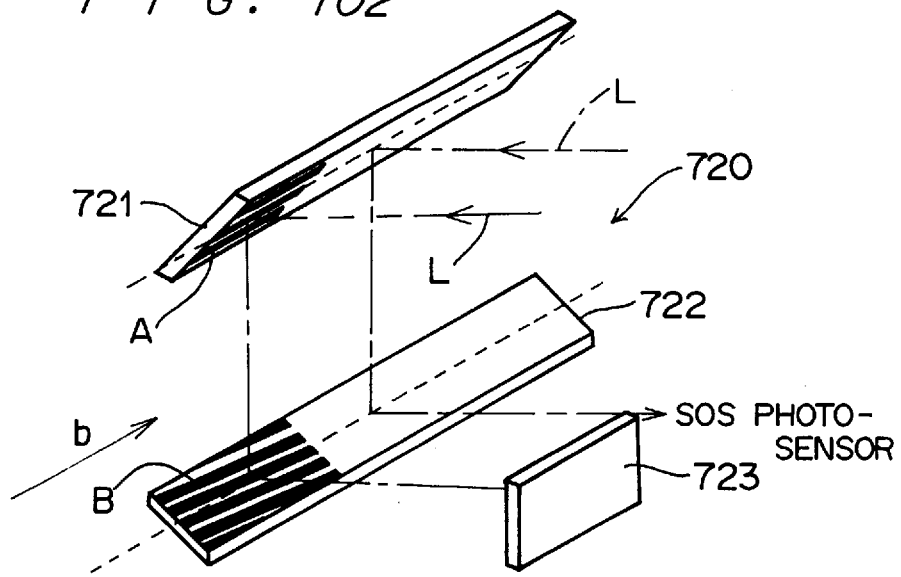
F I G. 103
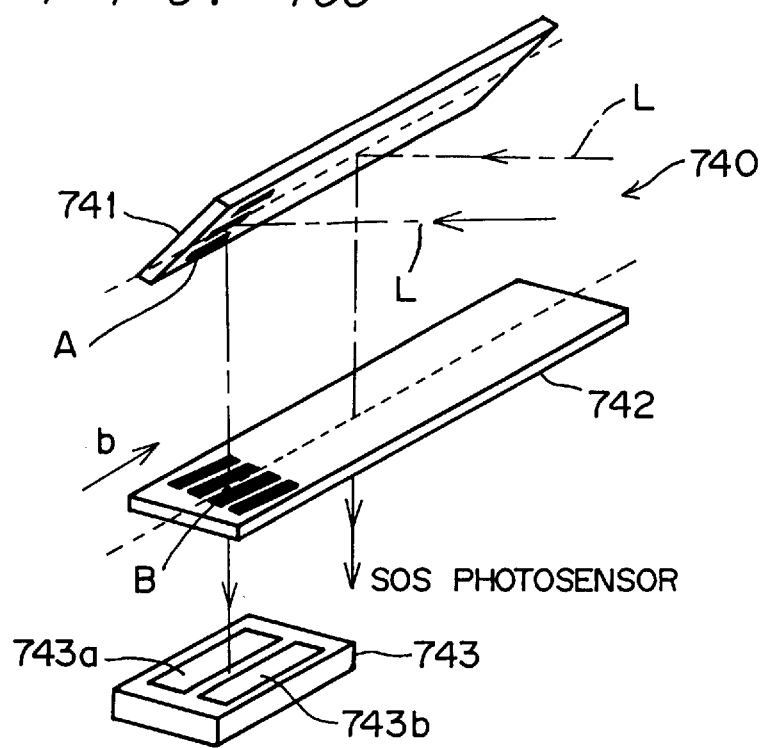

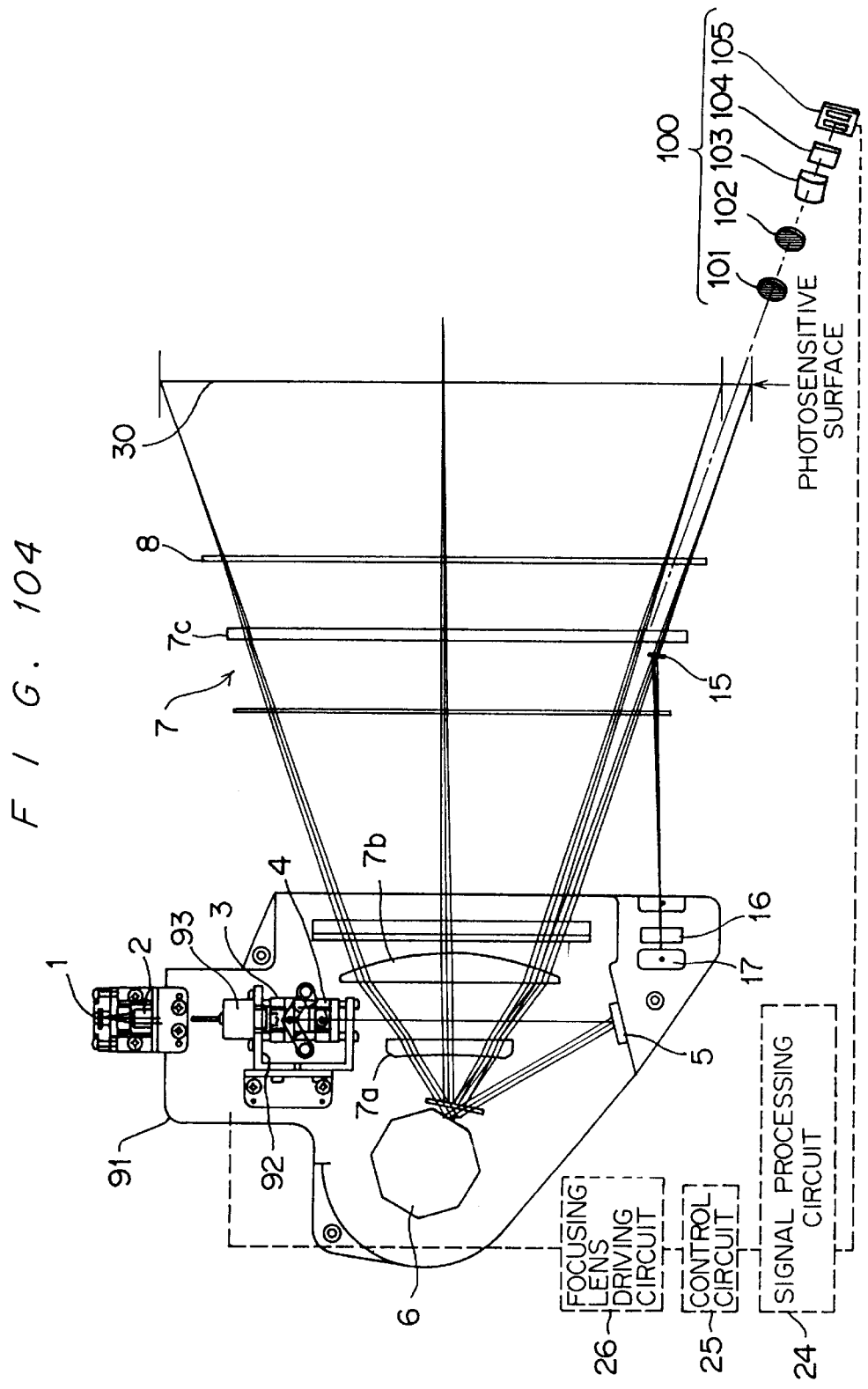

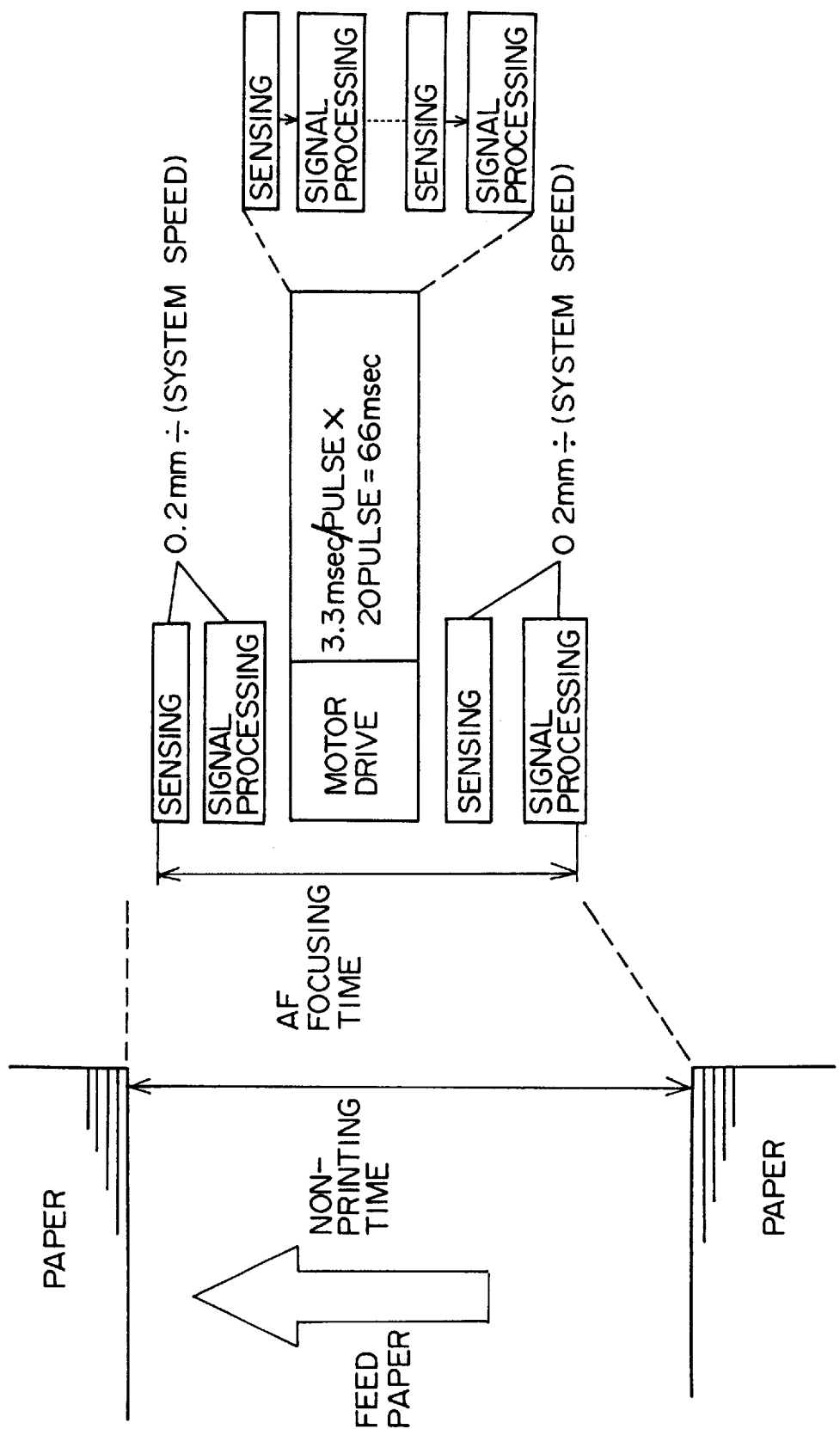

LASER BEAM SCANNING OPTICAL APPARATUS HAVING MEANS FOR GENERATING MOIRE FRINGES

BACKGROUND OF THE INVENTION

1. Field of the Invention

The present invention relates to a laser beam scanning optical apparatus, and more particularly to a laser beam scanning optical apparatus which is employed in a laser printer, a digital copying machine or the like as printing means.

2. Description of Related Art

Recently, a laser beam scanning optical apparatus which is employed in a laser printer, a digital copying machine or the like as printing means is structured to be capable of printing with a high density for improvement of picture quality. Accordingly, the beam spot on a scanning surface (photosensitive member) must be small, and the focal depth is small. When the environments change, especially when the optical apparatus heats, thereby causing thermal expansion of the optical elements and/or a holder thereof, the image point shifts and comes before or after the scanning surface. The shift of the image point is not allowed in order to keep picture quality.

In order to solve the problem, Japanese Patent Laid Open Publication No. 2-51119 discloses that a detector with a single grating filter detects a shift of the image point and that a lens Is moved to a proper position according to the result of the detection. Japanese Patent Laid Open Publication No. 4-155304 discloses that a detector which is located near the scanning surface and has a knife edge arranged upstream and a photoelectric element arranged downstream respectively along the optical axis detects a shift of the image point and that a lens is moved to a proper position according to the result of the detection.

According to the former prior art (2-51119), because only one grating filter is used, the detector cannot detect whether the shift of the image point is one before the scanning surface or one after the scanning surface. Therefore, the lens must be moved back and forth for focusing, and speedy focusing cannot be carried out. According to this art, it is impossible to carry out focusing during an interval of printing between pages (several hundred milliseconds), and it is likely that the image point shifts during continuous printing of pages.

According to the latter prior art (4-155304), although the detector can detect whether the shift of the image point is one before the scanning surface or one after the scanning surface because of the knife edge, the detection is shown by a single wave and accordingly is unstable. In other words, the performance of the detection is poor.

SUMMARY OF THE INVENTION

An object of the present invention is to provide a laser beam scanning optical apparatus which can detects a shift of the image point with a high performance and can carry out speedy focusing.

In order to attain the object, a laser beam scanning optical apparatus according to the present invention comprises Moire fringes generating means which modulates a laser beam to generate Moire fringes and a light receiving element which receives the Moire fringes. For example, the Moire fringes generating means comprises a first filter and a second filter located upstream and downstream respectively in the optical path. The first filter has spatial grating, and the second filter has spatial grating which slants slightly with respect to the spatial grating of the first filter.

The spatial grating of the first filter may be parallel to a main scanning direction of the laser beam or parallel to a sub scanning direction of the laser beam. The light receiving element preferably has a plurality of light receiving surfaces. For example, as the light receiving element, a segmented photodiode, a combination of a plurality of photodiodes, a combination of a plurality of line sensors, an area CCD (Charge Coupled Device), a four-segmented sensor, etc. can be used.

In the above structure, the laser beam emitted from a laser source passes through the Moire fringes generating means and forms Moire fringes on the light receiving surfaces of the light receiving element. If the image point shifts and comes before or after the scanning surface, the inclination of the Moire fringes changes. A change of the inclination of the Moire fringes when the image point comes before the scanning surface (referred to as a state of front focus) is opposite to that when the image point comes after the scanning surface (referred to as a state of back focus). Accordingly, by detecting a change of the inclination of the Moire fringes, the amount and the direction of a shift of the image point can be judged. Then, focusing can be carried out by moving focusing means forward or backward along the optical axis in accordance with the judgment.

Further, the laser beam scanning optical apparatus may comprise a reducing optical system between the Moire fringes generating means and the light receiving element. For example, the reducing optical system is a combination of two cylindrical lenses or a single positive lens. With the reducing optical system, reduced Moire fringes are projected on the light receiving element.

The light receiving element may be a photoelectric element which has a plurality of light receiving surfaces, and the laser beam scanning optical apparatus further has phase difference detecting means. Each of the light receiving surfaces generates an electric signal in accordance with the laser beam incident thereto, and the phase difference detecting means detects the phase difference between the electric signals generated by the light receiving surfaces. The inclination of the Moire fringes can be recognized from the phase difference, and accordingly, a shift of the image point is judged.

BRIEF DESCRIPTION OF THE DRAWINGS

This and other objects and features of the present invention will be apparent from the following description with reference to the accompanying drawings, in which:

FIG. 2 is an exploded perspective view of a beam detector provided in the apparatus of FIG. 1;

FIG. 3 is an exploded perspective view of a beam detector which is a comparative example;

FIG. 8 is a graph which shows an output wave of the beam detector in a case of FIG. 7;

FIGS. 9a, 9b and 9c are illustrations which show a relationship between the diameter of a beam spot and the interval between Moire fringes;

FIG. 10 is a graph which shows an output wave of the beam detector in a case of FIG. 9;

FIG. 15 is an electrical circuit diagram of a control circuitry of the beam detector;

FIG. 18 is a graph which shows output waves of the beam detector when the beam spot is in a position $Lb_2$;

FIG. 19 is a graph which shows output waves of the beam detector when the beam spot is in a position $Lb_3$;

FIG. 20 is an exploded perspective view of a modification of first Moire fringe selecting means;

FIG. 21 is an exploded perspective view of another modification of first Moire fringe selecting means;

FIG. 35 is a timing chart of the control circuitry shown by FIG. 34;

FIG. 36 is an exploded perspective view of the beam detector with a modified photoelectric element;

FIG. 37 is an exploded perspective view of the beam detector with another modified photoelectric element;

FIG. 42 is a graph which shows output waves of the beam detector when the beam spot is in a position $Lb_1$;

FIG. 43 is a graph which shows output waves of the beam detector when the beam spot is in a position $Lb_2$;

FIG. 44 is a graph which shows output waves of the beam detector when the beam spot is in a position $Lb_3$;

FIG. 45 is an electrical circuit diagram of a control circuitry of the beam detector shown by FIG. 40;

FIG. 50 is a timing chart of the control circuitry shown by FIG. 49;

FIG. 51 is an exploded perspective view of a beam detector of a laser beam scanning optical apparatus which is a fourth embodiment of the present invention;

FIG. 52 is an illustration which shows the interval between Moire fringes in a state of in-focus;

FIG. 53 is an illustration which shows the interval between Moire fringes in a state of front focus;

FIG. 58 is an exploded perspective view of a beam detector provided in a laser beam scanning optical apparatus which is a fifth embodiment of the present invention;

FIG. 63 is an exploded perspective view of the beam detector with a modified photoelectric element;

FIG. 64 is a graph which shows output waves of the beam detector shown by the FIG. 63;

FIG. 76 is an electrical circuit diagram of a control circuitry of a scanning position sensor;

FIG. 80 is an illustration which shows the relationship between the Moire fringes in a state of front focus and an output wave of the beam detector;

FIG. 81 is an illustration which shows the relationship between the Moire fringes in a state of in-focus and an output wave of the beam detector;

FIG. 82 is an illustration which shows the relationship between the Moire fringes in a state of back focus and an output wave of the beam detector;

FIG. 84 is a front view of a modification of the photoelectric element;

FIG. 85 is an exploded perspective view of a beam detector provided in a laser beam scanning optical apparatus which is an eighth embodiment of the present invention;

FIG. 86 is a side view which shows the positional relationship between the image point in a state of in-focus and the beam detector;

FIG. 97 is a sectional view which shows another modification of the fitting of the beam detector shown by FIG. 95;

FIG. 98 is an exploded perspective view of a beam detector provided in a laser beam scanning optical apparatus which is an eleventh embodiment of the present invention;

FIG. 99 is a side view which shows the positional relationship between the beam detector and the image point in a state of in-focus;

FIG. 100 is a plane view of a stripe pattern of a laser beam before the laser beam is reflected by a mirror;

FIG. 101 is plane view of a stripe pattern of the laser beam after the laser beam is reflected by the mirror;

FIG. 102 is an exploded perspective view of a beam detector provided in a laser beam scanning optical apparatus which is a twelfth embodiment of the present invention;

FIG. 103 is an exploded perspective view of a modification of the beam detector shown by FIG. 102;

FIG. 104 is a plan view of a laser beam optical scanning apparatus which was used in an experiment; and FIG. 105 is an illustration which shows an auto-focus processing time.

DETAILED DESCRIPTION OF THE PREFERRED EMBODIMENTS

Figure 1:
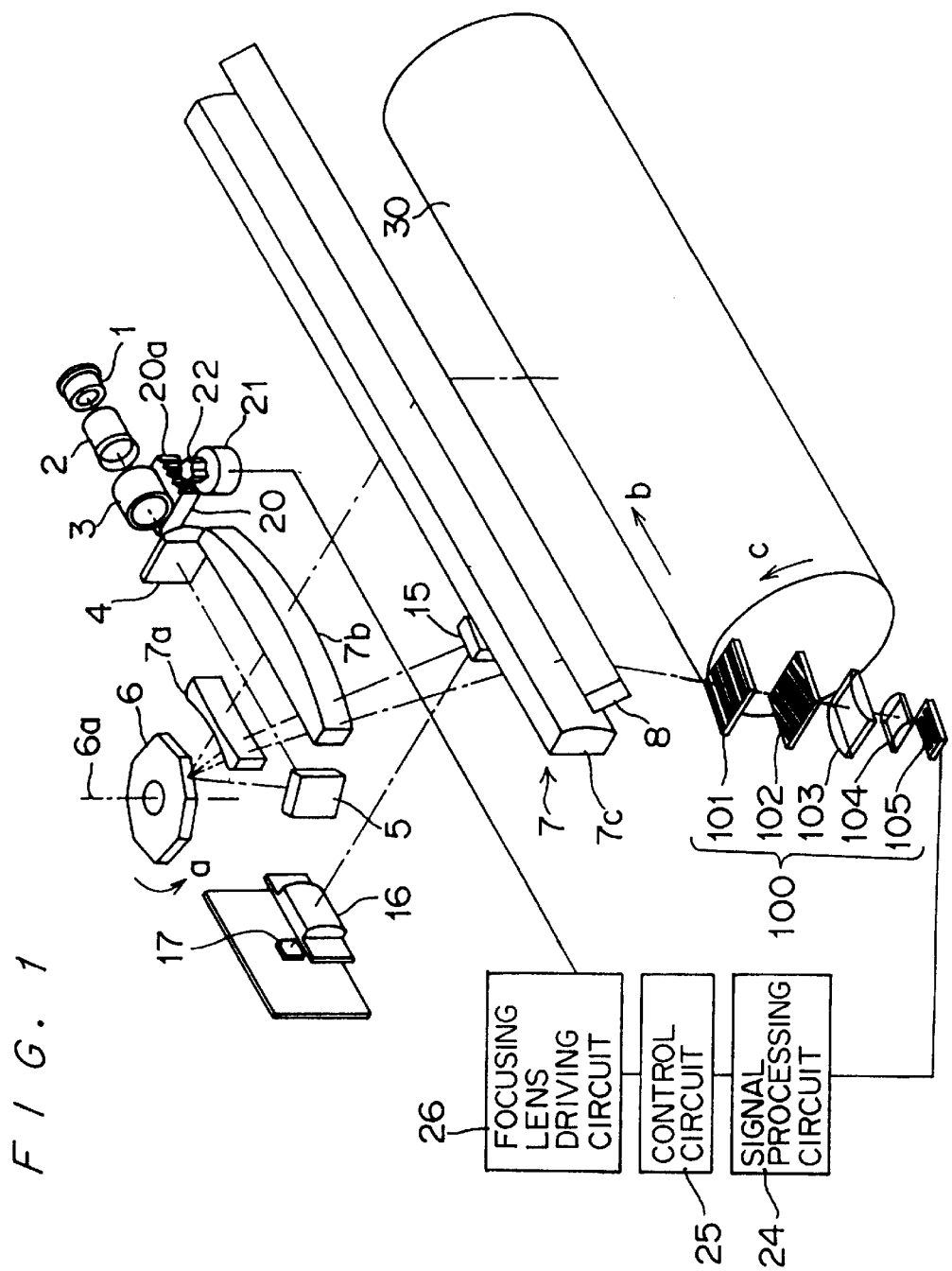
FIG. 1 is a perspective view of a laser beam scanning optical apparatus which is a first embodiment of the present invention.

Preferred embodiments of the present invention are described with reference to the accompanying drawings. The same parts and members used in the embodiments are shown by the same reference symbols.

First Embodiment: FIGS. 1 through 39
General Structure of the Laser Beam Scanning Optical Apparatus Referring to FIG. 1, the structure of a laser beam scanning optical apparatus is described. The optical apparatus comprises a laser diode 1, a collimater lens 2, a focusing lens 3, a cylindrical lens 4, a plane mirror 5, a polygon mirror 6, an fθ lens 7 (composed of lenses 7a, 7b and 7c), a plane mirror 8, an SOS cylindrical lens 16, an SOS photosensor 17 and a beam detector 100.

The laser diode 1 is modulated (turned on and off) in accordance with print data transmitted to a driving circuit (not shown), and when the laser diode 1 is on, the laser diode 1 emits a laser beam. The laser beam is converged by the collimator lens 2 to be substantially a parallel pencil of rays The focusing lens 3 adjusts the position of the image point as will be described later. Then, the laser beam is incident to the polygon mirror 6 through the cylindrical lens 4 and the plane mirror 5.

The polygon mirror 6 is driven to rotate on a rotation axis 6a in a direction shown by arrow a at a constant velocity. With the rotation of the polygon mirror 6, the laser beam is deflected by deflecting facets of the polygon mirror 6 and is scanned at a constant angular velocity. Then, the laser beam is incident to the fθ lens 7. The laser beam passes through the fθ lens 7 and is reflected by the plane mirror 8. Thereafter, the laser beam is imaged on a photosensitive drum 30 and is scanned in a direction of arrow b (main scanning). The main function of the fθ lens 7 is to adjust the speed of the main scanning on the scanning surface (photosensitive drum 30) resulting from the scanning at a constant angular velocity by the polygon mirror 6, that is, to correct distortion.

The photosensitive drum 30 is driven to rotate in a direction of arrow c at a constant velocity, which results in sub scanning. An electrostatic latent image is formed on the photosensitive drum 30 by the main scanning and the sub scanning.

Meanwhile, the laser beam at the beginning of a main scanning line is reflected by the mirror 15 and is incident to the SOS photosensor 17 through the cylindrical lens 16. The SOS photosensor 17 generates a beam detection signal, and a vertical synchronization signal which decides the print starting position of every scanning line is generated in accordance with the beam detection signal.

The focusing lens 3 is fixed on a board 20. The board 20 has a rack 20a on one side, and an output pinion 22 of a stepping motor 21 engages with the rack 20a. The stepping motor 21 is rotated forward or backward, controlled by a signal processing circuit 24, a control circuit 25 and a focusing lens driving circuit 26. With the rotation of the stepping motor 21, the lens 3 is moved back and forth along the optical axis, thereby adjusting the position of the image point of the laser beam.

Beam Detector

The beam detector 100 is located out of an image forming area near a position substantially optically equivalent to the scanning surface so that the beam detector 100 can detect the state of the laser beam on the scanning surface. As shown in FIGS. 1 and 2, the beam detector 100 comprises grating filters 101 and 102, cylindrical lenses 103 and 104, and a photoelectric element 105, and these members 101 through 105 are arranged along the optical axis. The grating filters 101 and 102 have spatial grating patterns A and B respectively. The spatial grating A is parallel to the main scanning direction b of the laser beam L, and the spatial granting B slants at a small angle.

Figure 4:
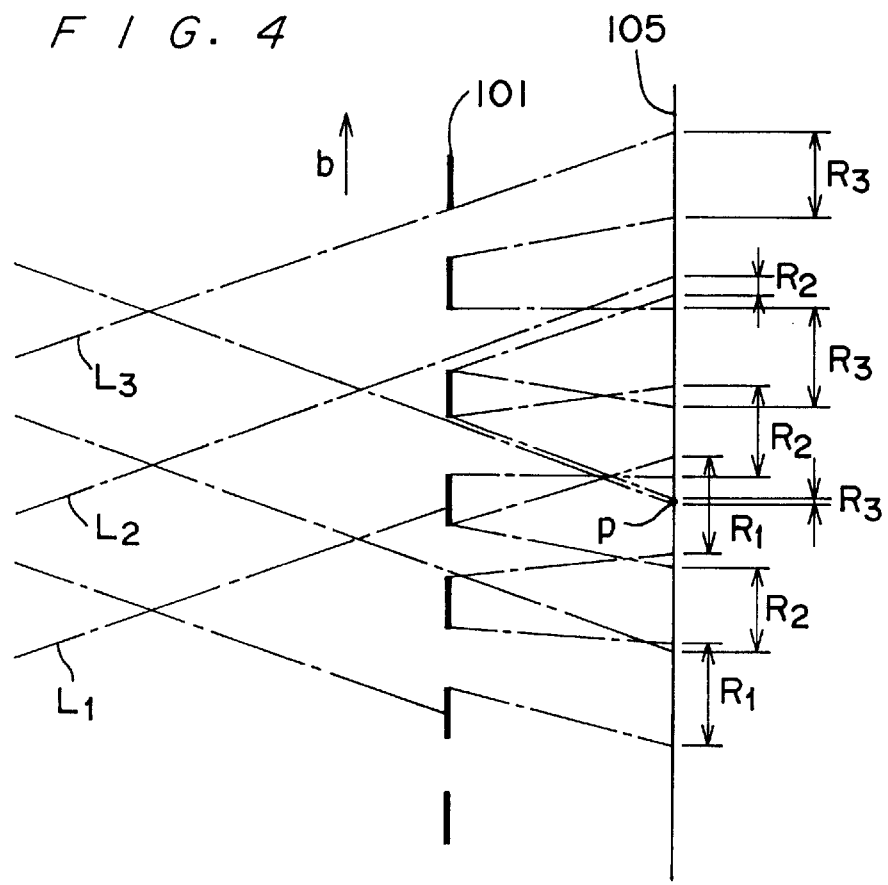
FIG. 4 is an illustration of an optical path in the beam detector of FIG. 3.

If the spatial grating A of the grating filter 101 is perpendicular to the main scanning direction b as shown in FIG. 3, that is, parallel to the sub scanning direction, the following will be a problem. As the laser beam L is scanned, the spatial grating A transmits and shuts off the laser beam L, and the quantity of light incident to light receiving surfaces 105a and 105b of the photoelectric element 105 during one line of main scanning is small. Accordingly, the contrast of Moire fringes is so weak that the photoelectric element 105 cannot detect the Moire fringes. FIG. 4 shows a case in which the grating A of the grating filter 101 is perpendicular to the main scanning direction b, and in FIG. 4, the grating filter 102 and the cylindrical lenses 103 and 104 are omitted. As the laser beam is scanned as indicated by $L_1$, $L_2$ and $L_3$, the Moire fringes shift in the main scanning direction b. More specifically, the laser beam $L_1$ irradiates areas $R_1$ of the photoelectric element 105, the laser beam $L_2$ irradiates areas $R_2$ of the element 105, and the laser beam $L_3$ irradiates areas $R_3$ of the element 105. In this case, for example, a point p of the element 105 is irradiated by the laser beam $L_1$, is not irradiated by the laser beam $L_2$ and is irradiated by the laser beam $L_3$. In other words, the point p flickers. Because this phenomenon occurs for a very short time, it is difficult to recognize the pattern of the Moire fringes.

On the other hand, in the first embodiment, because the spatial grating A of the grating filter 101 is parallel to the main scanning direction b as shown in FIG. 2, a fixed quantity of light is incident to the photoelectric element 105, and Moire fringes 35 can be detected accurately.

The photoelectric element 105 is a two-segmented photodiode which has an upper light receiving surface 105a and a lower light receiving surface 105b. Each of the light receiving surfaces 105a and 105b generates a current in proportional to the quantity of light received.

Moire Fringes

The Moire fringes 35 can be expressed as follows.

$$x = \frac{\cos\alpha - \frac{g}{f}}{\sin\alpha} y - \frac{mg}{\sin\alpha} \quad (1)$$

Figure 5:
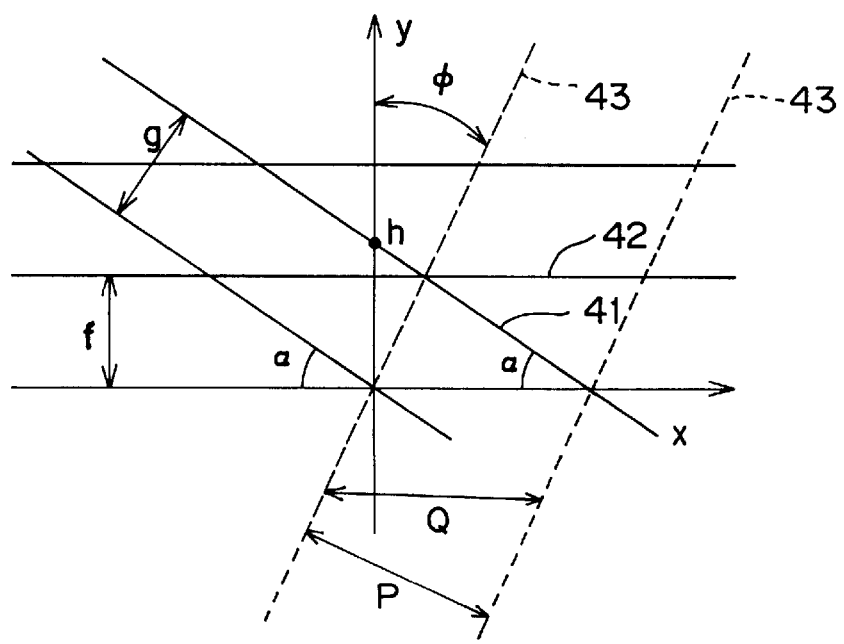
FIG. 5 is an illustration of the inclination of the Moire fringes formed on a photoelectric element of the beam detector of FIG. 2.

(m: intergral)

x: coordinate in the main scanning direction b
y: coordinate in the sub scanning direction
α: angle of the spatial grating B to the spatial grating A
f: pitch of the spatial grating A projected on the light receiving surfaces 105a and 105b
g: pitch of the spatial grating B projected on the light receiving surfaces 105a and 105b In the expression (1), the coefficient {cos α(g/f)}/sin α indicates the inclination of the Moire fringes 35. This coefficient is calculated as follows. As shown in FIG. 5, an xy coordinate system which has an origin at the intersection of a projection of the spatial gratings A and a projection of the spatial grating B on the light receiving surfaces 105a and 105b and a Moire fringe is set. Next, a linear equation which expresses a linear projection 41 of the spatial grating B is calculated.

If the intersection of the linear projection 41 and the y-axis is h, g=h sin((π/2)−α). Accordingly, g=h cos α, and h=g/cos α. As is apparent from FIG. 5, the inclination of the linear projection 41 is tan α. Therefore, the linear projection 41 can be expressed as follows.

$$y = (\tan \alpha) \times x + (g/\cos \alpha) \quad (2)$$

Next, an x coordinate of the intersection of an equation y=f which expresses a linear projection 42 of the spatial grating A and the linear equation (2) is calculated as follows.

$$f = (\tan \alpha) \times x + (g/\cos \alpha)$$
$$x = \{f - (g/\cos \alpha)\}/\tan \alpha$$

A line 43 which expresses a center of the Moire fringe 35 is expressed as follows.

$$x = \frac{f - \frac{g}{\cos\alpha}}{\frac{\tan\alpha}{f}} y = \frac{f - \frac{g}{\cos\alpha}}{f \frac{\sin\alpha}{\cos\alpha}} y \qquad (3)$$

$$= \frac{f\cos\alpha - g}{f \sin\alpha} y = \frac{\cos\alpha - \frac{g}{f}}{\sin\alpha} y$$

The inclination of the Moire fringes 35 is expressed as $\{\cos\alpha - (g/f)\}/\sin\alpha$.

If the pitches of the spatial grating A and the spatial grating B are $d_1$ and $d_2$ respectively, and if the distances between the image point when the scanning surface is in focus (hereinafter referred to as image point in a state of in-focus) and the spatial grating A and between the image point in focus and the spatial grating B are $l_1$ and $l_2$ respectively, the following expression (4) is obtained.

$$f/g = (l_2 d_1)/(l_1 d_2) \qquad (4)$$

Operated from the expressions (1) and (2), the inclination of the Moire fringes 35 is expressed as follows.

$$\frac{\cos\alpha - \frac{l_1 d_2}{l_2 d_1}}{\sin\alpha} \qquad (5)$$

If the pitch of the Moire fringes 35 is P, and if the angle of the Moire fringes 35 to the sub scanning direction is $\phi$, the following expression (6) is obtained.

$$P = (f/\sin\alpha) \times \cos(\phi - \alpha) \qquad (6)$$

Figure 6:
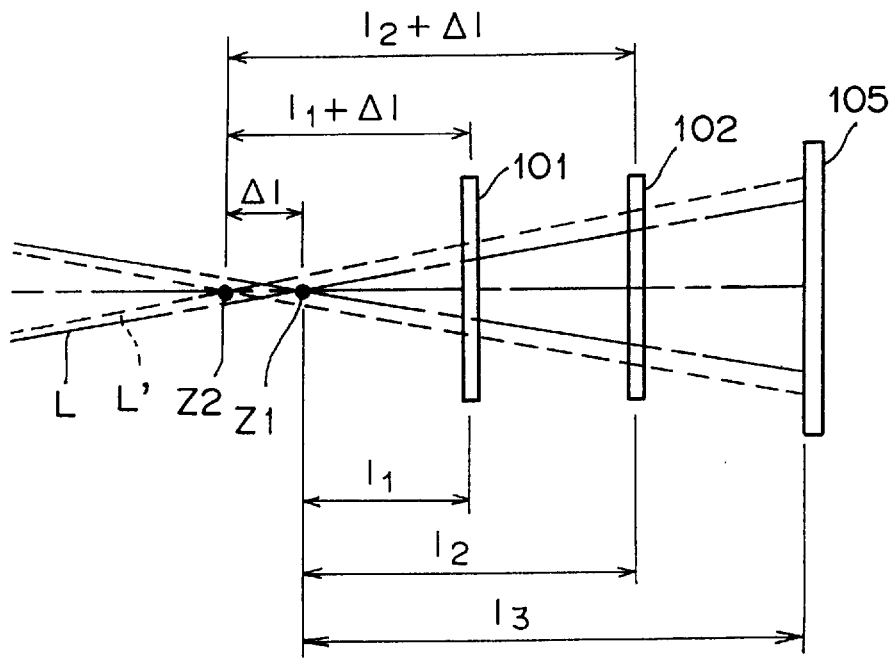
FIG. 6 is a side view which shows the positional relationship between an image point in a state of in-focus and the beam detector.

As shown in FIG. 6, when the image point shifts from Z1 to Z2 by $\Delta l$ and comes before the scanning surface (a state of front focus), the inclination of the Moire fringes 35 is expressed as follows.

$$\frac{\cos\alpha - \frac{(l_1 + \Delta l) d_2}{(l_2 + \Delta l) d_1}}{\sin\alpha} \qquad (7)$$

When the image point comes after the scanning surface (a state of back focus), the inclination of the Moire fringes 35 is expressed as follows.

$$\frac{\cos\alpha - \frac{(l_1 - \Delta l) d_2}{(l_2 - \Delta l) d_1}}{\sin\alpha} \qquad (8)$$

Figure 14:
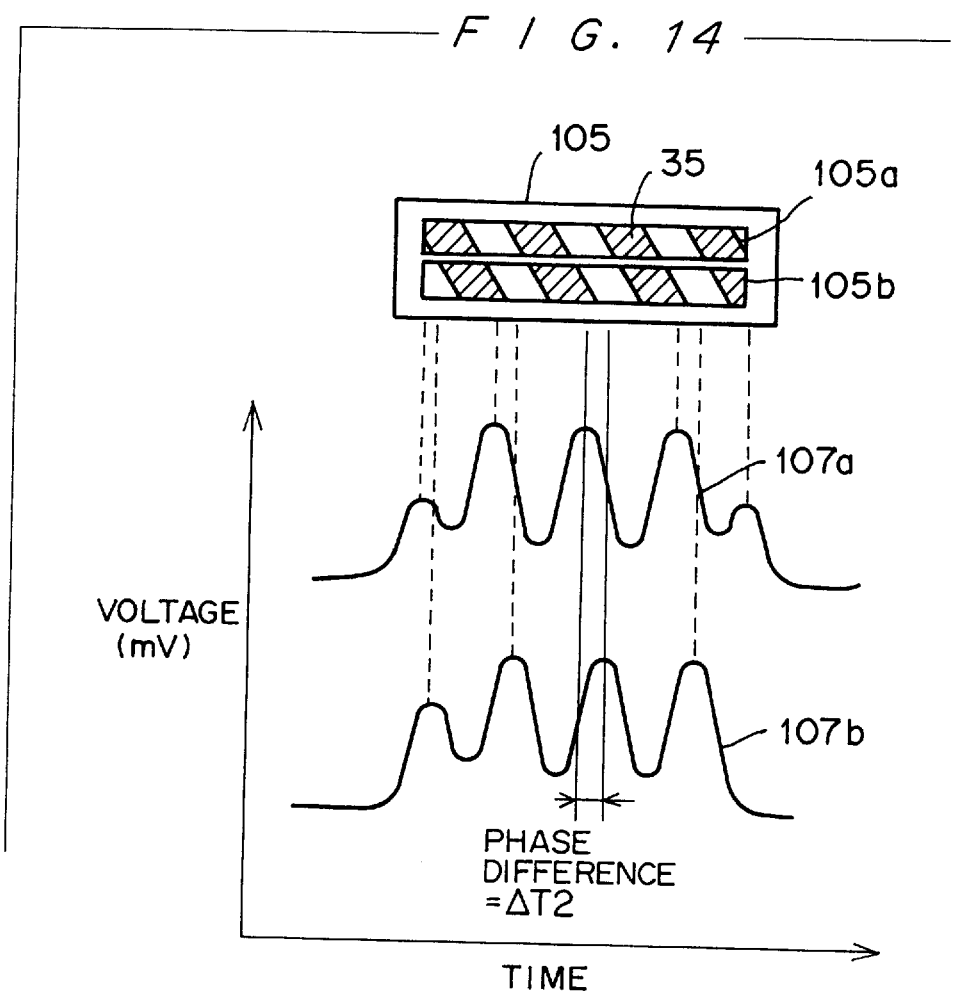
FIG. 14 is an illustration which shows the relationship between the Moire fringes and the light receiving surfaces of the photoelectric element in a state of back focus.

The expressions (7) and (8) are meaningful when the beam detector 100 is located after the image point in a state of in-focus. When the beam detector 100 is located before the image point in a state of in-focus, in the expressions (7) and (8), the pluses and minuses before $\Delta l$ should be reversed. As is apparent from the expressions (5), (7) and (8), the inclination of the Moire fringes 35 changes with a shift of the image point. When the image point is on the scanning surface (referred to as a state of in-focus), the Moire fringes 35 are perpendicular to the main scanning direction b (see FIG. 12). When the image point shifts before the scanning surface (in a state of front focus), the Moire fringes slants to right (see FIG. 13), and when the image point shifts after the scanning surface (in a state of back focus), the Moire fringes slants to left (FIG. 14).

Diameter of the Laser Beam Spot

The relationship between the diameter of the laser beam spot on the beam detector 100 and accurate detection of a change of the inclination of the Moire fringes 35 is studied.

Figures 7A, 7B, 7C:
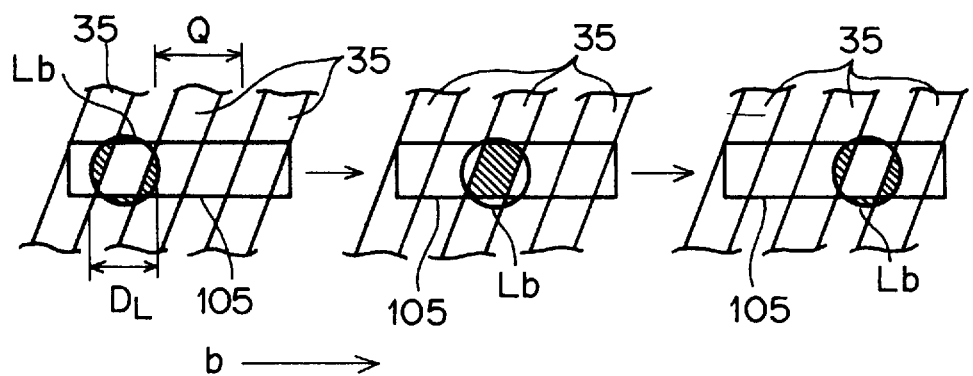
FIGS. 7a, 7b and 7c are illustrations which show a relationship between the diameter of a beam spot and the interval between Moire fringes.

FIGS. 7a, 7b and 7c show a case in which the laser beam L is set to have a spot diameter $D_L$ on the grating filter 101 smaller than the interval Q of the Moire fringes 35 in the main scanning direction (direction of the spatial grating A). When a beam spot Lb is in-between two Moire fringes 35 (see FIGS. 7a and 7c), the overlapping area of the spot Lb and the Moire fringes 35 is small. Accordingly, in this moment, the photoelectric element 105 receives a large quantity of light and outputs a large current. When the beam spot Lb is on the center of a Moire fringe 35 (see FIGS. 7b), the overlapping area of the spot Lb and the Moire fringe 35 is large. Accordingly, in this moment, the photoelectric element 105 receives a small quantity of light and outputs a small current.

FIG. 8 shows an output wave of a voltage which the output current of the light receiving surface 105a (or 105b) is converted into. In FIG. 8, points a and c indicate the outputs when the spot Lb is in-between two Moire fringes 35, and a point b indicates the output when the spot Lb is on the center of a Moire fringe 35.

On the other hand, FIGS. 9a, 9b and 9c show a case in which the laser beam L is set to have a spot diameter $D_L$ on the grating filter 101 larger than the interval Q of the Moire fringes 35. When a beam spot Lb is in-between two Moire fringes 35 (see FIGS. 9a and 9c), the overlapping area of the spot Lb and the Moire fringes 35 is larger than the non-overlapping area, but the quantity of light received by the photoelectric element 105 is not so small. When the spot Lb is on the center of a Moire fringe 35 (see FIG. 9b), the overlapping area of the spot Lb and the Moire fringe 35 is smaller than the non-overlapping area, but the quantity of light received by the photoelectric element 105 is not so large.

FIG. 10 shows an output wave of a voltage which the output current of the light receiving surface 105a (or 105b) is converted into. In FIG. 10, points a and c indicate the outputs when the spot Lb is in-between two Moire fringes 35, and a point b indicates the output when the spot Lb is on the center of a Moire fringe 35. As is apparent from FIGS. 8 and 10, when the interval Q of the Moire fringes 35 in the main scanning direction (direction of the spatial grating A) is larger than the diameter $D_L$ of the laser beam spot on the grating filter 101, the output wave has good contrast, and therefore, a change of the inclination of the Moire fringes 35 can be detected accurately.

This relationship is described more specifically referring to FIG. 5. The pitch P of the Moire fringes 35 can be calculated by use of the expression (6), and the interval Q of the Moire fringes 35 in the main scanning direction (direction of the spatial grating A) can be calculated as follows.

$$Q = P/\cos\phi$$
$$= (f/\cos\phi \sin\alpha) \times \cos(\phi - \alpha)$$

Therefore, in order to make the interval Q of the Moire fringes 35 larger than the diameter $D_L$ of the laser beam spot on the grating filter 101, the following condition should be fulfilled.

$$D_L < (f/\cos\phi \sin\alpha) \times \cos(\phi - \alpha) \qquad (9)$$

Thus, by setting the diameter $D_L$ of the laser beam spot on the grating filter 101 to fulfill the condition (9), the output wave of the beam detector 100 has good contrast, and a change of the inclination of the Moire fringes 35 can be detected accurately.

Pitch Error of the Spatial Grating

The inclination of the Moire fringes 35 changes not only with a shift of the image point of the laser beam but also with a pitch error of the spatial grating A of the filter 101 and/or the spatial grating B of the filter 102. The influence of a pitch error $\Delta d_1$ of the spatial grating A and a pitch error $\Delta d_2$ of the spatial grating B to the inclination of the Moire fringes 35 was studied. As a result, even if the pitch error $\Delta d_1$ of the spatial grating A is small, when the pitch error $\Delta d_2$ of the spatial grating B is large, the inclination of the Moire fringes 35 was changed much. Therefore, in order to detect a shift of the image point accurately, it is necessary that the spatial grating B has a pitch error $\Delta d_2$ which fulfills the following condition.

$$d_2 = \{(l_2 - \Delta l_2)/(l_1 - \Delta l_1)\} d_1 < \Delta d_2 \qquad (10)$$

$\Delta l_1$: shift of distance $l_1$ between image point in focus and the filter 101

$\Delta l_2$: shift of distance $l_2$ between image point in focus and the filter 102

The expression (10) is presented from a comparison of the influence of a shift of the image point $\Delta l$ to the inclination of the Moire fringes 35 with the influence of a pitch error $\Delta d_2$ of the spatial grating B to the inclination of the Moire fringes 35. If the condition (10) is fulfilled, a change of the inclination of the Moire fringes 35 due to a shift of the image point $\Delta l$ is larger than a change of the inclination of the Moire fringes 35 due to a pitch error $\Delta d_2$, and the shift of the image point can be detected accurately.

In order to form detectable Moire fringes 35 on the light receiving surfaces 105a and 105b of the photoelectric element 105, the following condition must be fulfilled.

$$\Delta d_2 < d_2 - (l_2/l_1) d_1 \qquad (11)$$

If the spatial grating B has a pitch error $\Delta d_2$ which fulfills the condition (11), there is no possibility that a change of the inclination of the Moire fringes 35 due to the pitch error $\Delta d_2$ is so large that a shift of the image point cannot be detected.

This is described referring to specific values. For example, the beam detector 100 is supposed to have the following values: the pitch $d_1$ of the spatial grating A is 125 $\mu$m; the pitch $d_2$ of the spatial grating B is 250 $\mu$m; the distance $l_1$ between the image point in a state of in-focus and the spatial grating A is 40 mm; and the distance $l_2$ between the image point in a state of in-focus and the spatial grating B is 80 mm. The spatial grating B of the grating filter 102 is usually so structured that a shift of the image point $\Delta l$ due to the pitch error $\Delta d_2$ of the spatial grating B is not more than the focal depth of a scanning optical apparatus which the beam detector is used in. If this beam detector is used in a scanning optical apparatus with relatively low-level resolution (for example, 500 dpi), the spatial grating B is so structured that a shift of the image point $\Delta l$ due to the pitch error $\Delta d_2$ is not more than approximately 2.0 mm. Accordingly, the pitch error $\Delta d_2$ must fulfill the following condition which is operated from the expressions (10) and (11). Under the condition, the distances $l_1$ and $l_2$ are not too small, and Moire fringes with good contrast can be formed.

$$-0.63 \ \mu m < \Delta d_2 < 0$$

If the beam detector is used in a scanning optical apparatus with relatively high-level resolution (for example, 600 dpi), the spatial grating B is so structured that a shift of the image point $\Delta l$ due to the pitch error $\Delta d_2$ is not more than the focal depth of the scanning optical apparatus, that is, approximately 0.2 mm. Accordingly, the pitch error $\Delta d_2$ must fulfill the following condition which is operated from the expressions (10) and (11).

$$-6.53 \ \mu m < \Delta d_2 < 0$$

Further, preferably, a shift of the image point $\Delta l$ is kept in the extent of 0.02 mm for an improvement of the reliability. Accordingly, the pitch error $\Delta d_2$ must fulfill the following condition which is operated from the expressions (10) and (11).

$$-0.06 \ \mu m < \Delta d_2 < 0$$

If a shift of the image point $\Delta l$ is kept in the extent of 0.02 mm, an error in fixing the photoelectric element 105 and other errors can be widely allowed, and it is very practical.

Reducing Optical System

It is a way of improving the accuracy of the detection of a shift of the image point to structure a beam detector which can change the inclination of Moire fringes largely when the image point shifts. For this purpose, the angle of the slant of the spatial grating B of the filter 102 to the spatial grating A of the filter 101 should be small. However, this causes the following problems. When the angle is small, the pitch P of the Moire fringes 35 becomes large, and the number of Moire fringes 35 formed on a photoelectric element 105 becomes small. Accordingly, the volume of information received by the photoelectric element 105 is little, thereby resulting in a detection error. Also, in this case, because the light receiving surfaces 105a and 105b of the photoelectric element 105 are too small compared with the size of the Moire fringes 35, a big loss of quantity of light is made, and good contrast cannot be obtained. In order to solve these problems, in the first embodiment, a reducing optical system, namely, the cylindrical lenses 103 and 104 are provided.

The cylindrical lens 103 has a power only in the main scanning direction b, and the cylindrical lens 104 has a power only in the sub scanning direction c. The laser beam L which passed through the grating filters 101 and 102 is converged by the cylindrical lenses 103 and 104 and forms Moire fringes 35 on the light receiving surfaces 105a and 105b of the photoelectric element 105. With this arrangement, Moire fringes 35 reduced by the cylindrical lenses 103 and 104 are formed on the light receiving surfaces 105a and 105b. Therefore, even if the angle of the spatial grating B of the filter 102 to the spatial grating A of the filter 101 is small, the photoelectric element 105, which is a small size, can receive a sufficient quantity of light of the Moire fringes 35, and a shift of the image point can be detected accurately.

Because the reducing optical system is composed of two cylindrical lenses 103 and 104, the Moire fringes 35 can be reduced in the main scanning direction and in the sub scanning direction at different rates of reduction. This is preferred to form a proper number of Moire fringes of a proper size for the sizes of the light receiving surfaces 105a and 105b of the photoelectric element 105. Such a reducing optical system can be composed of an anamorphic lens which has different powers in the main scanning direction and in the sub scanning direction. In this case, however, the powers in the main scanning direction and in the sub scanning direction must be adjusted simultaneously, and it is difficult to position the anamorphic lens with respect to the light receiving surfaces 105a and 105b, compared with a case in which two cylindrical lenses are used. Further, as long as proper Moire fringes can be formed on the light receiving surface 105a of the photoelectric element 105, a single lens which has a positive power can be used in the reducing optical system.

The effect of the reducing optical system is described in more detail referring to specific values. For example, the beam detector 100 is supposed to have the following values: the pitch $d_1$ of the spatial grating A is 125 μm; the pitch $d_2$ of the spatial grating B is 250 μm; the angle α of the spatial grating B to the spatial grating A is 4°; the distance $l_1$ between the image point in a state of in-focus and the spatial grating A is 40 mm; and the distance $l_2$ between the image point in a state of in-focus and the spatial grating B is 80 mm. In this case, by using the expression (5), the inclination of the Moire fringes 35 is calculated as follows.

$$[\cos \alpha - \{(l_1 d_2)/(l_2 d_1)\}]/\sin \alpha = -0.035$$

Accordingly, tan φ=−0.035, and φ=−2°. Therefore, the inclination of the Moire fringes 35 is −88°. If the distances between the image point in focus and the photoelectric element 105 is $l_3$, because $f = l_3 d_1/l_1$, the pitch P of the Moire fringes 35 is calculated as follows by using the expression (6).

$$P = (f/\sin \alpha) \times \cos (\phi - \alpha) = 3.56 \text{ (mm)}$$

If the photoelectric element 105 is 3 mm wide and 1 mm height, without the cylindrical lenses 103 and 104, the photoelectric element 105 can receive only one Moire fringe whose pitch P is 3.56 mm. The Moire fringes 35 formed under the above condition has a height of approximately 3 mm on the photoelectric element 105. Because the height of the photoelectric element 105 is 1 mm, two third of the height of the Moire fringes 35 is out of the photoelectric element 105, and a big loss of quantity of light is made. Further, if the laser beam L shifts in the sub scanning direction c due to errors in the optical system, errors in producing supporting parts of the grating filters 101 and 102 and/or the photoelectric element 105, aging of the apparatus, etc., the Moire fringes 35 shift in the main scanning direction b keeping the pitch and the inclination, and one Moire fringe formed on the light receiving surfaces 105a and 105b shifts to the edge or to the center. Thus, detection of a change of the inclination of the Moire fringe 35 is not stable.

Therefore, the reducing optical system is necessary. The cylindrical lens 103 of the reducing optical system has such a power that at least three Moire fringes 35 can be formed on the light receiving surfaces 105a and 105b of the photoelectric element 105. Generally, in order for stable detection of a shift of the image point, it is preferred that at least three Moire fringes 35 are formed on the light receiving surfaces 105a and 105b. The cylindrical lens 104 has such a power that the height of the Moire fringes 35 on the light receiving surfaces 105a and 105b is not more than the height of the photoelectric element 105.

Figure 11:
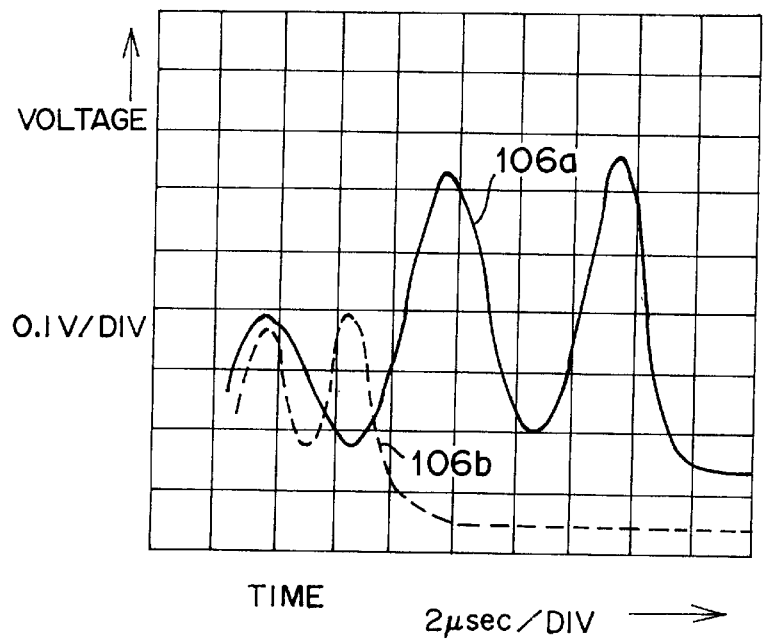
FIG. 11 is a graph which shows an output wave of the beam detector of FIG. 2 more specifically.
Figure 12:
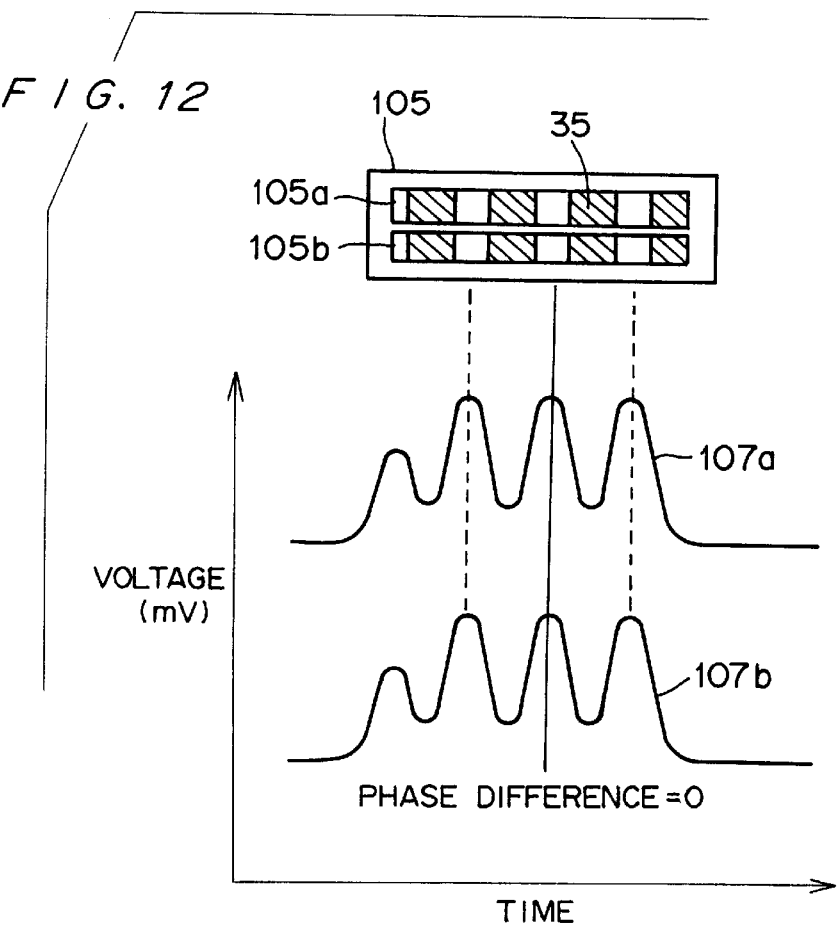
FIG. 12 is an illustration which shows the relationship between the Moire fringes and light receiving surfaces of the photoelectric element in a state of in-focus.
Figure 13:
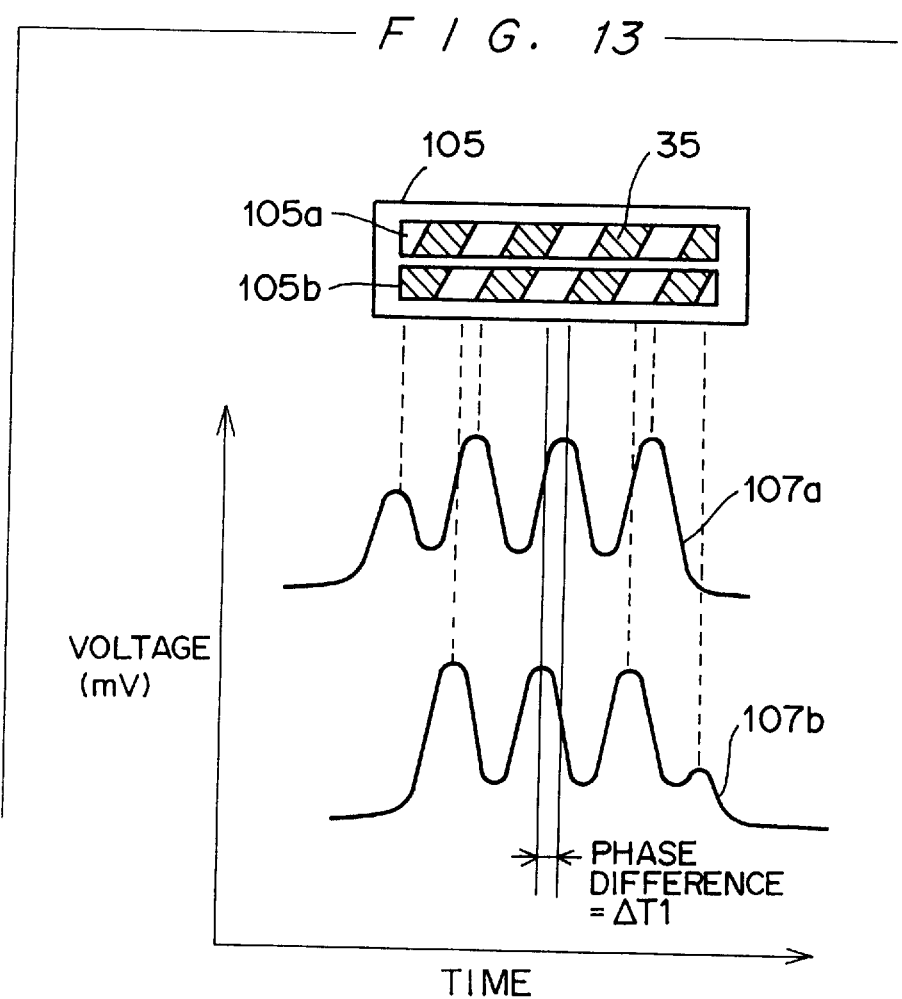
FIG. 13 is an illustration which shows the relationship between the Moire fringes and the light receiving surfaces of the photoelectric element in a state of front focus.

FIG. 11 shows the output of the photoelectric element 105 as a voltage in a case in which the speed of the polygon mirror 6 is approximately 20000 rpm and the laser power on the light receiving surfaces 105a and 105b is approximately 1 mW. In FIG. 11, the solid line 106a shows the output when the reducing optical system is provided, and the dashed line shows the output when no reducing optical system is provided. When no reducing optical system is provided, the contrast of the Moire fringes 35 is shown as a voltage difference of approximately 0.2V. When the reducing optical system is provided, the contrast of the Moire fringes 35 is shown as a voltage difference within a range from 0.5V to 1.0V (approximately 0.5V in the case of FIG. 11).

First Phase Difference Detecting Mechanism and First Moire Fringe Selecting Means Referring to FIGS. 12 through 27, a way of detecting a change of the inclination of the Moire fringes 35 when a plurality of Moire fringes are formed on the light receiving surfaces 105a and 105b is described. From the phase difference between the output wave of the light receiving surface 105a and the output wave of the light receiving surface 105b, and more specifically from the phase difference between the crests of the two output waves, whether the image point is on the scanning surface, before the scanning surface or after the scanning surface is Judged. In accordance with the result, the direction of moving the focusing lens 3 is decided, and a control signal is transmitted to the stepping motor 21 through the focusing lens driving control circuit 26. The stepping motor 21 is rotated forward or backward and moves the focusing lens 3 by a specified amount along the optical axis. By moving the lens 3 away from the laser diode 1, the image point is corrected to come downstream in the light path. By moving the lens 3 toward the laser diode 1, the image point is corrected to come upstream in the light path. One step of movement of the lens 3 corresponds to an approximately 0.01 mm movement of the image point. Such a movement is repeated until the image point comes on the scanning surface.

As described, in the first embodiment, the beam detector 100 is designed as follows: when the image point is on the scanning surface (in a state of in-focus), the Moire fringes 35 are perpendicular to the main scanning direction b (see FIG. 12); when the image point is before the scanning surface (in a state of front focus), the Moire fringes 35 slant to right (see FIG. 13); and when the image point is after the scanning surface (in a state of back focus), the Moire fringes 35 slant to left (see FIG. 14).

In FIGS. 12, 13 and 14, 107a and 107b show the output waves of voltages which the respective output currents of the light receiving surfaces 105a and 105b are converted into. The troughs of the output waves 107a and 107b correspond to dark regions of the Moire fringes 35 which extend to the light receiving surfaces 105a and 105b. The crests of the output waves 107a and 107b correspond to bright regions of the Moire fringes 35. The state of the Moire fringes 35 can be judged from the phase difference between the bright regions of the Moire fringes 35 which extend to the light receiving surfaces 105a and 105b. More specifically, if the crests of the output wave 107a and the crests of the output wave 107b have a phase difference of 0 (see FIG. 12), a state of in-focus is judged. If the crests of the output wave 107a is behind the crests of the output wave 107b by a phase difference of ΔT1 (see FIG. 13), a state of front focus is judged. If the crests of the output wave 107a is ahead of the crests of the output wave 107b by a phase difference of ΔT2 (see FIG. 14), a state of back focus is judged.

Referring to FIG. 15, data processing of the output waves is described. The electrical circuitry shown by FIG. 15 comprises variable amplifiers 202 and 211, delay amplifiers 203 and 212, comparators 204 and 213, flip-flops 205 and 214, AND elements 206, 209 and 215, timers 207 and 216, an OR element 208, a programmable timer 219, a microcomputer 220, peak-hold circuits 221 and 222, a differential circuit 223, a microcomputer 224 and delay circuits 225 and 226. The comparators 204 and 213, and the flip-flops 205 and 214 convert analog output waves of the light receiving surfaces 105a and 105b into digital signals. Further, the AND elements 206, 209 and 215 handles the output waves of the light receiving surfaces 105a and 105b as digital signals, and this control circuitry is reliable.

The variable amplifier 202 and the delay amplifier 203 amplify the output wave signal S1 of the light receiving surface 105a and sends wave signals S2 and S3 respectively to the comparator 204. The comparator 204 compares the waves signals S2 and S3 with each other and generates a digital signal S4. In the same manner, the variable amplifier 211 and the delay amplifier 212 amplify the output wave signal S5 of the light receiving surface 105b and sends wave signals S6 and S7 respectively to the comparator 213. The comparator 213 compares the wave signals S6 and S7 with each other and generates a digital signal S8. In this processing, the output wave signals S1 and S5, which are analog signals, are digitalized, and the crests and troughs of the output wave signals S1 and S5 become changing points between a high level and a low level of the digital signals S4 and S8 (see FIG. 22). The signals S4 and S8 are sent to the flip-flops 205 and 214 through the delay circuits 225 and 226 respectively.

Figure 16:
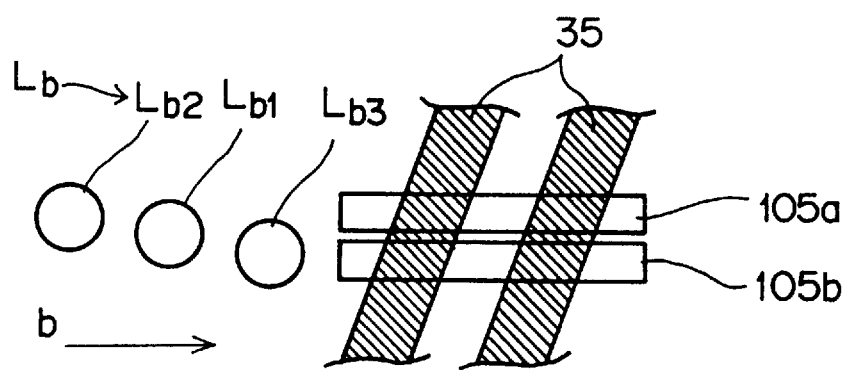
FIG. 16 is an illustration which shows positional relationships between the laser beam spot and the light receiving surfaces of the photoelectric element.
Figure 17:
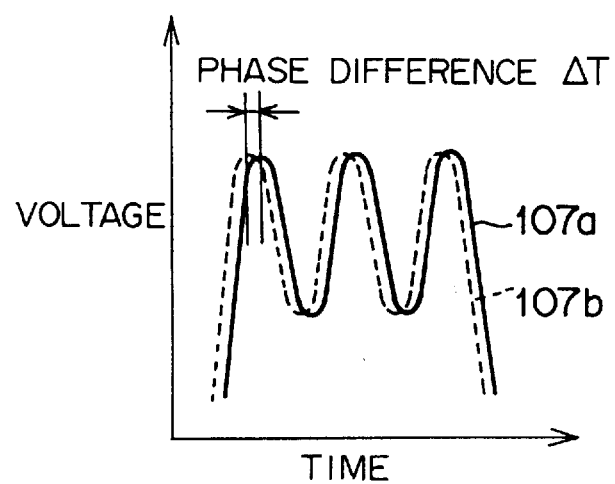
FIG. 17 is a graph which shows output waves of the beam detector when the beam spot is in a position $Lb_1$.

As shown in FIG. 16, the laser beam L is so designed that the center of the laser beam spot Lb comes to the center of the photoelectric element 105 as indicated by $Lb_1$. In this case, as shown in FIG. 17, the peak values of the output waves 107a and 107b are substantially equal, and therefore, the detection of the phase difference ΔT is stable. However, with a change in the environments (temperature, humidity), the optical path of the laser beam L may shift in the sub scanning direction (see $Lb_2$ and $Lb_3$ in FIG. 16). In the case in which the laser beam spot comes to the position $Lb_2$, the peak values of the output wave 107b become low as shown in FIG. 18. In the case in which the laser beam spot comes to the position $Lb_3$, the peak values of the output wave 107a become low as shown in FIG. 19. Therefore, in these cases, the detection of a phase difference ΔT is unstable.

In order to solve this problem, the first embodiment has a mechanism which ensures stable detection of a phase difference ΔT even when the optical path of the laser beam shifts in the sub scanning direction. This mechanism is described referring to FIG. 15. The output waves S2 and S6 of the variable amplifiers 202 and 211 are inputted into the peak-hold circuits 221 and 222 respectively. The peak-hold circuits 221 and 222 keep the peak values (the maximum voltage values) of the output wave signals S2 and S6 and output the peak values as signals S25 and S26 respectively. The signals S25 and S26 are sent to the differential circuit 223, and the differential circuit 223 recognizes the difference between the peak values and sends the difference to the microcomputer 224 as a signal S27.

The microcomputer 224 decides the amplification factors of the variable amplifiers 202 and 211 depending on the signal S27. The amplification factors are decided so that the peak values of the output waves S2 and S6 outputted from the variable amplifiers 202 and 211 will be substantially equal. The decided amplification factors are sent to the variable amplifiers 202 and 211 as signals S28 and S29 respectively, and accordingly, gain control of the variable amplifiers 202 and 211 is carried out.

With this processing, even if the peak values of the output waves 107a and 107b become different due to a shift of the laser beam path in the sub scanning direction, the output wave signals S2 and S6 of the variable amplifiers 202 and 211 can be made substantially equal. Thus, a phase difference ΔT can be detected stably.

Next, Moire fringe selecting means for selecting one of the Moire fringes 35 projected on the light receiving surfaces 105a and 105b as a sample of detection is described. The Moire fringe selecting means is not always necessary, but the Moire fringe selecting means has the following effect. When the optical path of the laser beam L shifts in the sub scanning direction, the Moire fringes 35 projected on the light receiving surfaces 105a and 105b of the photoelectric element 105 shift in the main scanning direction, and part of the Moire fringes 35 comes out of the light receiving surfaces 105a and 105b. Accordingly, clear output waves cannot be obtained, and the inclination of the Moire fringes 35 cannot be detected accurately. In order to solve this problem, a proper one of the Moire fringes 35 projected on the light receiving surfaces 105a and 105b is selected by the Moire fringe selecting means.

Figure 22:
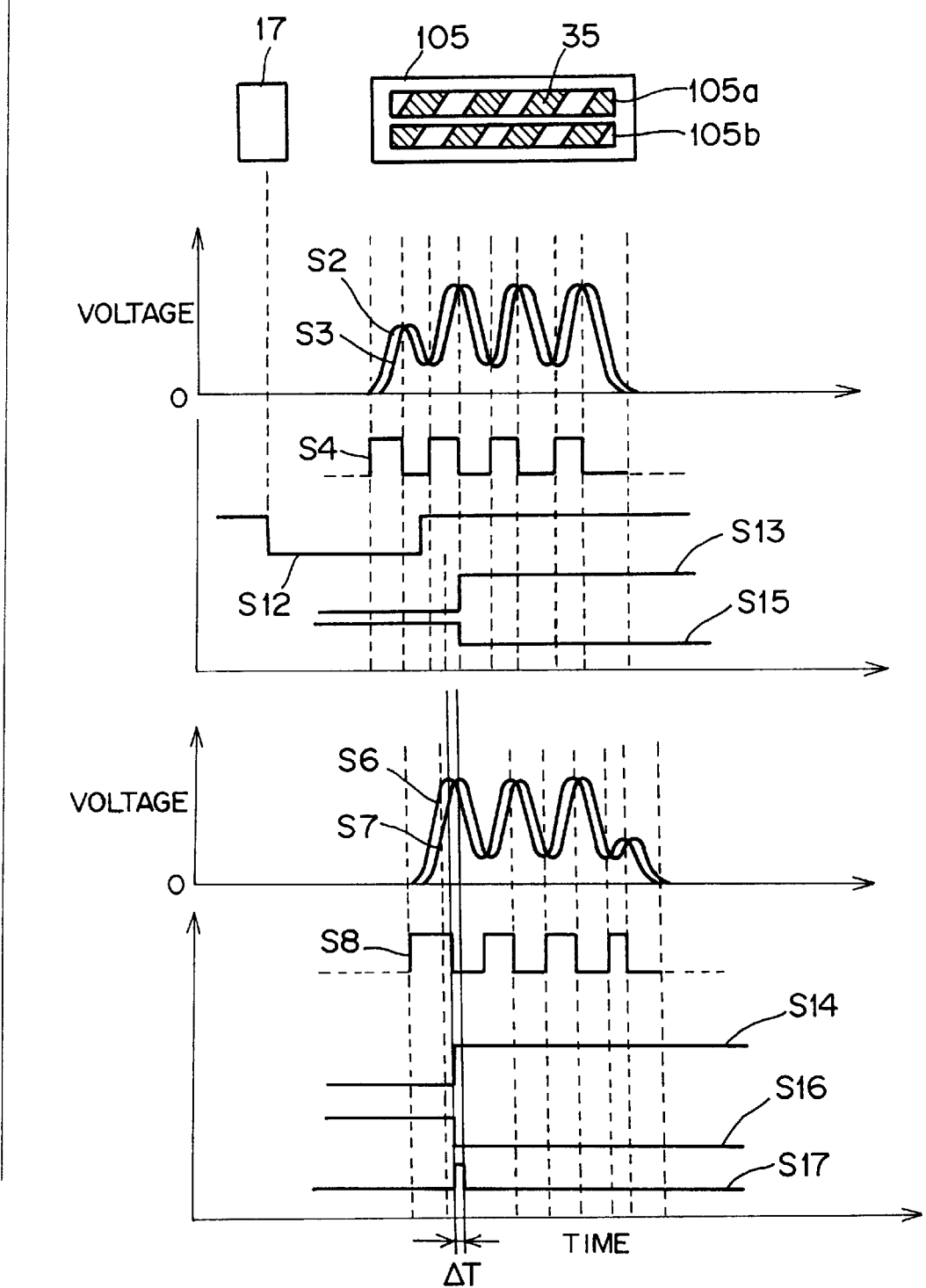
FIG. 22 is a timing chart of the control circuitry shown by FIG. 15.

As shown in FIG. 15, when the laser beam is incident to the SOS photosensor 17, a beam detection signal S10 is sent from the SOS photosensor 17 to the programmable timer 219. The programmable timer 219 is set in accordance with a data bus S11 from the microcomputer 220. The programmable timer 219 starts counting at a rising edge of the beam detection signal S10, and when the programmable timer 219 counts up, the timer 219 sends a signal S12 to clear input ports of the flip-flops 205 and 214. Thereby, the flip-flops 205 and 214 are cleared and become a low level. As shown in FIG. 22, the cleared flip-flops 205 and 214 change from the low level to a high level at dropping edges of the signals S4 and S8 respectively. In this mechanism, by setting the count value of the programmable timer 219 arbitrarily with the microcomputer 220, the pulse width of the signal S12 can be set arbitrarily, and a desired one of the Moire fringes 35 can be selected. FIG. 22 shows a case of selecting the second bright region from the left from the Moire fringes 35 projected on the light receiving surface 105a.

As described above, the beam detection signal S10 generated by the SOS photosensor 17 is also used as a signal for starting counting of the programmable timer 219, and this contributes to simplification and reduction of cost of the apparatus. Moreover, the position of the SOS photosensor 17 is fixed with respect to the photoelectric element 105, and even if the optical path of the laser beam shifts in the sub scanning direction, the position of a rising edge of the beam detection signal S10 does not shift. Accordingly, there is no fear that the count start timing of the programmable timer 219 fluctuates, and this Moire fringe selecting means is accurate.

As described above, the Moire fringe selection means uses the SOS photosensor 17, but other types of Moire fringe selecting means are possible. For example, as shown in FIGS. 20 and 21, it is possible to use a photoelectric element 113. The photoelectric element 113 is located near the photoelectric element 105, and the laser beam L reduced by the cylindrical lenses 103 and 104 is also incident to a light receiving surface 113a of the photoelectric element 113. In the case of FIG. 21, the photoelectric elements 105 and 113 are mounted on a board 115.

Referring to FIG. 15, the flip-flop 205 cleared by the signal S12 outputs a signal S13 through a Q port at a dropping edge of the signal S4. Likewise, the flip-flop 214 outputs a signal S14 through a Q port at a dropping edge of the signal S8.

By judging whether the time difference ΔT between the rise of the signal S13 and the rise of the signal S14 to be positive, negative or zero, the position of the image point can be recognized.

Next, a way of judging the time difference ΔT is described.

The flip-flop 205 outputs the signal S13 and an inverted signal S15, and the flip-flop 214 outputs the signal S14 and an inverted signal S16. The inverted signal S15 of the flip-flop 205 and the signal S14 of the flip-flop 214 are inputted to the AND element 206, and the AND element 206 outputs an AND signal S17. Likewise, the signal S13 of the flip-flop 205 and the inverted signal S16 of the flip-flop 214 are inputted to the AND element 215, and the AND element 215 outputs an AND signal S18.

In a state of front focus as shown in FIG. 22, the AND signal S17 from the AND element 206 is a short pulse signal with a pulse width of ΔT, and the AND signal S18 from the AND element 215 keeps at the low level. In short, (S17, S18)=(H, L). In a state of back focus, the signal S17 keeps at the low level, and the signal S18 is a short pulse signal with a pulse width of ΔT. In short, (S17, S18)=(L, H).

In a state of in-focus, the pulse width ΔT of the signal S17 or S18 is very short. Because of the IC characteristics (propagation delay times) of the AND elements 206 and 215, in this case, the signals S17 and S18 from the AND elements 205 and 214 do not come to the high level. In short, (S17, S18)=(L, L). The AND signals S17 and S18 are sent to the timers 207 and 216 respectively and outputted from the timers 207 and 216 as signals S19 and S20. Then, the signals S19 and S20 are inputted to the OR element 208, and the OR element 208 outputs an OR signal S21. The timers 207 and 216 lengthen the pulse widths ΔT of the AND signals S17 and S18 so as to facilitate the processing in the OR element 208.

The OR signal S21 is inputted to the AND element 209 through an input port. The AND element 209 receives a signal S22 from the microcomputer 220 through the other input port. An AND signal S23 outputted from the AND element 209 is a signal for turning on the stepping motor 21. The signal S20 outputted from the timer 216 is a signal for indicating forward or reverse rotation of the stepping motor 21.

As described above, even if the Moire fringes 35 shift in the main scanning direction b due to a shift of the laser beam in the sub scanning direction, one of the Moire fringes 35 which is located in the center of the light scanning surfaces 105a and 105b can be selected by the Moire fringe selecting means, and the inclination of the Moire fringes 35 can be detected accurately at all times.

The above-described focusing operation is carried out during intervals among pages in continuous page printing. According to the first embodiment, it can be judged whether the image point is before the scanning surface or after the scanning surface. Accordingly, the direction of the movement of the focusing lens 3 can be decided beforehand, and the focusing operation can be done for a very short time. Because the focusing operation is carried out every time one page is printed, a shift of the image point which occurs during printing of one page due to a change of the environments, etc. is small. Therefore, the shift of the image point may be corrected by a one-step movement of the focusing lens 3, and the focusing can be carried out for a very short time.

Structure and Function of the Delay Circuits 225 and 226

Generally, it is difficult to locate the beam detector 100 to detect vertical Moire fringes on the light receiving surfaces 105a and 105b of the photoelectric element 105 in the initial state (in a state of in-focus) because of errors in producing the members 101 through 105 and errors in fitting the members. However, if the output waves 107a and 107b of the light receiving surfaces 105a and 105b have the same phase in the initial state, signal processing is easy.

Figure 23:
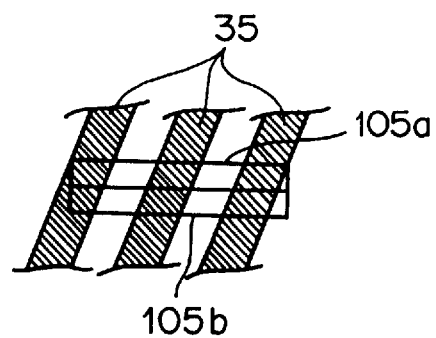
FIG. 23 is a front view of the light receiving surfaces of the beam detector when the Moire fringes slant in the initial state.
Figure 24:
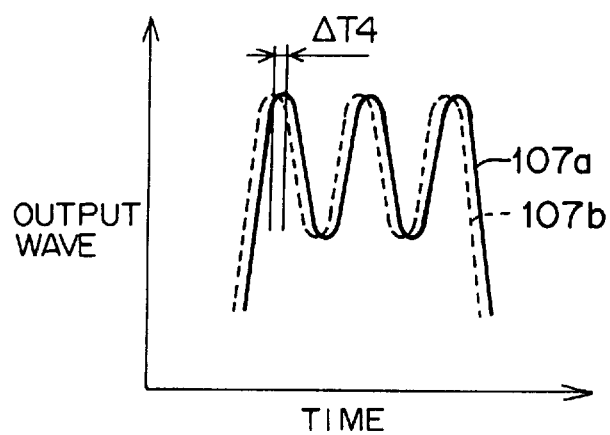
FIG. 24 is a graph which shows output waves of the beam detector in a case of FIG. 23.

In the first embodiment, for example, if the Moire fringes 35 slant to right or left in the initial state, the output waves of the light receiving surfaces 105a and 105b are processed to have the same phase electrically by use of the delay circuits 225 and 226. When the Moire fringes 35 slant to right as shown in FIG. 23, as shown in FIG. 24, the output waves 107a and 107b of the light receiving surfaces 105a and 105b have a time difference ΔT4 between crests. By adjusting the times in the delay circuits 225 and 226 to the time difference ΔT4, the crests of the output wave 107b are moved to the crests of the output wave 107a. Thereby, the signals S4 and S8 are inputted to the flip-flops 205 and 214 respectively at the same time. The signals after the flip-flops 205 and 214 can be processed as a state of in-focus.

Figure 25:
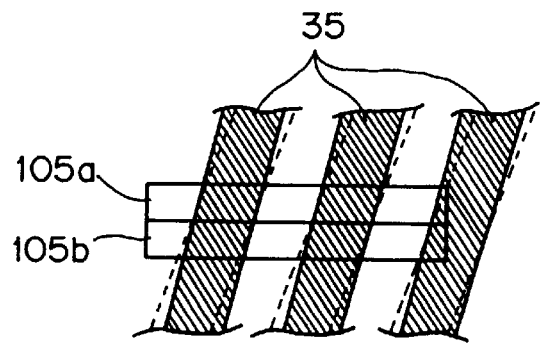
FIG. 25 is a front view of the light receiving surfaces of the beam detector which shows variations in the inclination of the Moire fringes.
Figure 26:
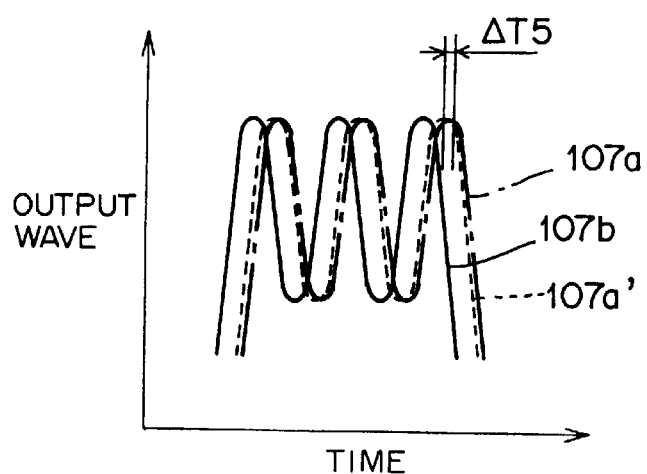
FIG. 26 is a graph which shows output waves of the beam detector in a case of FIG. 25.

There may be cases in which the inclination of the Moire fringes 35 in the initial state is too large to be corrected only by the above adjustment, and in these cases, the following adjustment can be adopted. As shown in FIG. 25, a target inclination (shown by solid line) of the Moire fringes 35 is determined beforehand. If the Moire fringes 35 in the initial state further slant (shown by dashed line in FIG. 25) with respect to the target inclination, as shown in FIG. 26, the output wave 107a' (shown by dashed line) and a target output wave 107a (shown by alternate long and short dash line) have a time difference ΔT5 between crests. By adjusting the delay times of the delay circuits 225 and 226 to the difference ΔT5, the crests of the output wave 107a' are moved to the crests of the output wave 107a. Then, the difference ΔT4 between the output waves 107a and 107b is offset electrically by use of other delay circuits or mechanically by use of a jig which will be described later.

Figure 27:
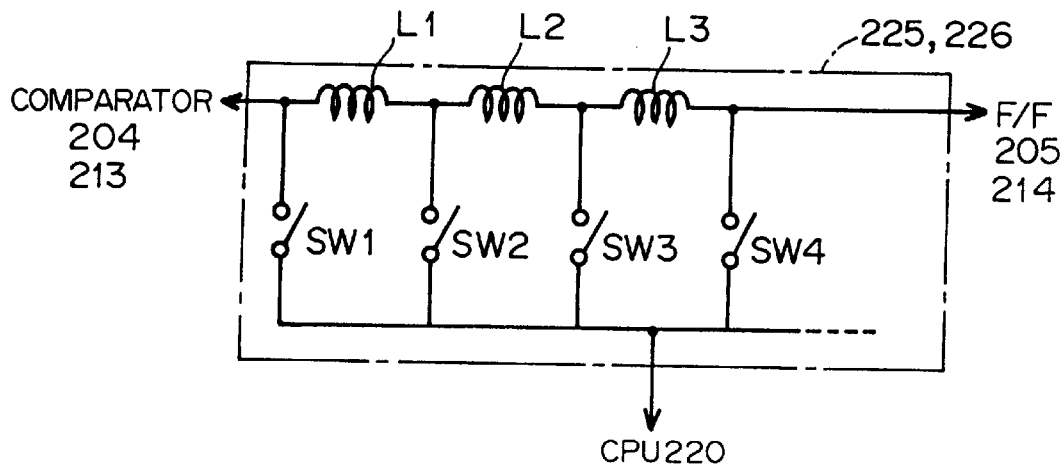
FIG. 27 is an electrical circuit diagram of a delay circuit.
Figure 28:
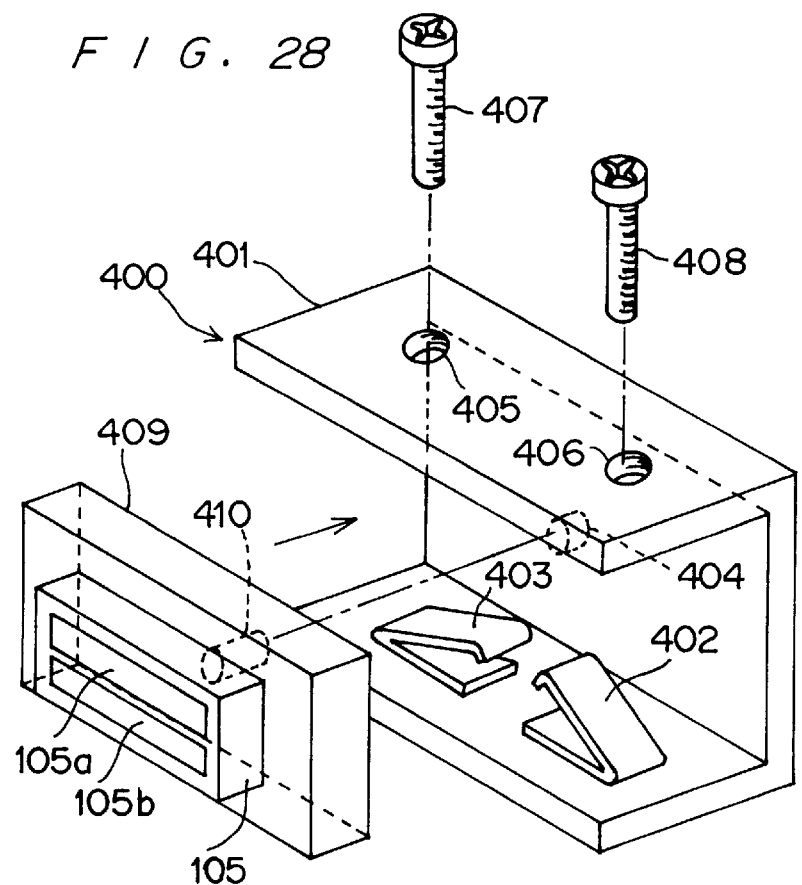
FIG. 28 is a perspective view of inclining means for inclining the photoelectric element along the direction of rotation of the Moire fringes.

FIG. 27 shows an exemplary structure of the delay circuits 225 and 226. Inductors L1, L2, L3 . . . are connected in series, and switches SW1, SW2, SW3, SW4 . . . are provided in diverging lines. Each of the switches is turned on or off controlled by the microcomputer 220, and thereby, the delay times set in the delay circuits 225 and 226 can be adjusted. For example, when the apparatus is sent from the factory, the output waves 107a and 107b of the light receiving surfaces 105a and 105b are monitored by an oscilloscope, and the switches SW1, SW2 . . . of the delay circuits 225 and 226 are turned on and off so that the differences ΔT4 and ΔT5 will be zero.

With the delay circuits 225 and 226, the output waves 107a and 107b in the initial state almost have the same phase, and a shift of the image point can be detected stably.

Adjustment of the Inclination of the Photoelectric Element 105

Means for correcting the phase difference between the output waves of the light receiving surfaces 105a and 105b in the initial state (a state of in-focus) does not have to be electrical means. For example, an adjusting jig 400 shown in FIG. 28 can be used. The adjusting jig 400 adjusts the inclination of the photoelectric element 105 to the inclination of the Moire fringes 35 so that the crests of the output waves 107a and 107b of the light receiving surfaces 105a and 105b will be in the same position.

The photoelectric element 105 is fitted to the adjusting jig 400 and is movable in the direction of rotation of the Moire fringes 35. The adjusting jig 400 comprises a fitting board 401 and a sensor holder 409. The fitting board 401 is in the shape of a U, and a pair of plate springs 402 and 403 are provided on a lower part of the fitting board 401. The fitting board 401 has a shaft hole 404 in a center part and has tapped holes 405 and 406 in an upper part. Screws 407 and 408 are fitted in the tapped holes 405 and 406 respectively. A shaft 410 is provided in the center of a back side of the sensor holder 409. The shaft 410 is fitted in the shaft hole 404. The photoelectric element 105 is fixed on a front side of the sensor holder 409 by screws, adhesive or the like.

Figure 29:
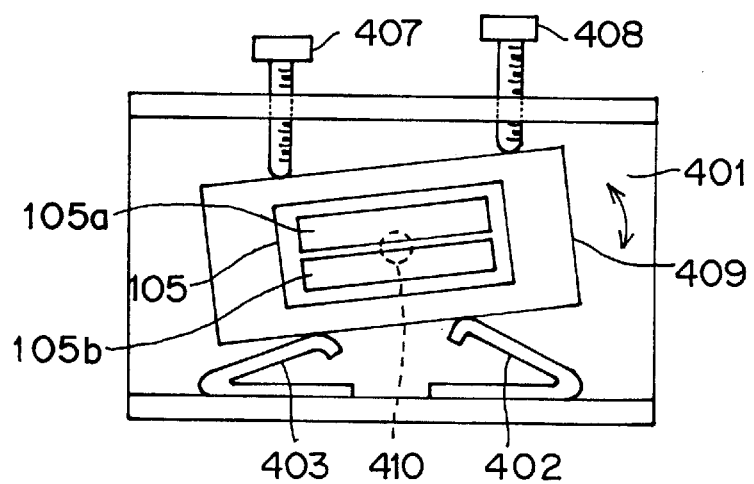
FIG. 29 is a front view of the inclining means of FIG. 28.

As shown in FIG. 29, the plate springs 402 and 403 are elastically in contact with a lower side of the sensor holder 409 and support the sensor holder 409. The screws 407 and 408 press an upper side of the sensor holder 409. By adjusting the amounts of screwing down the screws 407 and 408, the photoelectric element 105 pivots on the shaft 410.

Thus, the inclination of the photoelectric element 105 can be adjusted to the inclination of the Moire fringes 35. The amounts of screwing down the screws 407 and 408 are controlled by a micrometer or the like (not shown).

Figure 30:
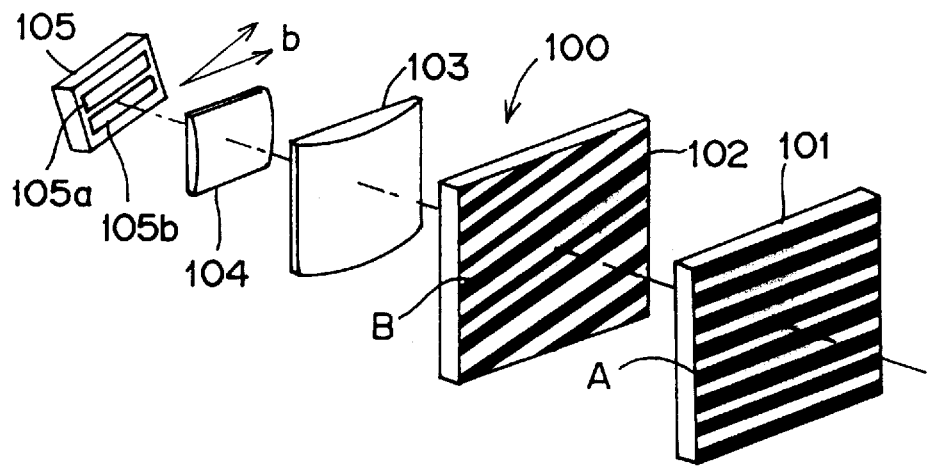
FIG. 30 is an exploded perspective view of the beam detector when the photoelectric element is inclined along the direction of rotation of the Moire fringes by the inclining means of FIG. 29.
Figure 31:
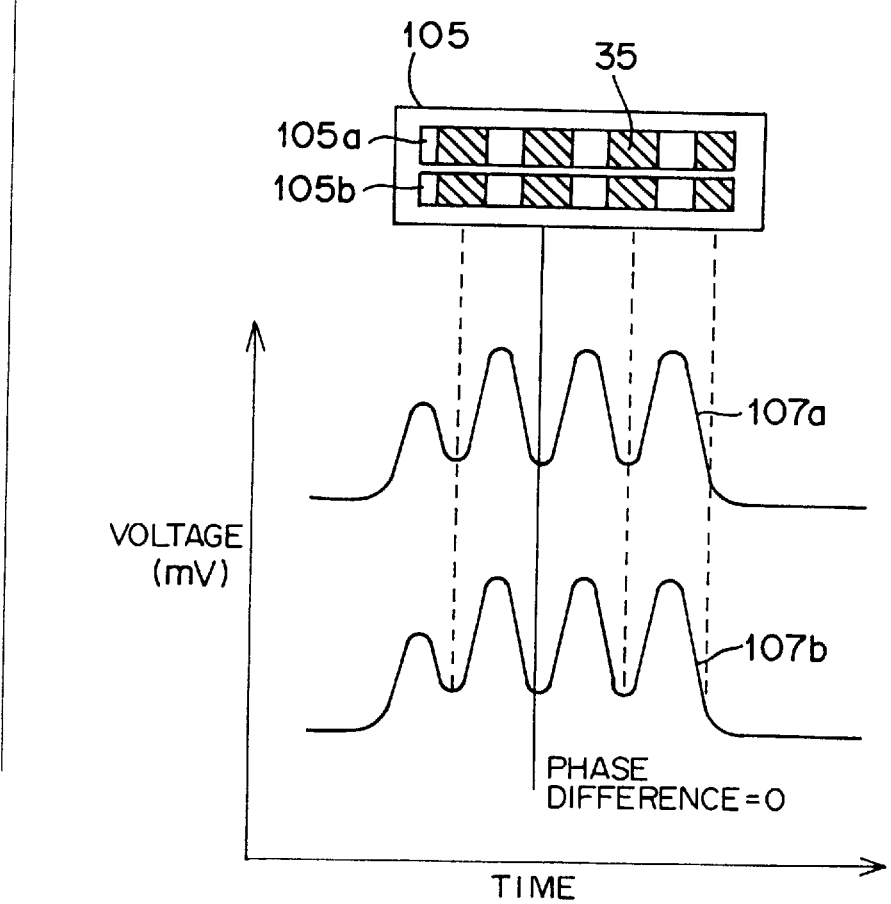
FIG. 31 is an illustration which shows the relationship between the Moire fringes and the photoelectric element in a state of in-focus.
Figure 32:
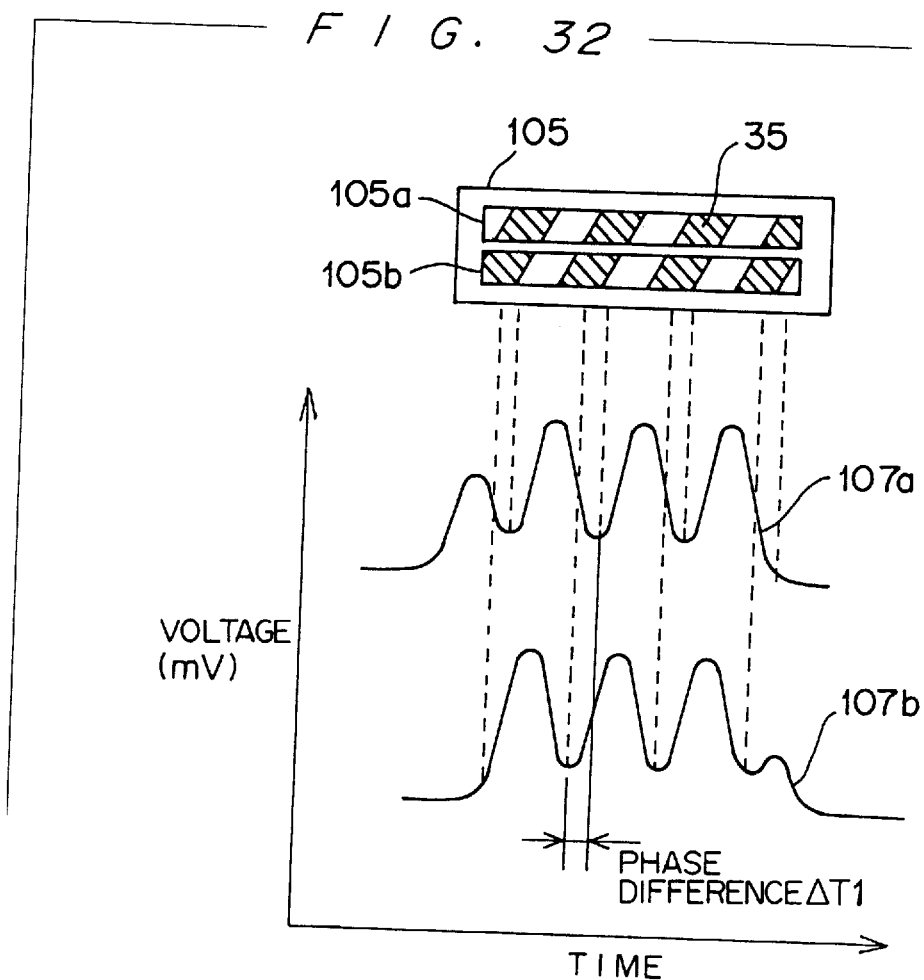
FIG. 32 is an illustration which shows the relationship between the Moire fringes and the photoelectric element in a state of front focus.
Figure 33:
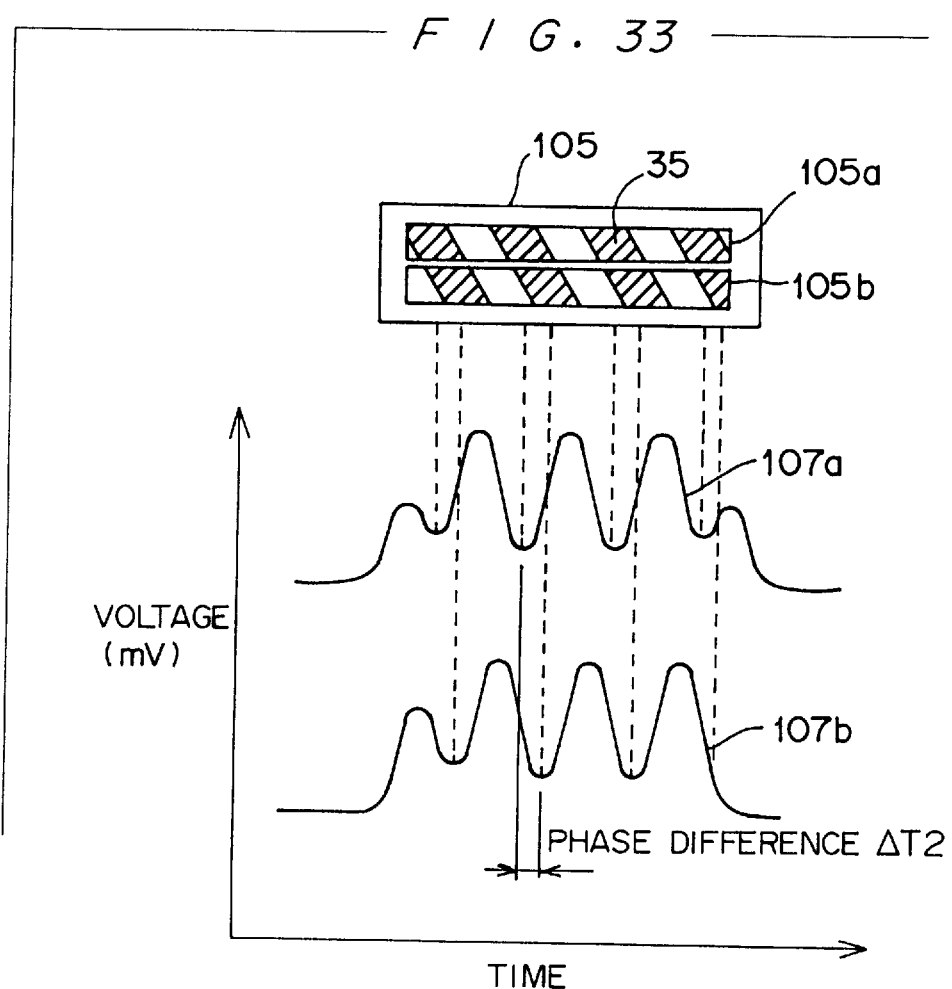
FIG. 33 is an illustration which shows the relationship between the Moire fringes and the photoelectric element in a state of back focus.

As shown in FIG. 30, with this arrangement, the inclination of the photoelectric element 105 can be adjusted to the inclination of the Moire fringes 35. Therefore, the accuracy of sizes of the members 101 through 105 of the beam detector 100 can be eased, and the setting of the initial state becomes easy. Also, this adjustment makes the output waves 107a and 107b of the light receiving surfaces 105a and 105b in the same phase, and therefore, signal processing becomes easy.

This is described referring to specific values. The beam detector 100 is designed to have the following values; the pitch $d_1$ of the spatial grating A is 125 $\mu$m; the pitch $d_2$ of the spatial grating B is 250 $\mu$m; the angle $\alpha$ of the spatial grating B to the spatial grating A is 4°; the distance $l_1$ between the image point in a state of in-focus and the spatial grating A is 40 mm; and the distance $l_2$ between the image point in a state of in-focus and the spatial grating B is 80 mm. In this case, the inclination of the Moire fringes 35 are calculated as follows by using the expression (5).

$$[\cos \alpha - \{(l_1 d_2)/(l_2 d_1)\}]/\sin \alpha = -0.035$$

Accordingly, tan $\phi$=−0.035, and $\phi$=−2°. Therefore, the inclination of the Moire fringes 35 is −88°.

It is supposed that the beam detector 100 actually has the following values because of errors in producing and fitting the members 101 through 105; the angle $\alpha$ of the spatial grating B to the spatial grating A is 3.8°; the distance $l_1$ between the image point in a state of in-focus and the spatial grating A is 40.2 mm; the distance $l_2$ between the image point in a state of in-focus and the spatial grating B is 79.8 mm. In this case, the inclination of the Moire fringes 35 is calculated as follows by using the expression (5).

$$[\cos \alpha - \{(l_1 d_2)/(l_2 d_1)\}]/\sin \alpha = -0.147$$

Accordingly, tan $\phi$=−0.147, and $\phi$=8.4°. The inclination of the Moire fringes 35 is larger than the designed value by 6.4. In this case, if the inclination of the photoelectric element 105 cannot be adjusted to the inclination of the Moire fringes 35, the output waves 107a and 107b of the light receiving surfaces 105a and 105b in the initial state will have a large phase difference, and setting and signal processing in the initial state will be complicated.

It is possible to fit a circuit board which mounts electronic parts of a signal processing circuit in the sensor holder 409. In this case, the photoelectric element 105 and the circuit board are integrally located. This eliminates the necessity of wiring a lot of signal lines from the photoelectric element 105, and thereby, the assembly of the beam detector 100 becomes easy.

On the other hand, the photoelectric element 105 and the circuit board can be located in different places. In this case, although a lot of signal lines wired from the photoelectric element 105 have to be extended through the sensor holder 409, there is an advantage that the electronic parts of the circuit board can be protected from heat radiated from the photoelectric element 105. Considering the heating value of the photoelectric element 105 and the heat resistance of the electronic parts, one of the above structures should be adopted.

Second Phase Difference Detecting Mechanism and Second Moire Fringe Selecting Means The phase difference detecting mechanism and the Moire fringe selecting means do not have to be the ones described above. A second phase difference detecting mechanism and second Moire fringe selecting means shown by FIGS. 31 through 35 can be adopted. In the second phase difference detecting mechanism and the second Moire fringe selection means, the position of the image point is judged from the phase difference between the troughs (dark regions of the Moire fringes 35) of the output wave of the light receiving surface 105a and those of the output wave of the light receiving surface 105b. The beam detector 100 is so structured that the Moire fringes 35 is perpendicular to the main scanning direction b in a state of in-focus (see FIG. 31), slant to right in a state of front focus (see FIG. 32) and slant to left in a state of back focus (see FIG. 33).

The inclination of the Moire fringes 35 can be judged from the phase difference between dark regions projected on the light receiving surface 105a and those projected on the light receiving surface 105b. More specifically, when the troughs of the output wave 107a of the light receiving surface 105a and the troughs of the output wave 107b of the light receiving surface 105b are in phase (see FIG. 31), a state of in-focus is judged. When the output wave 107b is ahead of the output wave 107a by ΔT1 (see FIG. 32), a state of front focus is judged. When the output wave 107a is ahead of the output wave 107b by ΔT2 (see FIG. 33), a state of back focus is judged.

Figure 34:
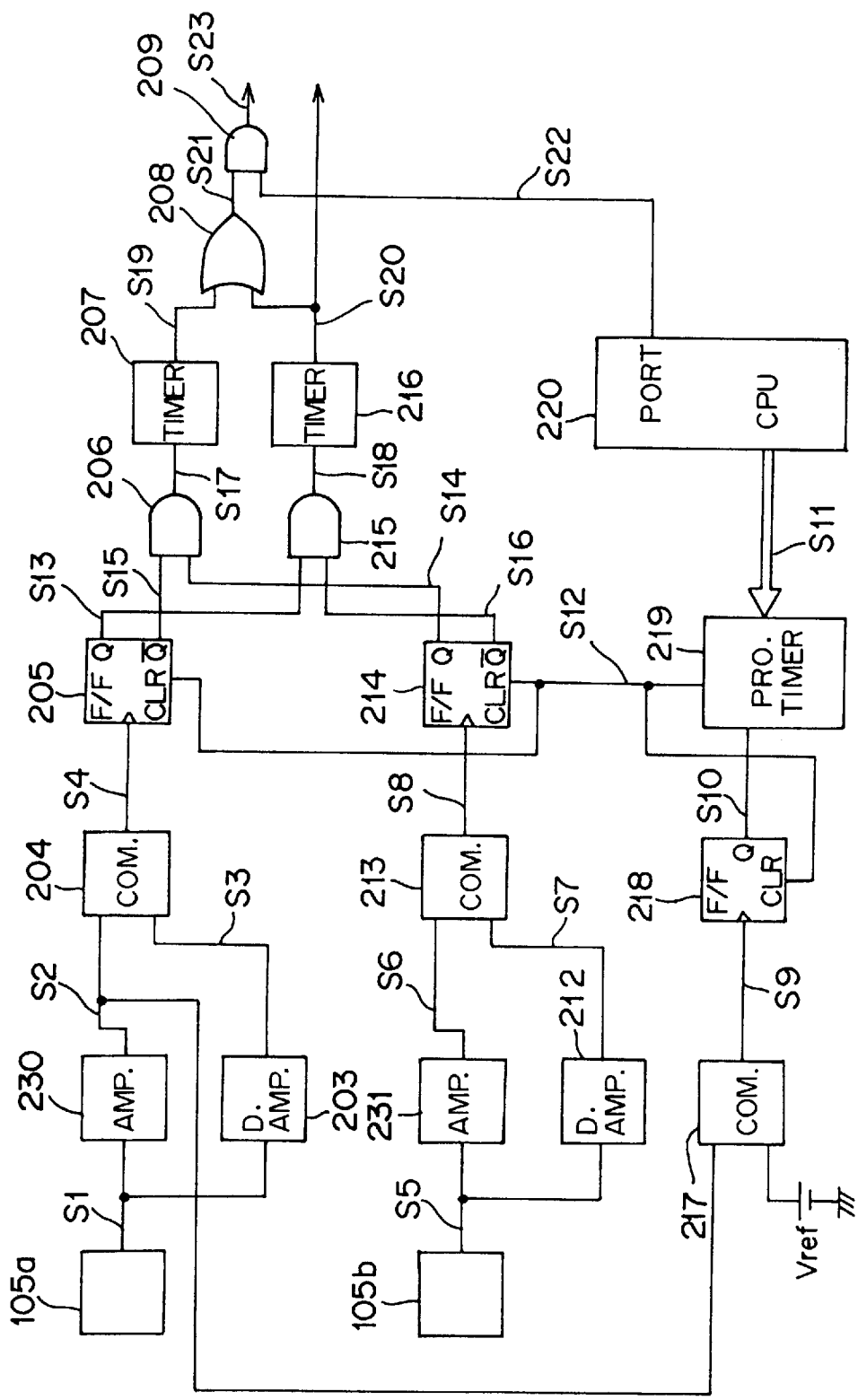
FIG. 34 is an electrical circuit diagram of a control circuitry of the beam detector shown by FIG. 2.

Referring to FIG. 34, processing of the output waves is described. The electrical circuitry shown by FIG. 34 comprises amplifiers 230 and 231, delay amplifiers 203 and 212, comparators 204 and 213, flip-flops 205, 214 and 218, AND elements 206, 209 and 215, timers 207 and 216, an OR element 208, a comparator 217, a programmable timer 219 and a microcomputer 220.

An output wave signal S1 of the light receiving surface 105a is amplified by the amplifier 230 and the delay amplifier 203, and the amplifier 230 and the delay amplifier 203 send wave signals S2 and S3 respectively to the comparator 204. The comparator 204 compares the wave signals S2 and S3 with each other and outputs a digital signal S4. Likewise, an output wave signal S5 of the light receiving surface 105b is amplified by the amplifier 231 and the delay amplifiers 212, and the amplifier 231 and the delay amplifier 212 send wave signals S6 and S7 respectively to the comparator 213. The comparator 213 compares the wave signals S6 and S7 with each other and outputs a digital signal S8.

Next, the second Moire fringe selecting means is described.

The amplified wave signal S2 from the amplifier 230 is also sent to the comparator 217. The comparator 217 compares the voltage of the wave signal S2 with a reference voltage $V_{ref}$ and outputs a wave signal S9. The wave signal S9 becomes a high level when the voltage of the wave signal S2 is larger than the reference voltage $V_{ref}$. The wave signal S9 is sent to the flip-flop 218. The flip-flop 218 sends a wave signal S10 to a programmable timer 219. The time set in the programmable timer 219 is controlled by a data bus S11 from the microcomputer 220.

The programmable timer 219 starts counting at a rising edge of the wave signal S10. When the programmable timer 219 counts up, the programmable timer sends a signal S12 to clear input ports of the flip-flops 205, 214 and 218. Thereby, the flip-flops 205, 214 and 218 are cleared and become a low level. Then, the cleared flip-flops 205, 214 and 218 change from the low level to a high level at a rising edge of the respective signals S4, S8 and S9. By setting the time of the programmable timer 219 arbitrarily by use of the microcomputer 220, the signal S12 with a desired pulse width can be outputted, and a desired one of the Moire fringes 35 can be selected as a sample for detection. In the first embodiment, the second from the left is selected from the Moire fringes 35 projected on the light receiving surface 105a (see FIG. 35).

The flip-flop 205, after being cleared by the signal S12, outputs a signal S13 from a Q output port at a rising edge of the signal S4. Likewise, the flip-flop 214 outputs a signal S14 at a rising edge of the signal S8.

By judging the difference $\Delta T$ between the time of rising of the signal S13 and the time of rising of the signal S14 whether to be plus, to be minus or to be zero, the position of the image point can be detected. The judgment of the difference $\Delta T$ is carried out in the same way as the first phase difference detecting mechanism.

Modification of the Photoelectric Element and the Reducing Optical System

In the first embodiment, as the photoelectric element, a two-segmented photodiode 105 with two light receiving surfaces 105a and 105b is used. However, any number of photoelectric elements of any type can be used as long as at least two light receiving surfaces can be obtained. For example, as shown in FIG. 36, a combination of photodiodes 116a, 116b and 116c each of which has one light receiving surface can be used.

Figure 38:
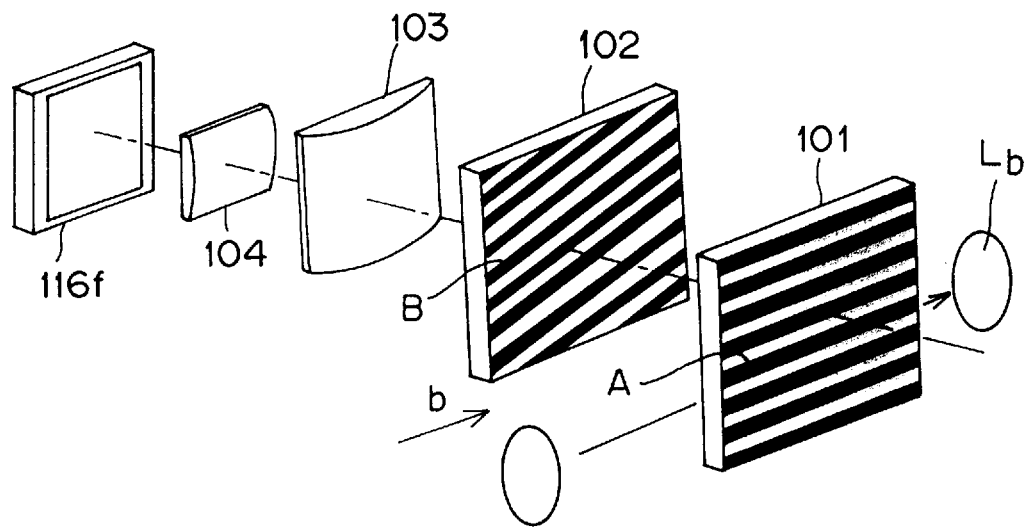
FIG. 38 is an exploded perspective view of the beam detector with another modified photoelectric element.

As shown in FIG. 37, two linear line sensors 116d and 116e can be used. The linear line sensors 116d and 116e are located side by side in the sub scanning direction c with a specified space in-between above and below the center of rotation of the Moire fringes, and each of the linear line sensors 116d and 116e extends in the main scanning direction b. The laser beam L which passed through the grating filters 101 and 102 is converged by the cylindrical lenses 103 and 104 and forms Moire fringes which extend to the linear line sensors 116d and 116e. By detecting the distance between a crest of the output wave of the sensor 116d and a corresponding crest of the output wave of the sensor 116e, a change of the inclination of the Moire fringes can be recognized. Also, as shown in FIG. 38, an area CCD (Charge Coupled Device) 116f can be used. In this case, more information can be collected, and a shift of the image point can be detected more accurately. More specifically, the intervals in the main scanning direction between bright regions of the Moire fringes are measured in a plurality of lines, and the average is calculated.

Figure 39:
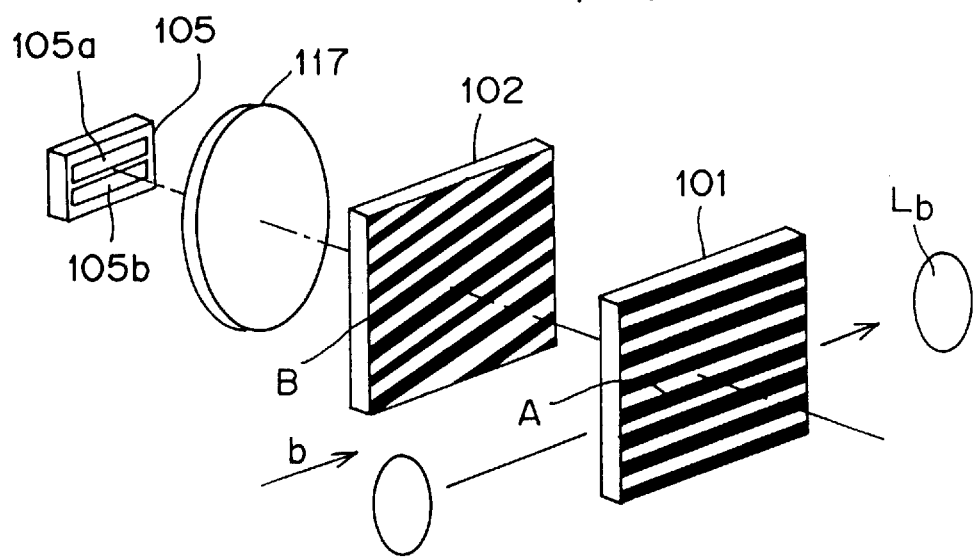
FIG. 39 is an exploded perspective view of the beam detector with a modified reducing optical system.

As the reducing optical system, as shown in FIG. 39, a positive lens 117 can be used. The positive lens 117 has a power in the main scanning direction b and a power in the sub scanning direction c. The laser beam L which passed through the grating filters 101 and 102 is converged by the positive lens 117 and forms Moire fringes on the light receiving surfaces 105a and 105b of the photoelectric element 105. The positive lens 117 may be an anamorphic lens which has different powers in the main scanning direction b and in the sub scanning direction c.

Second Embodiment: FIGS. 40 through 45

As described in the first embodiment, if the optical path of the laser beam shifts in the sub scanning direction due to a change of the environments such as temperature and humidity, the peak values of the two output waves of the photoelectric element become different (see FIGS. 18 and 19), and the detection of the phase difference $\Delta T$ may become unstable. In order to solve this problem, the first embodiment adopts a mechanism for equalizing the peak values of the two output waves by use of variable amplifiers, peak-hold circuits and a differential circuit.

The second embodiment adopts another mechanism for equalizing the peak values of the two output waves in order to detect the phase difference $\Delta T$ accurately at all times. A laser beam scanning optical apparatus of the second embodiment is of the same structure as the first embodiment except the beam detector and the control circuitry, and the description of the structure of the apparatus is omitted.

Figure 40:
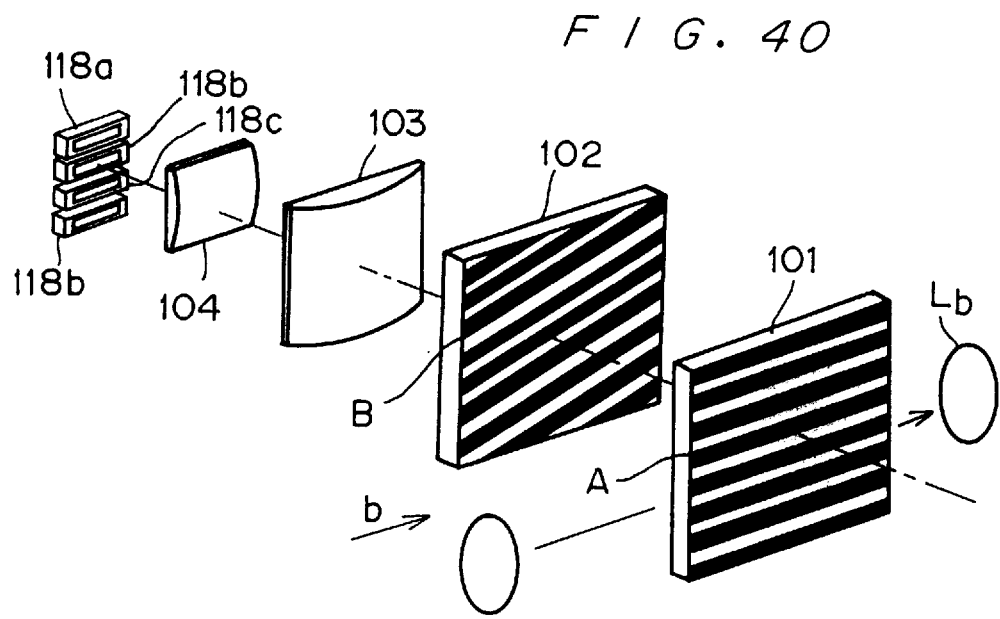
FIG. 40 is an exploded perspective view of a beam detector of a laser beam scanning optical apparatus which is a second embodiment of the present invention.

As shown in FIG. 40, in the second embodiment, the beam detector has four photoelectric elements 118a, 118b, 118c and 118d. The photoelectric elements 118a through 118d are photodiodes or the like which are located side by side in the sub scanning direction c with spaces thereamong above and below the center of rotation of the Moire fringes, and each of the photoelectric elements 118a through 118d extends in the main scanning direction b. This beam detector is located near a position optically equivalent to the scanning surface. The spatial grating A is parallel to the main scanning direction b, and the spatial grating B slightly slants with respect to the main scanning direction b. The laser beam L which passed through the grating filters 101 and 102 is converged by the cylindrical lenses 103 and 104 and forms Moire fringes which extend to the four photoelectric elements 118a through 118d.

Figure 41:
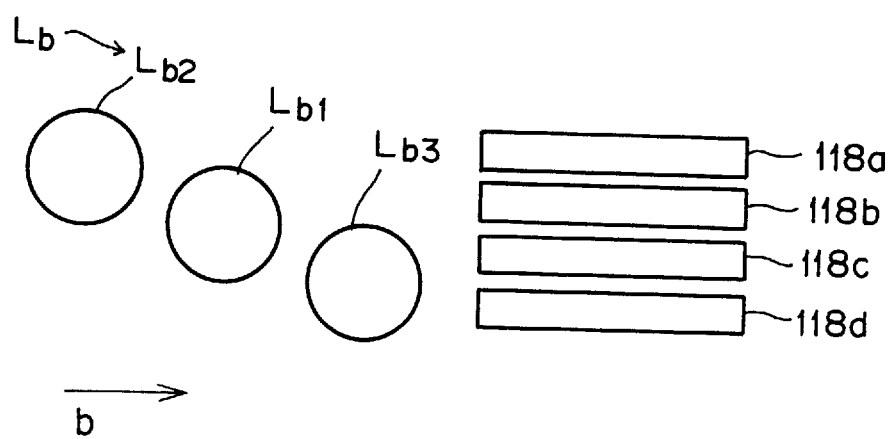
FIG. 41 is an illustration of positional relationships between the laser beam spot and light receiving surfaces of the photoelectric element.

Usually, in the initial state (a state of in-focus), the center of the laser beam spot Lb is positioned between the photoelectric element 118b and 118c (see $Lb_1$ of FIG. 41). In this case, as shown in FIG. 42, output waves 119b and 119c of the photoelectric element 118b and 118c have high peak values, and the peak values of the output waves 119b and 119c are substantially equal. On the other hand, output waves 119a and 119d have low peak values. Therefore, in this case, the output waves 119b and 119c are used to detect the phase difference $\Delta T$.

When the environments change, the optical path of the laser beam L shifts in the sub scanning direction. If the beam spot Lb comes to a position $Lb_2$ in FIG. 41, the output waves 119a and 119b have high and substantially equal peak values as shown in FIG. 43. In this case, the output waves 119a and 119b are used to detect the phase difference $\Delta T$. If the beam spot Lb comes to a position $Lb_3$ in FIG. 41, the output waves 119c and 119d have high and substantially equal peak values as shown in FIG. 44. In this case, the output waves 119c and 119d are used to detect the phase difference $\Delta T$.

Referring to FIG. 45, processing of the output waves 119a through 119d is described. The electrical circuitry shown by FIG. 45 comprises amplifiers 232 and 233, peak-hold circuits 235a, 235b, 235c and 235d, a switch group SW (SW5 through SW10), etc.

The output waves 119a through 119d of the photoelectric elements 118a through 118d are inputted into the peak-hold circuits 235a through 235d respectively. The peak-hold circuits 235a through 235d hold the peak values (maximum voltages) of the output waves 119a through 119d respectively, and the peak values are sent to the microcomputer 220. The microcomputer 220 selects adjacent two photoelectric elements which have high peak values. Then, the microcomputer 220 outputs a control signal S32 so that only the output waves of the selected photoelectric elements will be inputted into the amplifiers 232 and 234, and the delay amplifiers 203 and 212.

The control signal S32 is sent to the switch group SW, and the switches SW5 through SW10 are turned on and off in accordance with the control signal S32. For example, when the laser beam spot shifts to the position $Lb_2$ shown in FIG. 41, the output waves 119a and 119b have high peak values (see FIG. 43). Therefore, the microcomputer 220 selects the photoelectric elements 118a and 118b, and the control signal S32 in this case turns on the switches SW5 and SW7 and turns off the switches SW6, SW8, SW9 and SW10. Thereby, the output wave 119a of the photoelectric element 118a is sent to the amplifier 232 and the delay amplifiers 203, and the output wave 119b of the photoelectric element 118b is sent to the amplifier 233 and the delay amplifier 212. Then, in the same manner as the first embodiment, the phase difference $\Delta T$ of the output waves 119a and 119b is measured, and focusing is carried out.

Thus, even if the optical path of the laser beam L shifts in the sub scanning direction, by selecting two output waves which have high peak values from the output waves 119a through 119d of the photoelectric elements 118a through 118d, the phase difference $\Delta T$ can be detected accurately.

Figure 46:
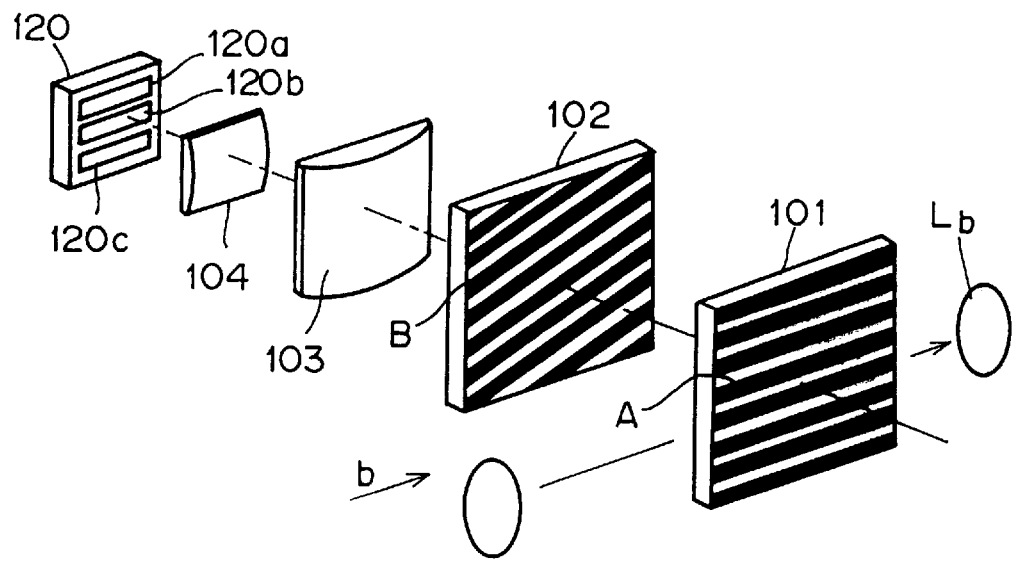
FIG. 46 is an exploded perspective view of the beam detector with a modified photoelectric element.
Figure 47:
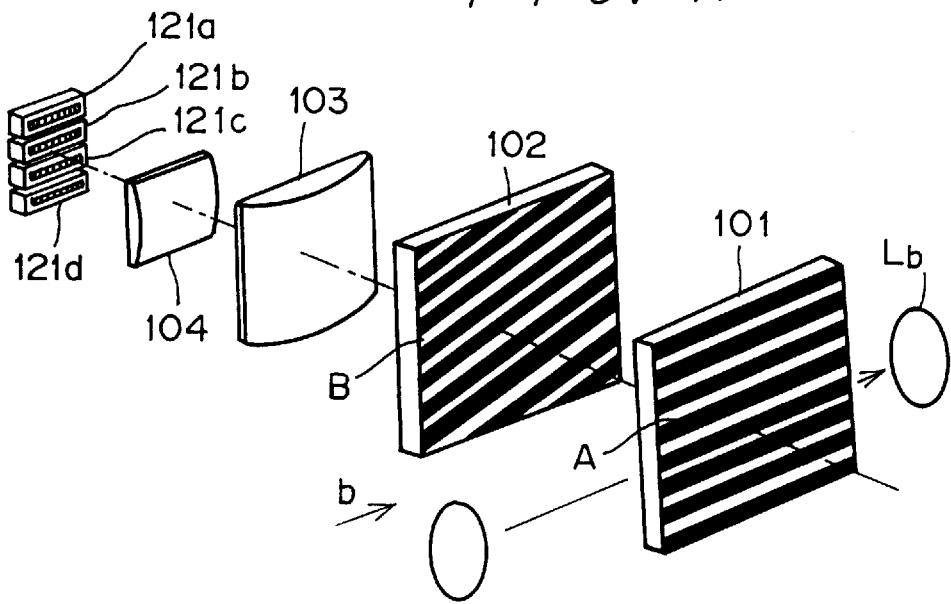
FIG. 47 is an exploded perspective view of the beam detector with another modified photoelectric element.

Although four photoelectric elements are used in the second embodiment, any number of photoelectric elements can be used as long as at least three light receiving surfaces can be obtained. For example, as shown in FIG. 46, a three-segmented photodiode 120 which has three light receiving surfaces 120a, 120b and 120c can be used. Also, as shown in FIG. 47, four linear line sensors 121a, 121b, 121c and 121d can be used. In this case, two output waves which have high peak values are selected from output waves of the four linear line sensors 121a through 121d, and the distance between a crest of a selected output wave and a corresponding crest of the other selected output wave is detected.

Figure 48:
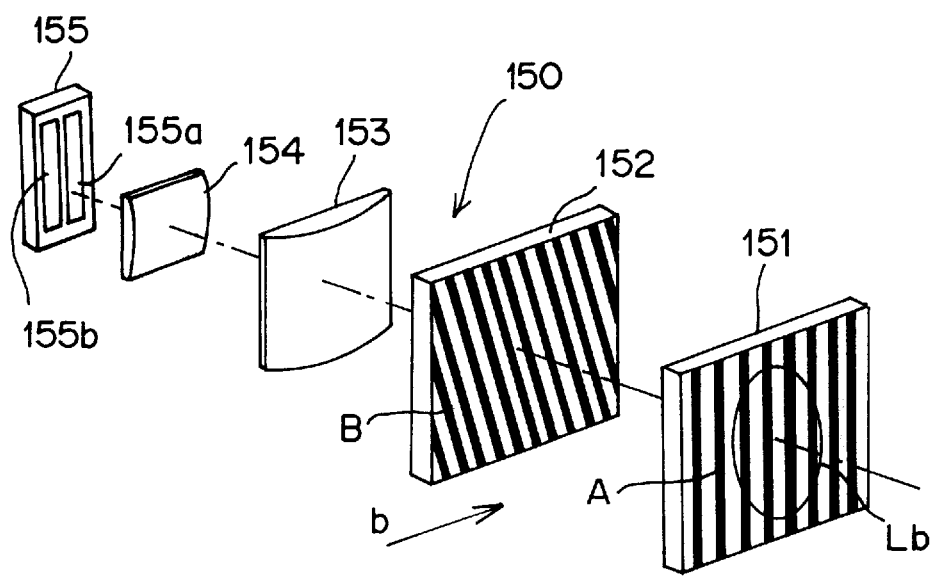
FIG. 48 is an exploded perspective view of a beam detector of a laser beam scanning optical apparatus which is a third embodiment of the present invention.
Figure 49:
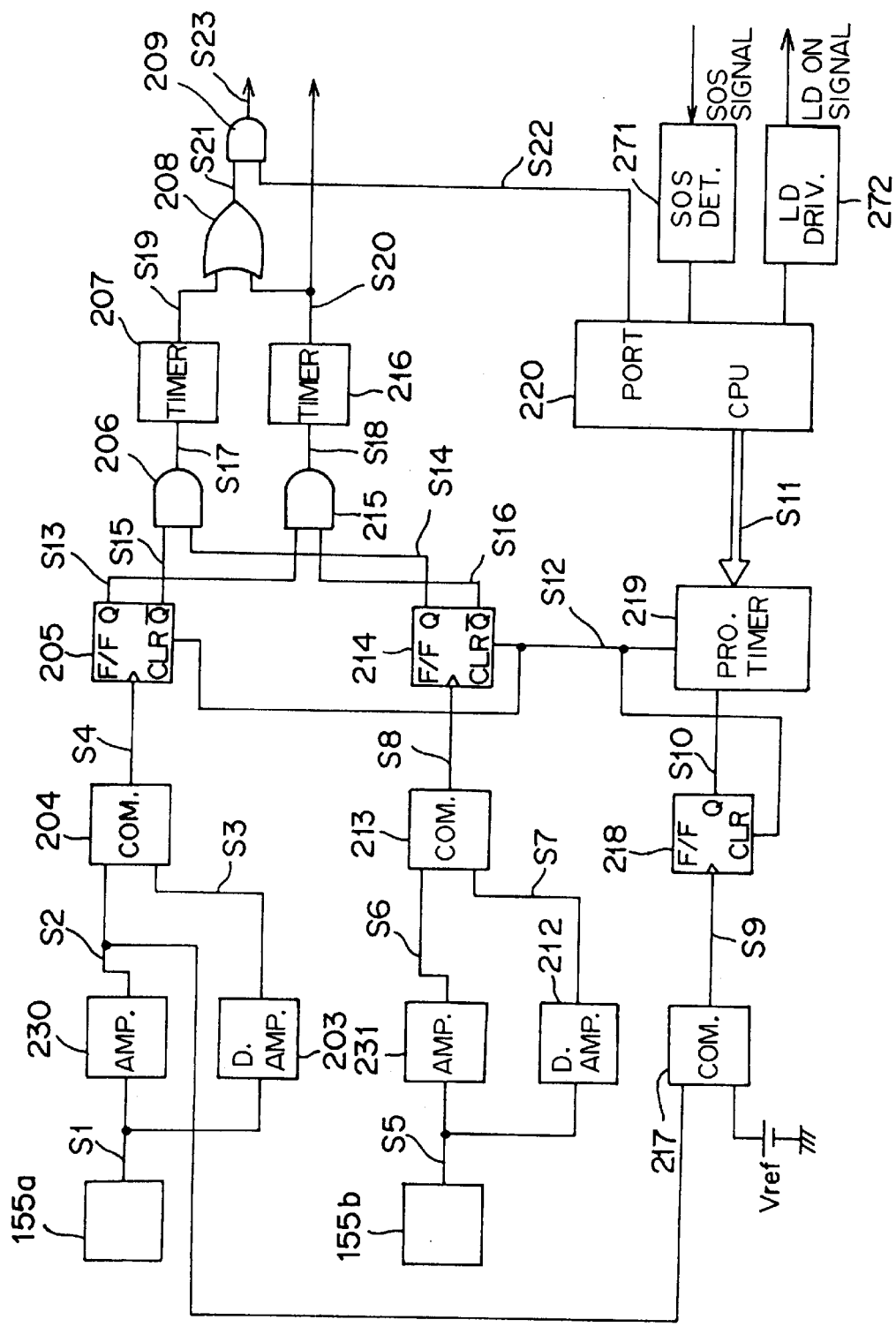
FIG. 49 is an electrical circuit diagram of a control circuitry of the beam detector shown by FIG. 48.

Third Embodiment: FIGS. 48 through 50

A third embodiment is a laser beam scanning optical apparatus which can detect a shift of the image point in the sub scanning direction. The laser beam scanning optical apparatus of the third embodiment is of the same structure as the first embodiment (especially one with the second phase difference detecting mechanism and the second Moire fringe selecting means) except the beam detector and the light source control section, and the description of the structure of the apparatus is omitted.

As shown in FIG. 48, a beam detector 150 is located outside an image forming area near a position optically equivalent to the scanning surface. The beam detector 150 comprises grating filters 151 and 152, cylindrical lenses 153 and 154, and a photoelectric element 155, and these members 151 through 155 are arranged along the optical axis. The grating filter 151 has spatial grating A which is parallel to the sub scanning direction c, and the grating filter 152 has spatial grating B which slants slightly with respect to the sub scanning direction c. The pitch error of the spatial grating B fulfills the conditions shown by expressions (10) and (11) described in the first embodiment.

The cylindrical lenses 153 and 154, which form a reducing optical system, have a power in the main scanning direction b and a power in the sub scanning direction c respectively. The laser beam L which passed through the grating filters 151 and 152 is converged by the cylindrical lenses 153 and 154 and forms Moire fringes on light receiving surfaces 155a and 155b of the photoelectric element 155.

The photoelectric element 155 is a two-segmented photodiode with two light receiving surfaces 155a and 155b which extend parallel to the sub scanning direction c.

If the laser beam L scanned in the main scanning direction b is continuously incident to the grating filters 151 and 152, the following problem will occur. As the laser beam L is scanned, the Moire fringes slightly shifts in the main scanning direction b as described in the first embodiment (see FIG. 4). Therefore, in order to detect the inclination of the Moire fringes accurately, a photoelectric element which can sample the Moire fringes for a very short time is necessary. However, such a photoelectric element is expensive, thereby raising the cost.

In order to solve the problem, in the third embodiment, the laser diode 1 is controlled to emit a laser beam for only one picture element as a light incident to the grating filters 151 and 152. This control is hereinafter referred to as a fixed point emission method. In this method, since the grating filters 151 and 152 receive the laser beam L for only one picture element, the Moire fringes projected on the light receiving surfaces 155a and 155b do not shift, and an expensive photoelectric element is not necessary.

Referring to FIGS. 49 and 50, the fixed point emission method is described. As shown in FIG. 49, the light source control section comprises an SOS detection circuit 271 and a laser diode (LD) driving circuit 272. Since the control circuitry shown by FIG. 49 is of the same structure as the control circuitry of the first embodiment shown by FIG. 34 except the SOS detection circuit 271 and the LD driving circuit 272, the detailed description of the control circuitry is omitted. A beam detection signal (SOS signal) generated from the SOS photosensor 17 is inputted into the microcomputer 220 through the SOS detection circuit 271. The microcomputer 220 outputs an LD control signal to the LD driving circuit 272. A programmable timer (not shown) of the LD driving circuit 272 starts counting in accordance with the LD control signal. In the programmable timer, a time T1 for timing turning on the laser diode 1 and a time T2 for timing turning off the laser diode 1 are set. The times T1 and T2 are calculated from the speed of rotation of the polygon mirror 6.

The difference between the time T1 and the time T2 corresponds to a one-picture element emission time of the laser diode 1. As shown in FIG. 50, when the programmable timer counts up the time T1, the LD driving circuit 272 sends an auto-focus LD on signal to the laser diode 1 to turn on the laser diode 1. Then, when the one-picture element emission time passes, that is, when the programmable timer counts up the time T2, the laser diode 1 is turned off. Thus, the laser diode 1 emits a light for one picture element outside the image forming area in accordance with the auto-focus LD on signal, and the emitted beam is received by the beam detector 150. In FIG. 50, an image area signal is a signal which controls modulation (on and off) of the laser diode 1 in accordance with print data, and an SOS period is the period of the SOS signal.

In this structure, the light receiving surfaces 155a and 155b output wave signals, and a shift of the image point is recognized from the waveforms of the signals. More specifically, by detecting the phase difference between the waves, a change of the inclination of the Moire fringes can be recognized. Consequently, the amount of a shift of the image point in the sub scanning direction c can be detected, and it can be judged whether the shift of the image point is one before the scanning surface or one after the scanning surface.

Fourth Embodiment; FIGS. 51 through 57

If in a laser beam scanning optical apparatus, the image point is apt to shift only before or after the scanning surface, it is not necessary to judge whether a shift of the image point is one before the scanning surface or one after the scanning surface.

In such a laser beam scanning optical apparatus, a simpler mechanism for detecting a shift of the image point can be adopted. The following description of the fourth embodiment is about an apparatus in which the image point is apt to shift before the scanning surface. Since the laser beam scanning optical apparatus of the fourth embodiment is of the same structure as the first embodiment except the beam detector and the control circuitry, the description of the structure is omitted.

As shown in FIG. 51, a beam detector 160 is located near a position optically equivalent to the scanning surface. The beam detector 160 comprises grating filters 161 and 162, cylindrical lenses 163 and 163, and a photoelectric element 165, and these members 161 through 165 are arranged along the optical axis. The grating filter 161 has spatial grating A which is parallel to the main scanning direction b, and the grating filter 162 has spatial grating B which slants slightly with respect to the main scanning direction b.

The cylindrical lenses 163 and 164, which form a reducing optical system, have a power in the main scanning direction b and a power in the sub scanning direction c respectively. The laser beam L which passed through the grating filters 161 and 162 is converged by the cylindrical lenses 163 and 164 and forms Moire fringes 35 on a light receiving surface of the photoelectric element 165. The photoelectric element 165 is an area CCD which can collect a lot of information. In a plurality of lines, the interval between bright regions of the Moire fringes 35 is measured, and the average of the measured values is calculated. Therefore, a detection error can be minimized.

In a state of in-focus, the Moire fringes 35 are perpendicular to the main scanning direction b as shown in FIG. 52, and bright regions of the Moire fringes 35 in the main scanning direction b are at an interval of $Q_1$. In a state of front focus, the Moire fringes 35 slant to right as shown in FIG. 53, and bright regions of the Moire fringes 35 in the main scanning direction b are at an interval of $Q_2$ which is larger than the interval $Q_1$. The difference between $Q_2$ and $Q_1$, that is, $Q_2-Q_1$ is calculated, and the focusing lens 3 is moved along the optical axis in accordance with the difference. Even if the laser beam shifts in the sub scanning direction c, thereby moving the Moire fringes 35 projected on the photoelectric element 165 in the main scanning direction b, the interval $Q_2$ of bright regions of the Moire fringes 35 does not change. Therefore, there is no possibility of a detection error.

Figure 54:
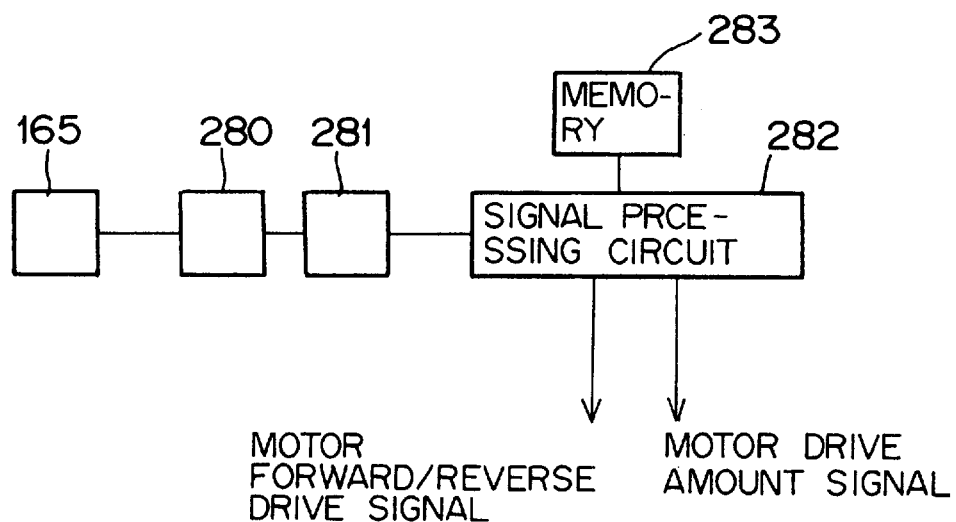
FIG. 54 is an electrical circuit diagram of a control circuitry of the beam detector shown by FIG. 51.

Referring to FIG. 54, a way of processing signals is described. The electrical circuitry shown by FIG. 54 comprises a CCD driver 280, an A/D converter 281, a signal processing circuit 282 and a memory 283. The CCD driver 280 and the A/D converter 281 are conventional, and the description of these members is omitted.

Figure 55:
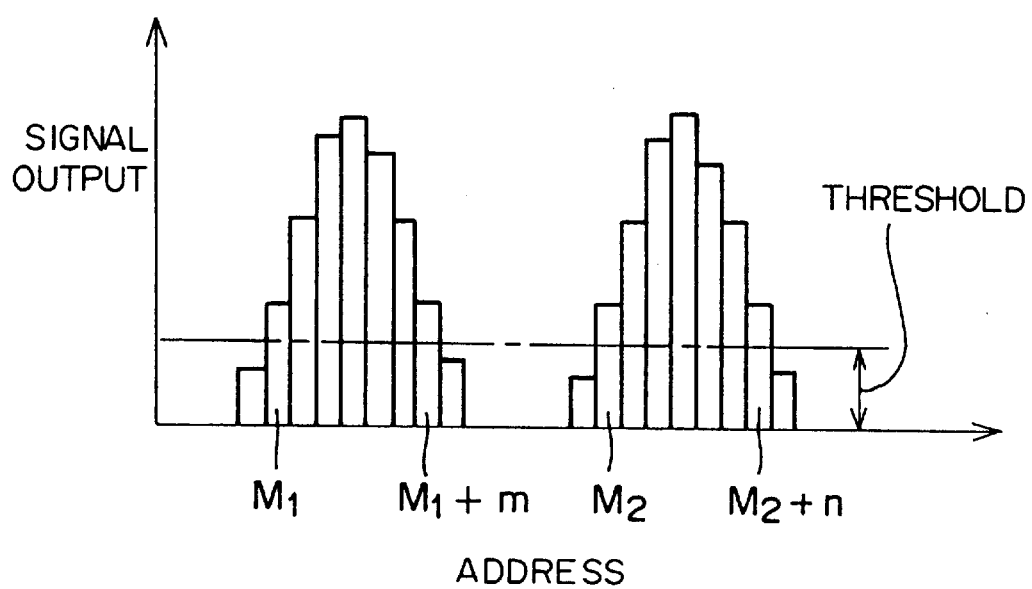
FIG. 55 is a graph which shows a signal output of the beam detector.

The output wave of the photoelectric element 165 is processed in the CCD driver 280 and the A/D converter 281, and is inputted to the signal processing circuit 282 in serial as a signal output as shown in FIG. 55. In the signal processing circuit 282, centers of bright regions (crests) of the Moire fringes 35 are recognized as follows. The address where the signal output comes over a threshold level for the first time (Address $M_1$) is stored in the memory 283. Next, addresses from the Address M1 to the address where the signal output comes below the threshold level again are counted as m. Then, the address of the peak of the first bright region of the Moire fringes 35, that is, $M_1+(m/2)$ is stored in the memory 283. The peak of the second bright region of the Moire fringes 35 is recognized in the same way. The address where the signal output comes over the threshold level for the second time (Address $M_2$) is stored in the memory 283, and addresses from the Address $M_2$ to the address where the signal output comes below the threshold level again are counted as n. Then, the address of the peak of the second bright region of the Moire fringes 35, that is, $M_2+(n/2)$ is stored in the memory 283.

Next, $\{M_1+(m/2)\}-\{M_2+(n/2)\}$ is calculated, and thus, the interval $Q_2$ between bright regions of the Moire fringes 35 in the main scanning direction b is calculated. Then, the difference between the interval $Q_2$ and the interval $Q_1$ in a state of in-focus, that is, $(Q_2-Q_1)$ is calculated. Depending on the plus or minus of $(Q_2-Q_1)$, the direction of the drive of the stepping motor 21 is decided, and depending on the absolute value of $(Q_2-Q_1)$, the amount of the drive of the stepping motor 21 is decided. Then, the signal processing circuit 282 sends a motor forward/reverse drive signal and a motor drive amount signal to the stepping motor 21 via the focusing lens driving circuit 26. Accordingly, the focusing lens 3 is moved along the optical axis, whereby the image point comes onto the scanning surface.

Referring to specific values, this is further described. The beam detector 160 is supposed to have the following values: the pitch $d_1$ of the spatial grating A is 125 μm; the pitch $d_2$ of the spatial grating B is 250 μm; the angle α of the spatial grating B to the spatial grating A is 4°; the distance $l_1$ between the image point in a state of in-focus and the spatial grating A is 40 mm; the distance $l_2$ between the image point in a state of in-focus and the spatial grating B is 80 mm; and the distance $l_3$ between the image point in a state of in-focus and the photoelectric element 165 is 90 mm. In this case, the inclination of the Moire fringes 35 is calculated as follows by using the expression (5) described in the first embodiment.

$$[\cos\alpha - \{(l_1 d_2)/(l_2 d_1)\}]/\sin\alpha = -0.035$$

Accordingly, $\tan\phi=-0.035$, and $\phi=-2°$. Therefore, the inclination of the Moire fringes 35 is −88°.

The interval $Q_1$ between bright regions of the Moire fringes 35 in a state of in-focus is expressed as $f=l_3 d_1/l_1$ and is calculated as follows by using the expression (6) and the expression $Q_1=P_1/\cos\phi$.

$$\begin{aligned}Q_1 &= P_1/\cos\phi \quad (12)\\ &= \{(f/\sin\alpha)\times\cos(\phi-\alpha)\}/\cos\phi\\ &= 4.01 \text{ (mm)}\end{aligned}$$

If the image point shifts by Δl of 0.2 mm due to a change of the environments or the like, φ is calculated as −4° by using the expression (7). Accordingly, the inclination of the Moire fringes 35 becomes −86°. In this case, the interval $Q_2$ between bright regions of the Moire fringes 35 in the main scanning direction b is calculated as follows by using the expression (6) and the expression $Q_2=P_2/\cos\phi$.

$$Q_2 = 3.98 \text{ (mm)} \quad (13)$$

Thus, when the shift of the image point Δl is 0.2 mm, the interval between bright regions of the Moire fringes 35 changes by 0.03 mm. In accordance with this change, the motor forward/reverse drive signal is generated, and the focusing lens 3 is moved away from the laser diode 1 along the optical axis. In this way, the image point which shifted and came before the scanning surface is moved back on the scanning surface.

The interval $Q_2$ between bright regions of the Moire fringes 35 can be recognized by use of a peak-hold circuit. The signal output shown in FIG. 55 is inputted into a peak-hold circuit in serial. The peak value (maximum voltage) of the first bright region (crest) of the Moire fringes 35 and its address (Address $M_3$) are kept in the peak-hold circuit and are stored in the memory 283. Next, the peak value (maximum voltage) of the second bright region (crest) of the Moire fringes 35 and its address (Address $M_4$) are kept in the peak-hold circuit and are stored in the memory 283. Then, $M_4$–$M_3$ is calculated, and thus, the interval $Q_2$ is recognized.

Figure 56:
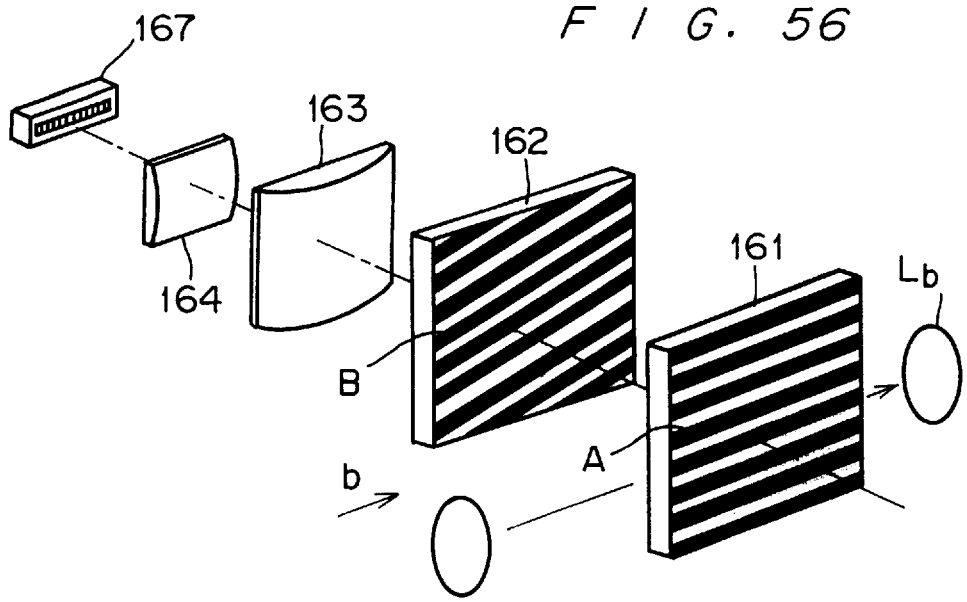
FIG. 56 is an exploded perspective view of the beam detector with a modified photoelectric element.
Figure 57:
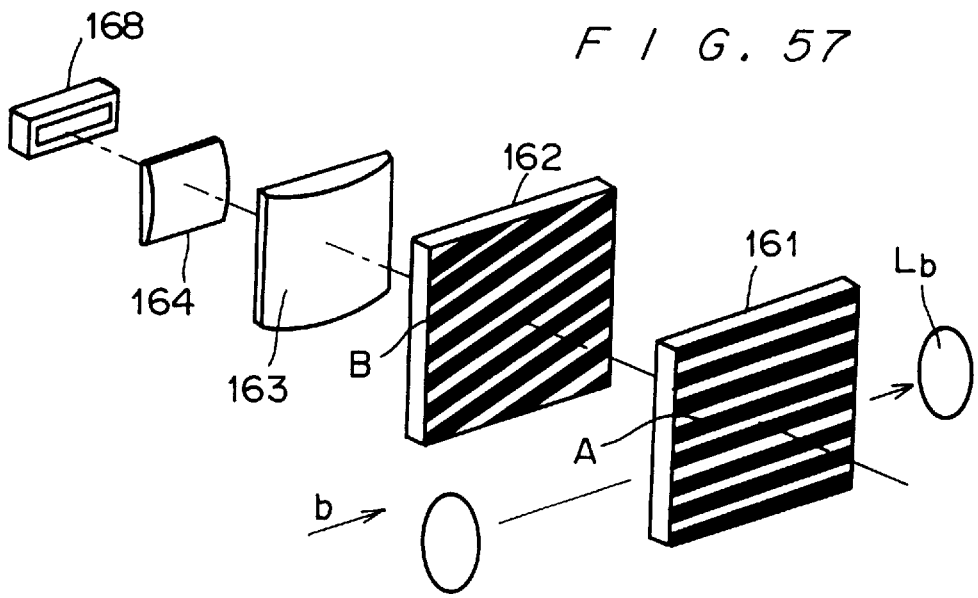
FIG. 57 is an exploded perspective view of the beam detector with another modified photoelectric element.
Figure 59:
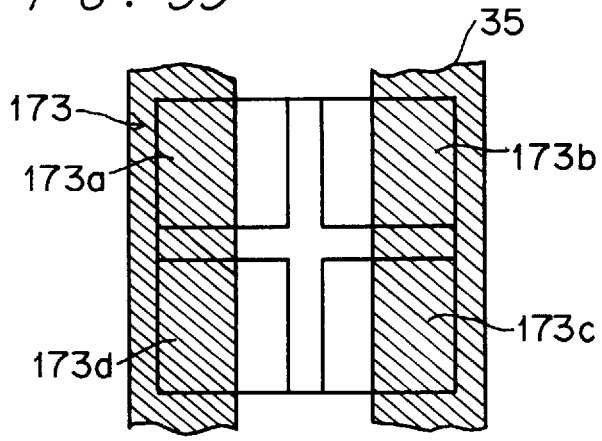
FIG. 59 is an illustration which shows the relationship between the Moire fringes in a state of in-focus and light receiving surfaces of the photoelectric element.
Figure 60:
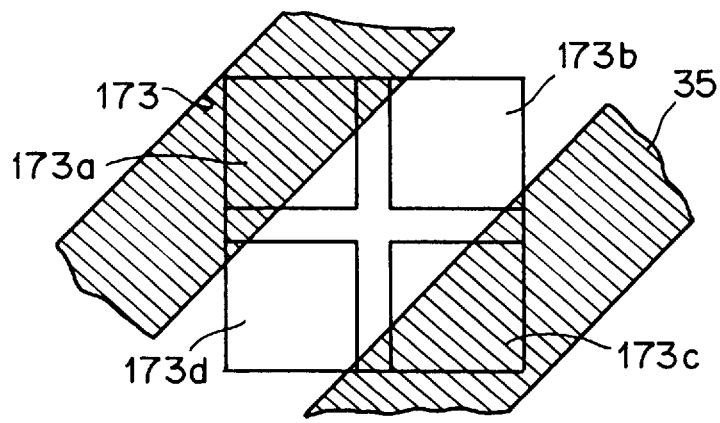
FIG. 60 is an illustration which shows the relationship between the Moire fringes in a state of front focus and the light receiving surfaces of the photoelectric element.
Figure 61:
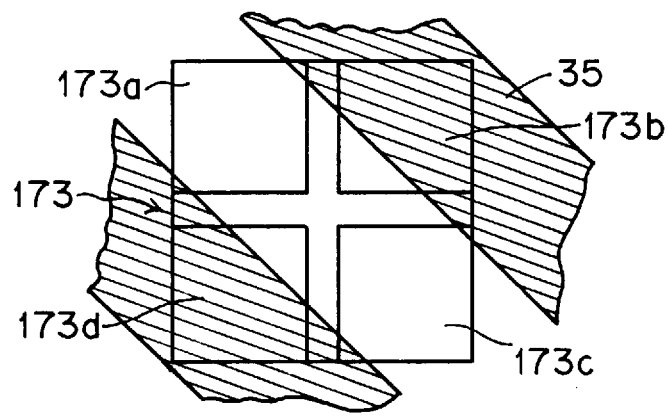
FIG. 61 is an illustration which shows the relationship between the Moire fringes in a state of back focus and the light receiving surfaces of the photoelectric element.

Although in the fourth embodiment, the photoelectric element is the area CCD 165, other things can be used. For example, as shown in FIG. 56, a linear line sensor 167 can be used. In this case, the distance between peaks of the output wave of the linear line sensor 167 is measured, and the difference between the measured value and the distance between peaks of the output waves in a state of in-focus is calculated. Then, the focusing lens 3 is moved along the optical axis in accordance with the difference. Also, as shown in FIG. 57, a photodiode 168 can be used. In this case, the time from a peak of the output wave of the photodiode 168 to the next peak of the output wave is measured, and the difference between the measured value and the time between two adjacent peaks of the output wave in a state of in-focus is calculated. Then, the focusing lens 3 is moved along the optical axis in accordance with the difference.

Fifth Embodiment: FIGS. 58 through 61

Since a laser beam scanning optical apparatus of the fifth embodiment is of the same structure as the first embodiment except the beam detector and the control circuitry, the description of the structure is omitted.

As shown in FIG. 58, a beam detector 170 is located outside an image forming area near a position optically equivalent to the scanning surface. The beam detector 170 comprises grating filters 171 and 172, and a photoelectric element 173, and these members 171 through 173 are arranged along the optical axis. The grating filter 171 has spatial grating A which is parallel to the main scanning direction b, and the grating filter 172 has spatial grating B which slants slightly with respect to the main scanning direction b. The pitch error of the spatial grating. B fulfills the conditions shown by the expressions (10) and (11) described in the first embodiment. The photoelectric element 173 is a four-segmented sensor which has four light receiving surfaces 173a, 173b, 173c and 173d. Each of the light receiving surfaces 173a through 173d generates a current in proportional to the quantity of light received.

The laser beam L which passed through the grating filters 171 and 172 forms Moire fringes 35 which extend to the four light receiving surfaces 173a through 173d. The Moire fringes 35 are substantially perpendicular to the main scanning direction b in a state of in-focus (see FIG. 59), slant to right in a state of front focus (see FIG. 60) and slant to left in a state of back focus (see FIG. 61).

The respective output currents Ia, Ib, Ic and Id of the light receiving surfaces 173a through 173d have the following mutual relationship:

in a state of in-focus, $(Ia+Ic)-(Ib+Id)=0$;

in a state of front focus, $(Ia+Ic)-(Ib+Id)<0$;

in a state of back focus, $(Ia+Ic)-(Ib+Id)>0$.

The output currents Ia through Id are sent to the signal processing circuit 24 shown in FIG. 1 and converted into voltages Va, Vb, Vc and Vd. Then, in a differential circuit of the signal processing circuit 24, Va+Vc and Vb+Vd are calculated, and (Va+Vc)–(Vb+Vd) is calculated. The calculated value is sent to the control circuit 25, and the position of the image point is judged from the value. More specifically, if the value (Va+Vc)–(Vb+Vd) is zero, the judgment is a state of in-focus. If the value is negative, the judgment is a state of front focus. If the value is positive, the judgment is a state of back focus.

Sixth Embodiment: FIGS. 62 through 66

A beam detector is influenced by a shift of the optical path of the laser beam in the sub scanning direction. A sixth embodiment is a laser beam scanning optical apparatus which not only has the action and effect of the fifth embodiment but also can prevent a detection error due to a shift of the optical path of the laser beam in the sub scanning direction. Since the laser beam scanning optical apparatus of the sixth embodiment is of the same structure as the first embodiment except the beam detector and the control circuitry, the description of the structure is omitted.

Figure 62:
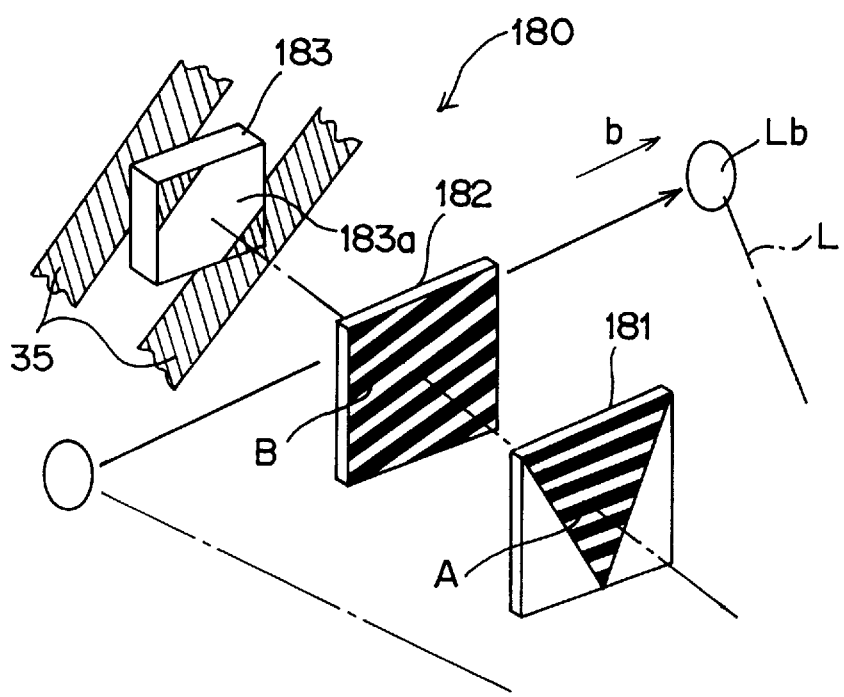
FIG. 62 is an exploded perspective view of a beam detector provided in a laser beam scanning optical apparatus which is a sixth embodiment of the present invention.

As shown in FIG. 62, a beam detector 180 is located outside an image forming area near a position optically equivalent to the scanning surface. The beam detector 180 comprises grating filters 181 and 182, and a photoelectric element 183, and these members 181 through 183 are arranged along the optical axis. The grating filter 181 has spatial grating A in a triangular area, and the grating filter 182 has spatial grating B in a rectangular area. The spatial grating A is parallel to the main scanning direction b, and the spatial grating B slants slightly with respect to the main scanning direction b.

The laser beam L which passed through the spatial grating A and B forms Moire fringes on a light receiving surface 183a of the photoelectric element 183. The photoelectric element 183 may be a photodiode, a CCD or the like.

When the optical path of the laser beam L shifts in the sub scanning direction, the laser beam L scans along a different part of the spatial grating A which has a different width, and therefore, the number of Moire fringes 35 projected on the light receiving surfaces 183a changes. By detecting the change of the number of Moire fringes 35 with the photoelectric element 183, the amount and the direction of the shift of the optical path in the sub scanning direction can be judged. Then, the beam detector 180 is moved in the sub scanning direction by an actuator or the like (not shown) to offset the shift of the optical path in the sub scanning direction, and thereafter, the inclination of the Moire fringes 35 is detected. Also, it is possible to store a correction table which indicates correction values of the Moire fringes 35 in accordance with shifts of the optical path in the sub scanning direction in the signal processing circuit beforehand. Both information about a change of the number of Moire fringes and a change of the inclination of the Moire fringes 35 are processed in the signal processing circuit.

Other mechanisms to prevent a detection error due to a shift of the optical path in the sub scanning direction are possible. For example, as shown in FIG. 63, as the photoelectric element, two linear sensors 184a and 184b are used. The linear sensors 184a and 184b are arranged side by side in the sub scanning direction with a space in-between above and below the center of rotation of the Moire fringes, and each of the linear sensors 184a and 184b extends in the main scanning direction b. The laser beam L which passed through the grating filters 171 and 172 forms Moire fringes 35 which extend to the linear sensors 184a and 184b.

The linear sensors 184a and 184b generate waves 185a and 185b, respectively, as shown by FIG. 64. From the output waves 185a and 185b, a shift of the image point and a shift of the optical path can be detected. More specifically, by measuring the distance A between a crest of the output wave 185a and a corresponding crest of the output wave 185b, a change of the inclination of the Moire fringes 35 can be detected. Thereby, the amount of a shift of the image point and whether the shift is one before the scanning surface or one after the scanning surface can be Judged. By comparing the distance between the center of rotation of the Moire fringes 35 and a crest of the output wave 185a with the distance between the center of rotation of the Moire fringes 35 and a corresponding crest of the output wave 185b, the amount of a shift of the optical path and whether the shift of the optical path is upward or downward in the sub scanning direction can be Judged.

Figure 65:
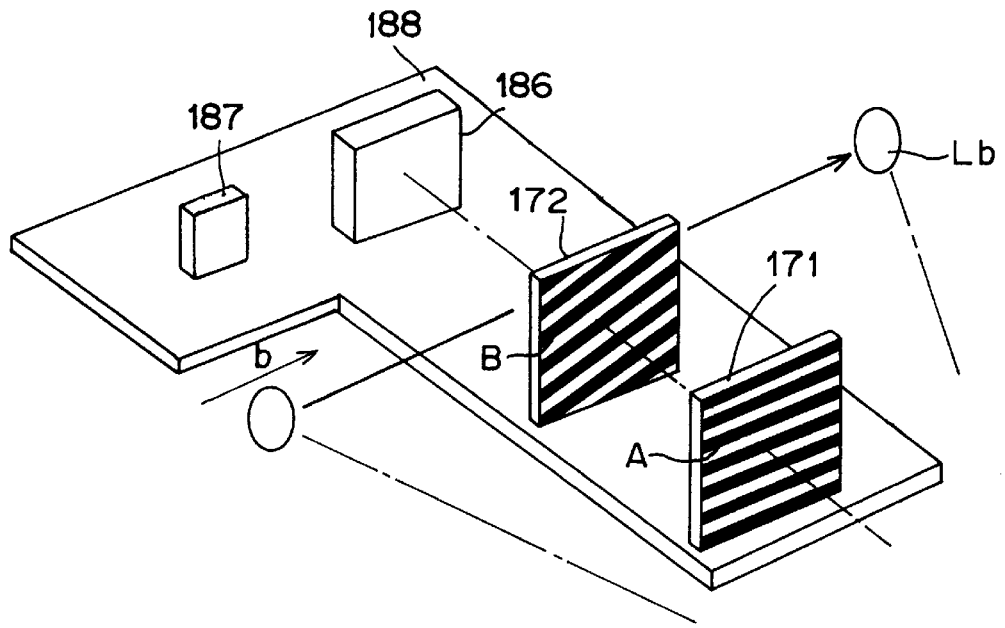
FIG. 65 is an exploded perspective view of a modification of the beam detector.

Also, a mechanism as shown by FIG. 65 is possible. The grating filters 171 and 172, the photoelectric element 186 and a scanning position sensor 187 are arranged on a base plate 188. The scanning position sensor 187 may be a position detecting element, a CCD or the like. The base plate 188 has a rack, and an output pinion of a stepping motor engages with the rack. Thereby, the beam detector is movable in the sub scanning direction.

The scanning position of the laser beam L with respect to the sub scanning direction is detected by the scanning position sensor 187, and in accordance with information outputted from the scanning position sensor 187, the stepping motor is driven forward or in reverse by a certain amount to move the beam detector. By this movement, the shift of the optical path in the sub scanning direction is corrected, and thereafter, the inclination of the Moire fringes is detected by the beam detector.

Figure 66:
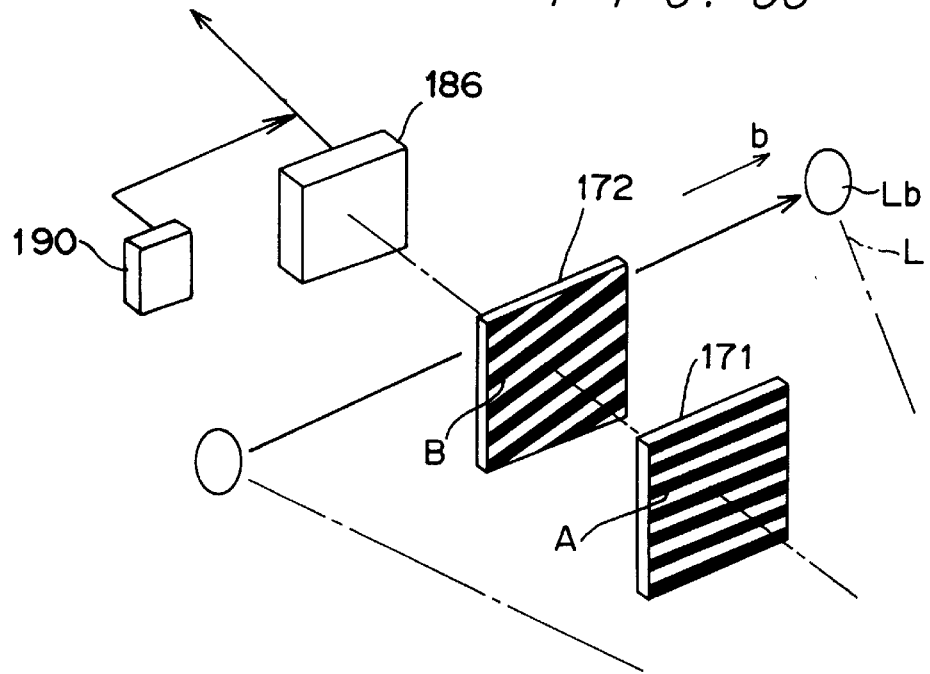
FIG. 66 is an exploded perspective view of another modification of the beam detector.

Further, a mechanism as shown by FIG. 66 is possible. A scanning position sensor 190 is located near the photoelectric element 186, and the scanning position of the laser beam L with respect to the sub scanning direction is detected by the scanning position sensor 190. In accordance with information outputted from the scanning position sensor 190, the inclination of the Moire fringes detected by the beam detector is corrected referring to a correction table stored in the memory beforehand.

Seventh Embodiment: FIGS. 67 through 84

General Structure of the Laser Beam Scanning Optical Apparatus

Figure 67:
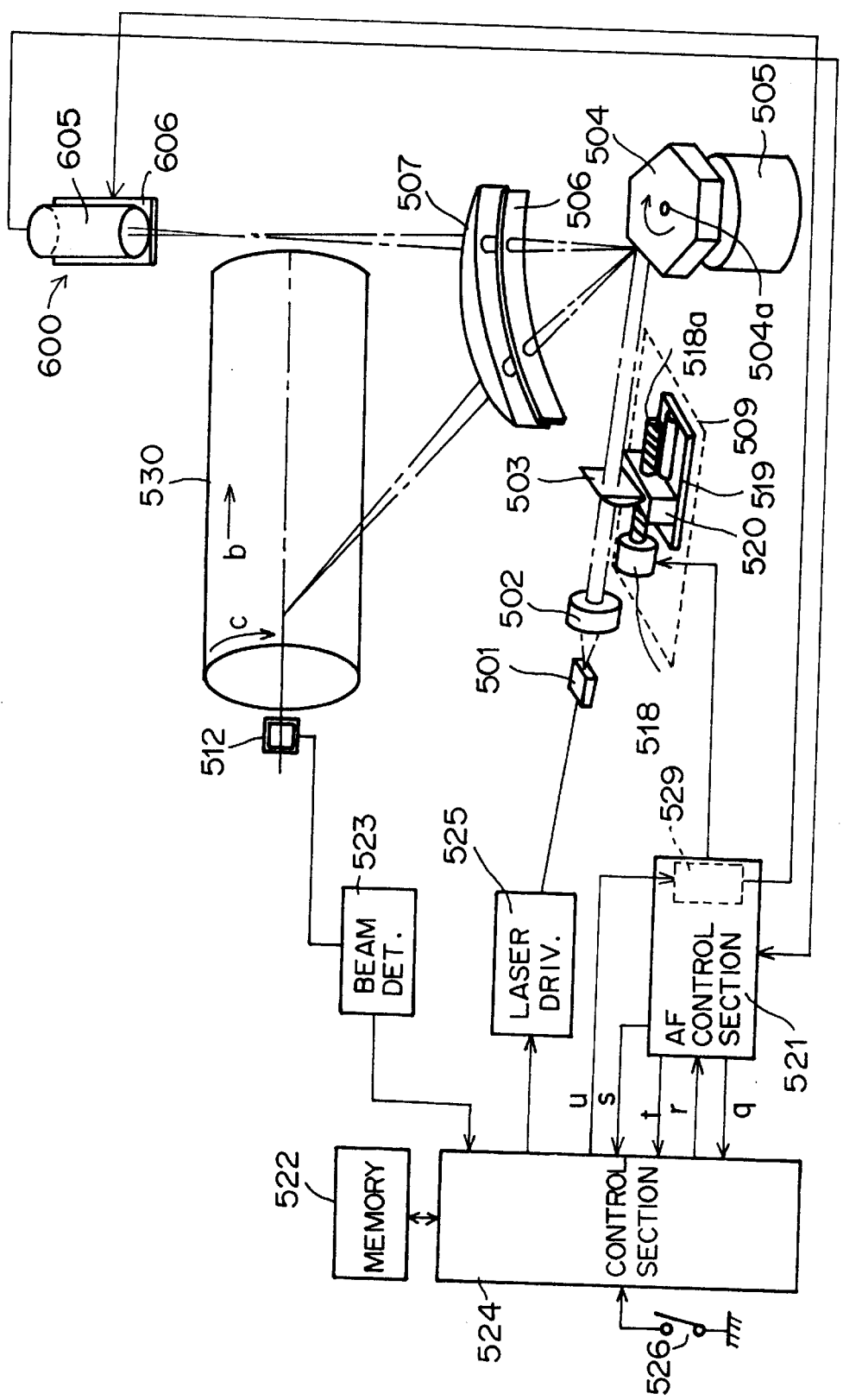
FIG. 67 is a perspective view of a laser beam scanning optical apparatus which is a seventh embodiment of the present invention.

FIG. 67 shows a schematic view of a laser beam scanning optical apparatus of the seventh embodiment. The laser beam scanning optical apparatus comprises a laser diode 501, a collimator lens 502, a cylindrical lens 503, a polygon mirror 504, a toroidal lens 506, and an fθ lens 507 and a beam detector 600.

The laser diode 501 is modulated (turned on and off) by a laser driver 525, and the laser diode 501 emits a laser beam when it is on. The laser driver 525 is driven in accordance with print data transmitted from a flash memory 522 via a printer body control section 524. The laser beam emitted from the laser diode 501 is collimated by the collimator lens 502 to be a substantially parallel light and converged with respect to the sub scanning direction by the cylindrical lens 503. Then, the laser beam is incident to the polygon mirror 504.

The polygon mirror 504 is driven by a motor 505 to rotate clockwise on a shaft 504a at a constant velocity. The laser beam is deflected by deflecting facets of the polygon mirror 504 during the rotation of the polygon mirror 504 and is scanned at a constant angular velocity. The scanned laser beam is incident to the toroidal lens 506 and the fθ lens 507.

An error of the perpendicularity of the deflecting facets of the polygon mirror 504 is corrected by the cylindrical lens 503 and the toroidal lens 506. The laser beam emergent from the fθ lens 507 is imaged on a photosensitive drum 530 and is scanned on the photosensitive drum 530 in a direction indicated by arrow b (main scanning). The fθ lens 507 mainly functions to correct the main scanning speed on the scanning surface (photosensitive drum 530) to become constant, that is, has a function of correcting distortion.

The photosensitive drum 530 is rotated in a direction indicated by arrow c at a constant velocity (sub scanning). By the main scanning in the direction b and the sub scanning in the direction c, an electrostatic latent image is formed on the photosensitive drum 530.

The laser beam scanning optical apparatus of the seventh embodiment further has moving means 509 for moving the cylindrical lens 503 along the optical axis so as to correct a shift of the image point in the sub scanning direction. The moving means 509 comprises a stepping motor 518, a plate 519 and a table 520. The stepping motor 518 has a motor shaft 518a which is a screw shaft. Controlled by an auto-focus (AF) control section 521, the motor shaft 518a is rotated forward or in reverse, and thereby, the table 520 which bears the cylindrical lens 503 slides on the plate 519. In this way, the cylindrical lens 503 is movable back and forth along the optical axis. By this movement, the image point can be corrected to come on the photosensitive drum 530.

First Beam Detector

Figure 68:
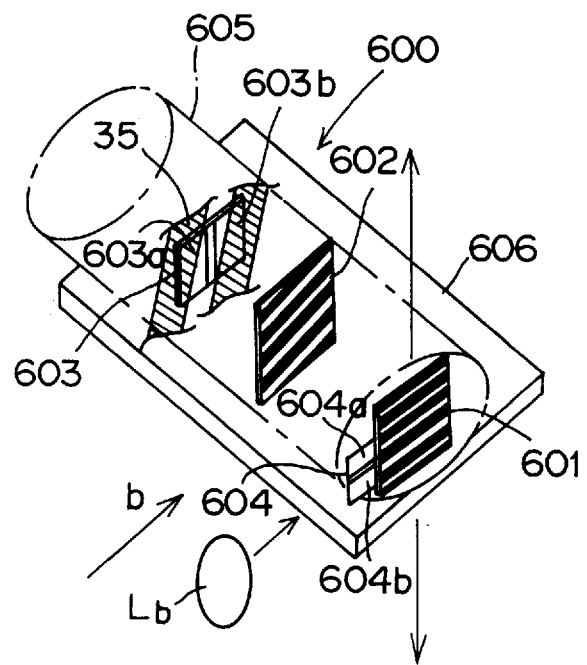
FIG. 68 is a perspective view of a beam detector provided in the apparatus of FIG. 67.

A first beam detector 600 for detecting the position of the image point is located outside an image forming area downstream in the main scanning direction near a position optically equivalent to the scanning surface. As shown in FIGS. 67 and 68, the beam detector 600 comprises grating filters 601 and 602, a photoelectric element 603, a scanning position sensor 604, a case 605 which contains these members 601 through 604, and a piezoelectric actuator 606. The grating filters 601 and 602, and the photoelectric element 603 are arranged along the optical axis, and the scanning position sensor 604 is located near the grating filter 601. The grating filter 601 has spatial grating A which is parallel to the main scanning direction b, and the grating filter 602 has spatial grating B which slants slightly with respect to the main scanning direction b.

The pitch $d_1$ of the spatial grating A and the pitch $d_2$ of the spatial grating B are mutually different, and thereby, the number of Moire fringes projected on the photoelectric element 603 is controlled. In the seventh embodiment, it is designed that the Moire fringes projected on the photoelectric element 603 has only one bright region.

The photoelectric element 603 is a two-segmented sensor which has two light receiving surfaces 603a and 603b. Each of the light receiving surfaces generates a current in proportional to the quantity of light received. A dividing line between the light receiving surfaces 603a and 603b is substantially parallel to the sub scanning direction c.

The laser beam L which passed through the grating filters 601 and 602 forms Moire fringes 35 on the light receiving surfaces 603a and 603b. The inclination of the Moire fringes 35 changes with a shift of the image point. The bright region of the Moire fringes 35 slants to right in a state of front focus (see FIG. 69), is substantially perpendicular to the main scanning direction b in a state of in-focus (see FIG. 70) and slants to left in a state of back focus (see FIG. 71).

Figure 69:
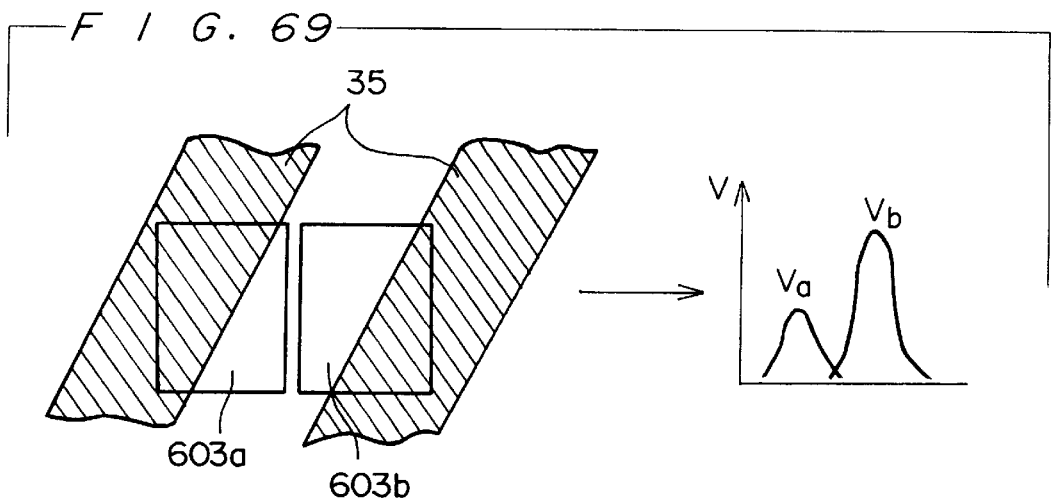
FIG. 69 is an illustration which shows the relationship between the Moire fringes in a state of front focus and light receiving surfaces of the photoelectric element.
Figure 70:
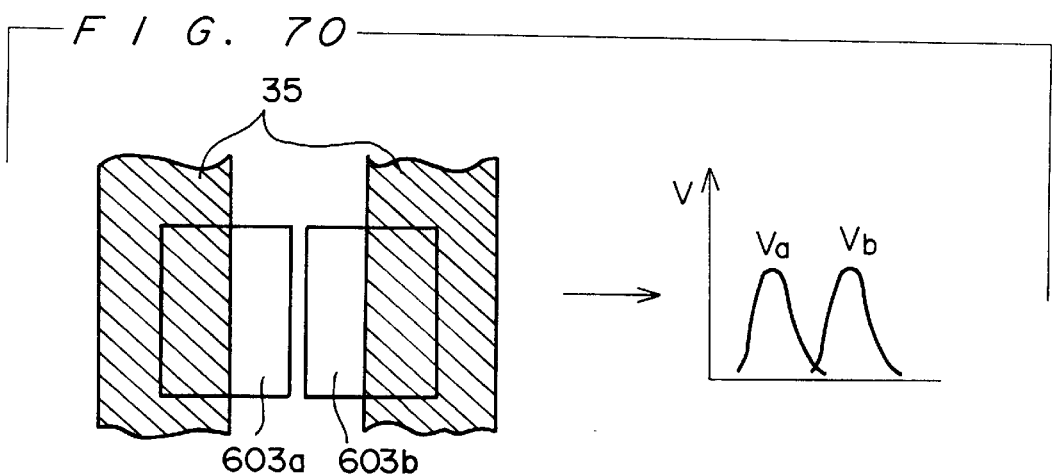
FIG. 70 is an illustration which shows the relationship between the Moire fringes in a state of in-focus and the light receiving surfaces of the photoelectric element.
Figure 71:
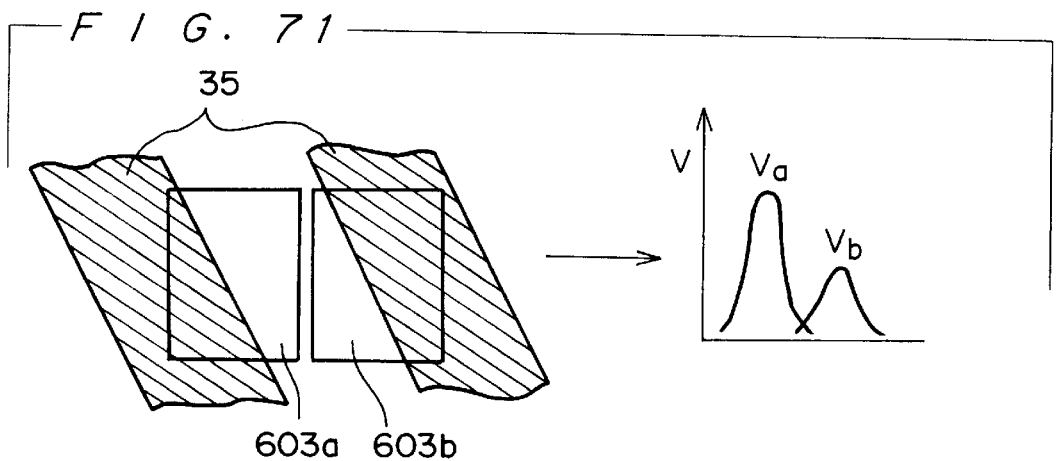
FIG. 71 is an illustration which shows the relationship between the Moire fringes in a state of back focus and the light receiving surfaces of the photoelectric element.

The light receiving surfaces 603a and 603b generate currents $I_a$ and $I_b$ respectively. The currents $I_a$ and $I_b$ are sent to the auto-focus control section 521 and converted into voltages $V_a$ and $V_b$. Then, $V_a-V_b$ is calculated in a differential circuit, and from the calculated value, the position of the image point is judged. More specifically, if $(V_a-V_b)$ is zero, the judgment is a state of in-focus as shown in FIG. 70. If $(V_a-V_b)$ is positive, the judgment is a state of front focus as shown in FIG. 69. If $(V_a-V_b)$ is negative, the judgment is a state of back focus as shown in FIG. 71.

In accordance with the judgment, the direction of a movement of the cylindrical lens 503 is decided, and a control signal is sent to the stepping motor 518. Accordingly, the stepping motor 518 rotates forward or in reverse to move the cylindrical lens 503 along the optical axis. By moving the lens 503 away from the laser diode 501, the image point is moved backward, and by moving the lens 503 toward the laser diode 501, the image point is moved forward. A one-step movement of the lens 503 corresponds to a 0.01 mm movement of the image point, and the movement of the lens 503 is repeated until the image point comes onto the scanning surface, that is, until $(V_a-V_b)$ becomes zero.

Figure 72:
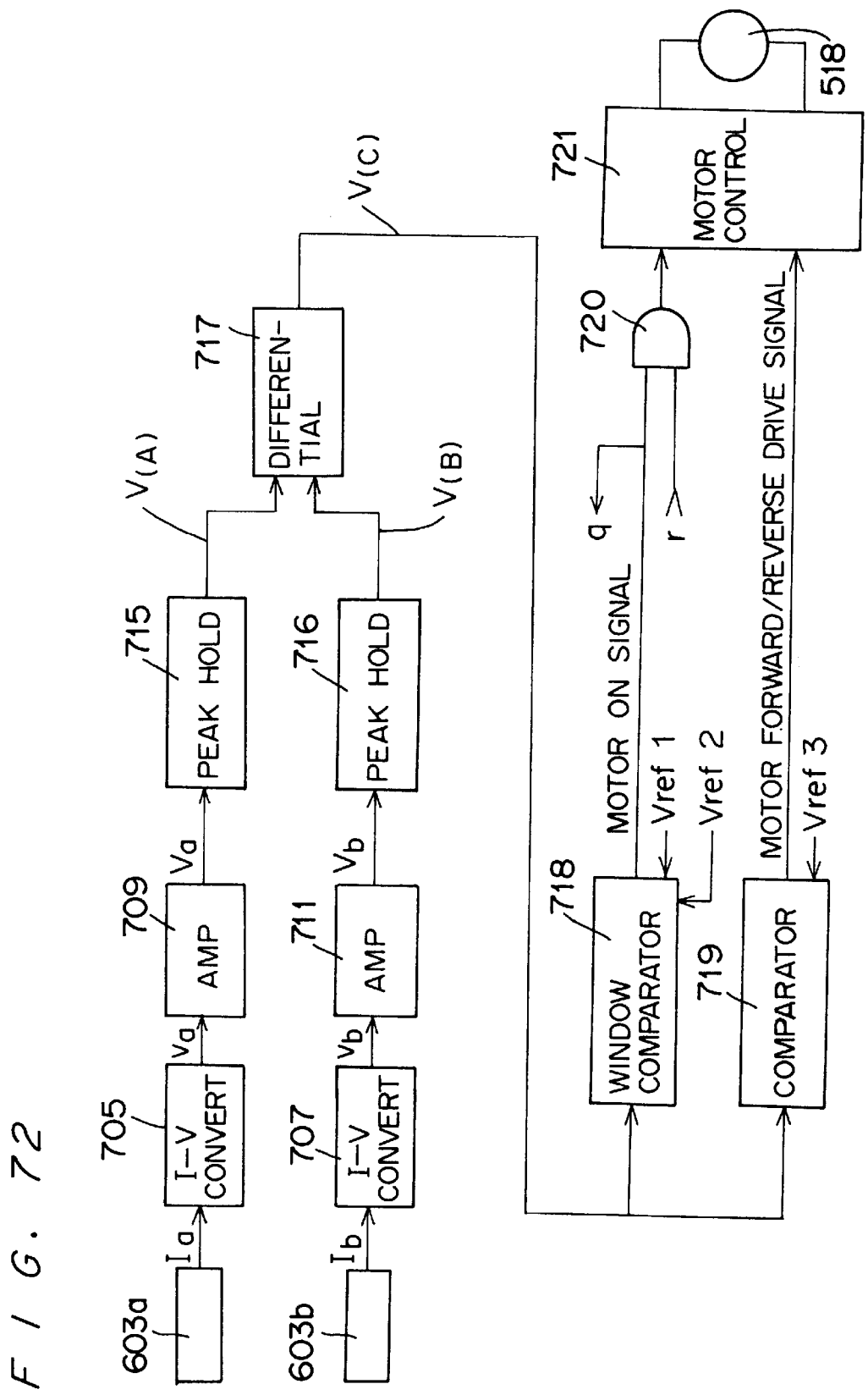
FIG. 72 is an electrical circuit diagram of a control circuitry of an auto-focus control section.

Referring to FIG. 72 which shows the electrical circuitry of the auto-focus control section 521, the procedure of focusing is described.

Each of the light receiving surfaces 603a and 603b of the photoelectric element 603 generates a current in proportional to the quantity of light received. When the bright region of the Moire fringes 35 is projected on the light receiving surfaces 603a and 603b, the light receiving surfaces 603a and 603b generate currents $I_a$ and $I_b$, respectively. The current $I_a$ is converted into a voltage $v_a$ by an I/V (current/voltage) converting circuit 705, and the voltage $v_a$ is sent to an amplifying circuit 709. The amplifying circuit 709 amplifies the voltage $v_a$ and sends a voltage $V_a$ to a peak-hold circuit 715. In the same way, the current Ib is converted into a voltage $v_b$ by an I/V (current/voltage) converting circuit 707, and the voltage $v_b$ is sent to an amplifying circuit 711. The amplifying circuit 711 amplifies the voltage $v_b$ and sends a voltage $V_b$ to a peak-hold circuit 716.

The peak-hold circuit 715 keeps the peak value of the voltage $V_a$ and sends a value V(A) to a differential circuit 717. The peak-hold circuit 716 keeps the peak value of the voltage $V_b$ and sends a value V(B) to the differential circuit 717. The differential circuit 717 calculates the difference V(C) between V(A) and V(B) (V(C)=V(A)−V(B)) and sends the value V(C) to a window comparator circuit 718 and a comparator circuit 719. In this way, the differential circuit 717 detects the difference between the quantity of light received by the light receiving surface 603a and the quantity of light received by the light receiving surface 603b, and from the difference, the inclination of the Moire fringes 35 can be recognized.

Further, the window comparator circuit 718 and the comparator circuit 719 are used as digital judging means. When the output V(C) of the differential circuit 717 is within a reference range from $V_{ref1}$ to $V_{ref2}$, it is judged that the Moire fringes 35 are substantially perpendicular to the main scanning direction b, that is, it is judged that the image point is on the scanning surface. Therefore, the window comparator circuit 718 makes a motor on signal inactive. When the output V(C) of the differential circuit 717 is out of the reference range from $V_{ref1}$ to $V_{ref2}$, it is judged that the image point is not on the scanning surface, and the motor on signal is made active. The motor on signal is sent to a motor control circuit 721. The comparator circuit 719 compares the output V(C) of the differential circuit 717 with a reference voltage $V_{ref3}$ (in the middle between the reference voltages $V_{ref1}$ and $V_{ref2}$) to Judge the direction of the slant of the Moire fringes 35. Then, the comparator circuit 719 generates a signal at a high level or a low level in accordance with the judgment and sends the signal to the motor control circuit 721 as a motor forward/reverse drive signal.

The motor control circuit 721 drives the stepping motor 518 in accordance with the motor on signal and the motor forward/reverse drive signal. Thereby, the cylindrical lens 503 is moved along the optical axis, and the image point is moved onto the scanning surface (photosensitive drum 350). The motor on signal is also sent to the printer body control section 524 as a signal q. A signal r which indicates whether an auto-focus cancel switch 526 (see FIG. 67) is on or off is sent from the printer body control section 524 and inputted to an AND element 720. Thereby, whether or not the auto-focus control is carried out is decided depending on the state of the auto-focus cancel switch 526.

Further, a beam detecting photodiode 512 is provided upstream in the main scanning direction to time a start of printing on the photosensitive drum 530. A signal from the beam detecting photodiode 512 is sent to the printer body control section 524 through a beam detecting circuit 523, and is also used to time an emission of the laser beam from the laser diode 501 toward the beam detector 600.

Next, the scanning position sensor 604 is described. If the optical path of the laser beam L shifts in the sub scanning direction, the Moire fringes projected on the light receiving surfaces 603a and 603b shift in the main scanning direction, thereby causing a detection error. In order to prevent such a detection error, a housing which supports the optical elements 510 through 507 and the beam detector 600 may be made of a metal which is hardly distorted by heat, such as aluminum or the like. However, this raise the cost.

Therefore, the first beam detector 600 has the scanning position sensor 604, and has a mechanism of moving the grating filters 601 and 602, and the photoelectric element 603 in the sub scanning direction in accordance with the output of the scanning position sensor 604 so as to keep a constant positional relationship between the laser beam L and the members 601 through 603 of the beam detector 604.

The scanning position sensor 604 is a two-segmented sensor which has two light receiving surfaces 604a and 604b, and each of the light receiving surfaces 604a and 604b generates a current in proportional to the quantity of light received. The currents $I_a$ and $I_b$ generated by the light receiving surfaces 604a and 604b are sent to the auto-focus control section 521 and converted into voltages $V_a$ and $V_b$. Then, $V_a-V_b$ is calculated in the differential circuit.

Figure 73:
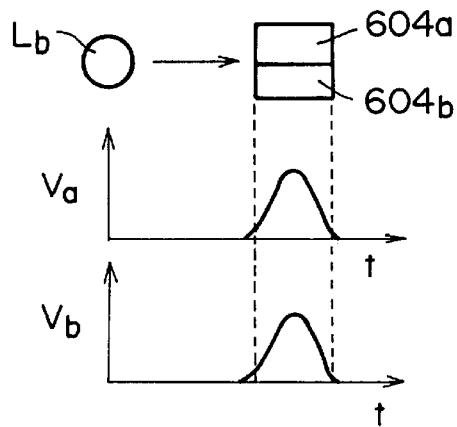
FIG. 73 is an illustration of a positional relationship between a laser beam spot and the light receiving surfaces of the photoelectric element.
Figure 74:
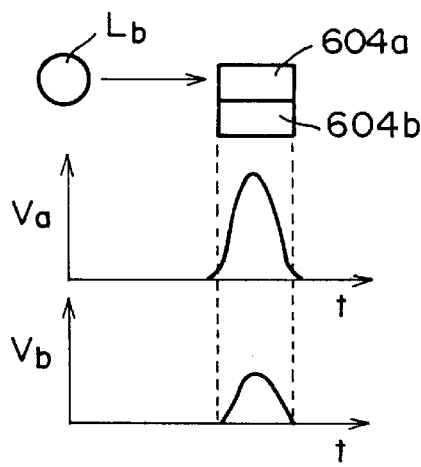
FIG. 74 is an illustration of a positional relationship between a laser beam spot and the light receiving surfaces of the photoelectric element.
Figure 75:
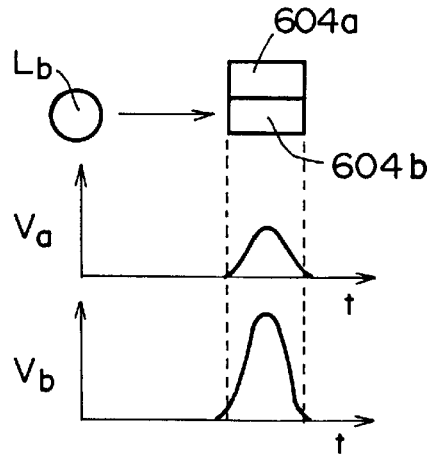
FIG. 75 is an illustration of a positional relationship between a laser beam spot and the light receiving surfaces of the photoelectric element.

The scanning position sensor 604 is usually so structured that in the initial state, a dividing line between the light receiving surfaces 604a and 604b is located in the middle of the laser beam spot Lb as shown in FIG. 73. In this case, because the quantity of light incident to the light receiving surface 604a and that incident to the light receiving surface 604b are equal, the output current $I_a$ and $I_b$ are equal. Accordingly, $(V_a-V_b)$ is zero. However, if the optical path shifts upward in the sub scanning direction as shown in FIG. 74, $(V_a-V_b)$ is positive. If the optical path shifts downward in the sub scanning direction as shown in FIG. 75, $(V_a-V_b)$ is negative. In accordance with the result, the piezoelectric actuator 606 is driven to move the beam detector 600 upward or downward in the sub scanning direction until $(V_a-V_b)$ becomes zero. In this way, the positional relationship between the laser beam L and the members 601 through 603 of the beam detector 604 is kept constant.

Referring to FIG. 76 which shows the electrical circuitry of a scanning position sensor control section, the procedure of correcting the scanning position is described.

Each of the light receiving surfaces 604a and 604b of the scanning position sensor 604 generates a current in proportional to the quantity of light received. When the laser beam L is incident to the light receiving surfaces 604a and 604b, the light receiving surfaces 604a and 604b generate currents $I_a$ and $I_b$ respectively. The current $I_a$ is converted into a voltage $v_a$ by an I/V (current/voltage) converting circuit 735, and the voltage $v_a$ is sent to an amplifying circuit 737. The amplifying circuit 737 amplifies the voltage $v_a$ and sends a voltage $V_a$ to a peak-hold circuit 739. In the same way, the current $I_b$ is converted into a voltage $v_b$ by an I/V (current/voltage) converting circuit 736, and the voltage $v_b$ is sent to an amplifying circuit 738. The amplifying circuit 738 amplifies the voltage $v_b$ and sends a voltage $V_b$ to a peak-hold circuit 740.

The peak-hold circuits 739 and 740 keep the peak values of the voltages $V_a$ and $V_b$ respectively and send the values to a microcomputer of the printer body control section 524 as signals s and t respectively. The microcomputer calculates $V_a - V_b$ and judges a shift of the optical path from the calculated value. When the microcomputer judges that the optical path shifts, the microcomputer generates a piezoelectric actuator drive signal u to a piezoelectric actuator driving source 529 to drive the piezoelectric actuator 606. Thereby, the beam detector 600 is moved along the sub scanning direction.

Figure 77:
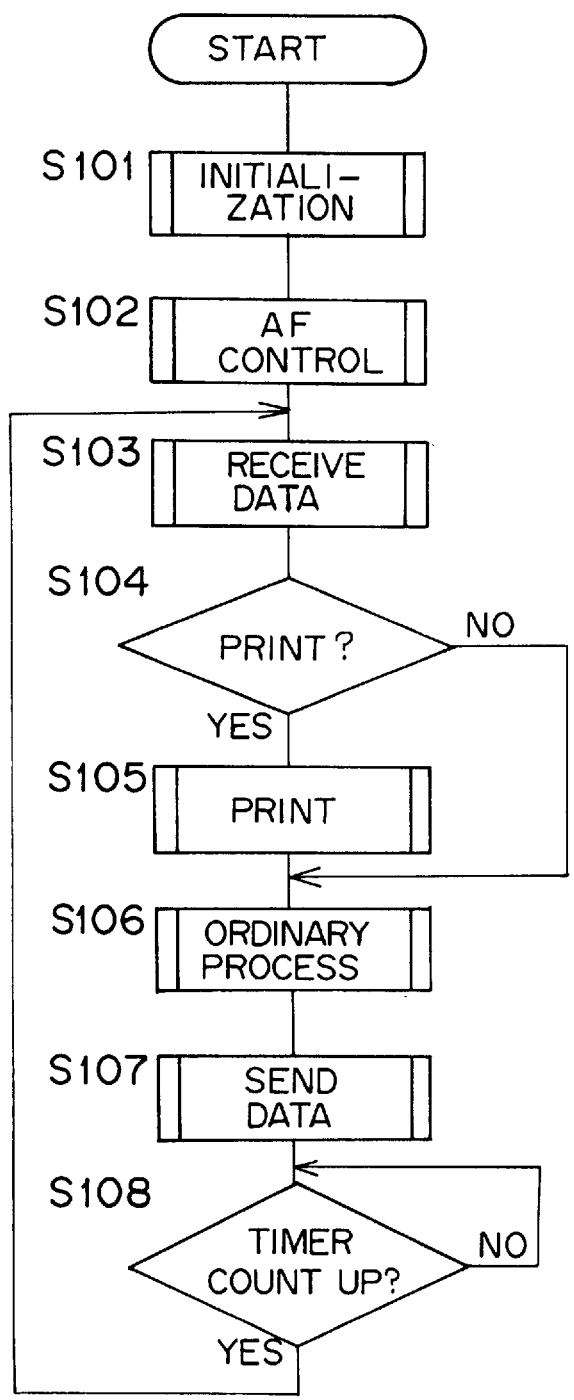
FIG. 77 is a flowchart which shows a control procedure of a printer body control section.
Figure 78:
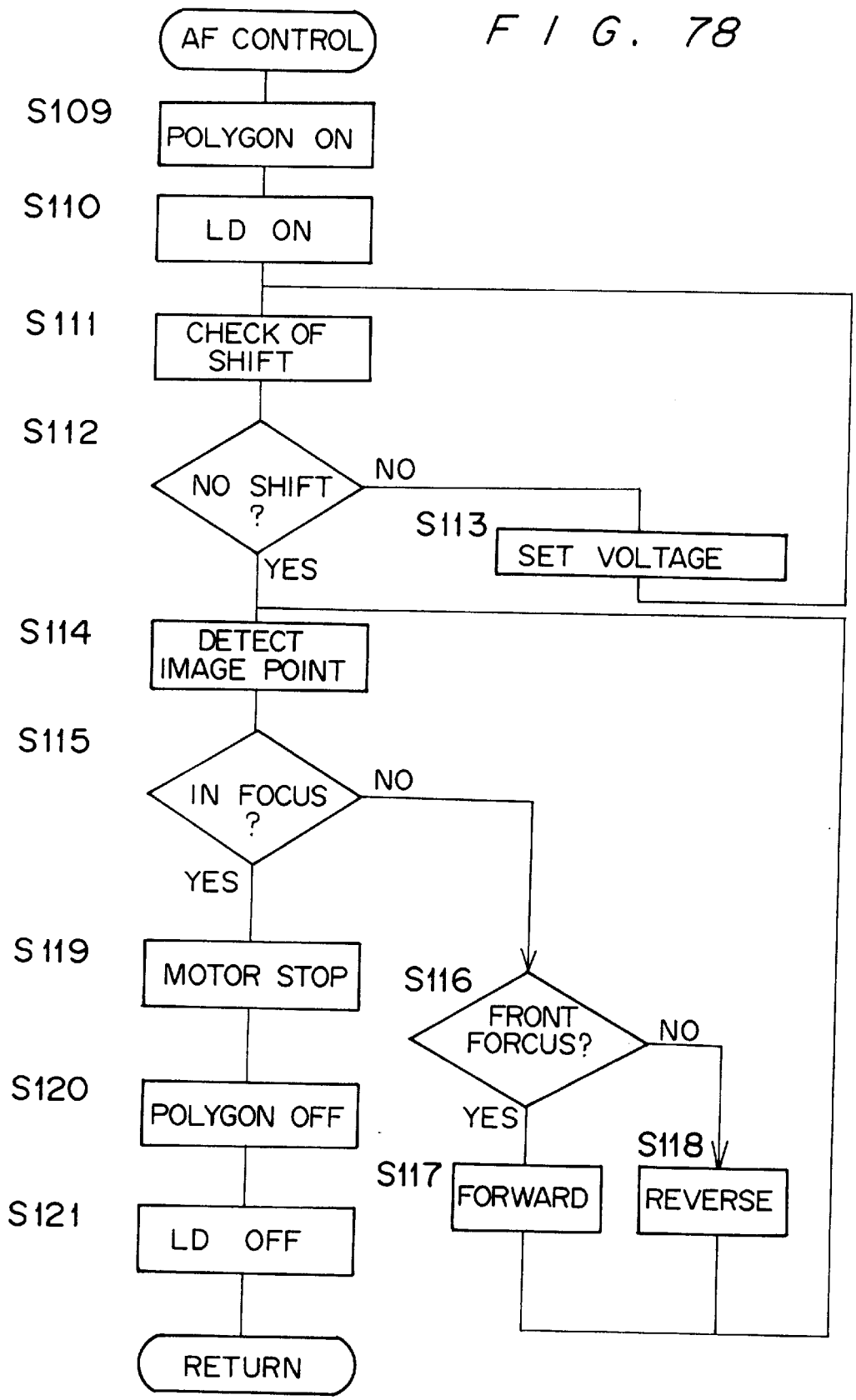
FIG. 78 is a flowchart which shows a control procedure of the auto-focus control section.

Further, referring to FIGS. 77 and 78, the procedure of image point detection and focusing is described.

FIG. 77 is a main flowchart which shows the control procedure of the printer body control section 524. When the printer is turned on, initialization of the control program is carried out at step S101, and auto-focus control is carried out at step S102 as will be described later. Next, at step S103, serial data are received from an image controller (not shown) at step S103. For example, during a printing operation, image data, a timing signal, etc. are received. At step S104, it is checked whether printing is requested. If printing is requested, at step S105, the laser diode 501 is modulated for printing in accordance with the image data. Next, at step S106, whether it is in a printing operation or in a stand-by state, ordinary processing such as a check of flags is carried out, and at step S107, serial data which indicate the status of the printer body control section 524 are sent to the image controller. Then, when it is judged at step S108 that a routine timer counts up, the processing goes back to step S103.

FIG. 78 is a flowchart which shows the procedure of auto-focus control. The polygon motor 505 is driven at step S109, and the laser diode 501 is turned on at step S110. Next, a shift of the optical path is checked at step S111. If it is judged at step S112 that the optical path shifts, at step S113, the drive voltage of the driving source 529 of the piezoelectric actuator 606 is set. Then, the processing returns to step S111 to repeat the check of the optical path.

If it is judged at step S112 that the optical path does not shift, the position of the image point is detected at step S114, and it is judged at step S115 whether the image point is on the scanning surface. If "YES" at step S115 (a state of in-focus), the processing goes to step S119. If "NO" at step S115, at step S116, it is Judged whether the image point is before the scanning surface. If "YES" at step S116 (a state of front focus), the stepping motor 518 is driven forward at step S117 to move the cylindrical lens 503 away from the laser diode 501. If "NO" at step S116 (a state of back focus), the stepping motor 518 is driven in reverse at step S118 to move the cylindrical lens 503 toward the laser diode 501.

After the focusing in the above way, the processing goes back to step S114 to detect the position of the image point, and at step S115 it is Judged whether the image point is on the scanning surface. If "YES" at step S115 (a state of in-focus), the processing goes to step S119. If "NO" at step S115, the processing goes to step S116 and repeats the above operation.

When it is judged at step S115 that the image point is on the scanning surface (a state of in-focus), the stepping motor 518 is stopped at step S119. Next, the polygon motor 505 is turned off at step S120, and the laser diode 501 is turned off at step S121. Then, the processing goes back to the main flowchart shown by FIG. 77.

As described above, in the seventh embodiment, right after the power of the printer is turned on, a shift of the optical path is checked and corrected, and thereafter, a shift of the image point is checked and corrected. Therefore, the laser beam scanning optical apparatus can be used in a good condition at all times.

Although in the seventh embodiment, the whole of the beam detector 600 is moved, other mechanisms are possible. For example, it is possible to move only the photoelectric element 603 by use of a piezoelectric actuator or the like. In this case, when the optical path of the laser beam shifts upward in the sub scanning direction as shown in FIG. 74, the photoelectric element 603 should be moved left in FIG. 68 in parallel to the main scanning direction b. When the optical path of the laser beam shifts downward in the sub scanning direction as shown in FIG. 75, the photoelectric element 603 should be moved right in FIG. 68 in parallel to the main scanning direction b.

Also, it is possible to move only the grating filter 602 by use of a piezoelectric actuator or the like. In this case, when the optical path of the laser beam shifts upward in the sub scanning direction as shown in FIG. 74, the grating filter 602 should be moved right in FIG. 68 in parallel to the main scanning direction b. When the optical path of the laser beam shifts downward in the sub scanning direction as shown in FIG. 75, the grating filter 602 should be moved left in FIG. 68 in parallel to the main scanning direction b.

Second Beam Detector

The beam detector is not limited to the one described above. A beam detector shown in FIGS. 79 through 84 can be used instead. This second beam detector does not have a mechanism of moving the grating filters and the photoelectric element in the sub scanning direction.

Figure 79:
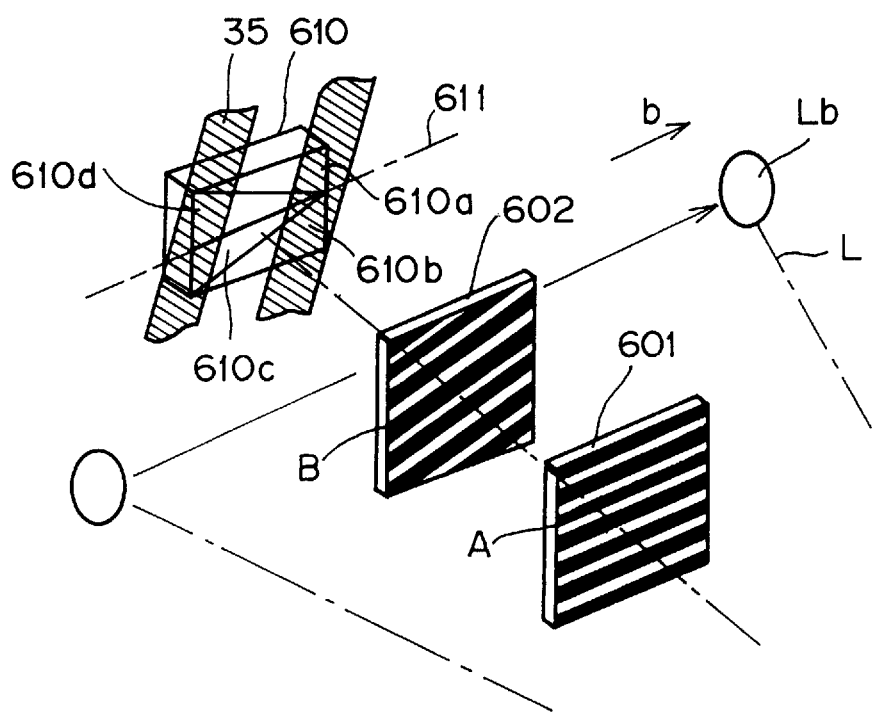
FIG. 79 is an exploded perspective view of a second beam detector.

As shown in FIG. 79, the beam detector has a photoelectric element 610 which is a four-segmented sensor with four triangular light receiving surfaces 610a, 610b, 610c and 610d. Each of the light receiving surfaces 610a through 610d generates a current in proportional to the quantity of light received. The light receiving surfaces 610a and 610b make a pair, and the light receiving surfaces 610c and 610d make another pair. The light receiving surfaces 610a and 610b are symmetrical with respect to a line 611, and the light receiving surfaces 610c and 610d are symmetrical with respect to the line 611. If the optical path of the laser beam shifts, the Moire fringes 35 projected on the light receiving surface 610a through 610d shift in the main scanning direction. Therefore, the photoelectric element 610 is so located that the line 611 which is a reference of the symmetry between the light receiving surfaces 610a and 610b and the symmetry between the light receiving surface 610c and 610d extends substantially in the main scanning direction.

The laser beam L which passed through the grating filters 601 and 602 forms Moire fringes 35 which have one bright region and extend to the light receiving surfaces 610a through 610d. The inclination of the Moire fringes 35 changes with a shift of the image point. The Moire fringes 35 slant to right in a state of front focus (see FIG. 80), are substantially perpendicular to the main scanning direction b in a state of in-focus (see FIG. 81) and slant to left in a state of back focus (see FIG. 82).

The light receiving surfaces 610a through 610d generate currents $I_a$, $I_b$, $I_c$ and $I_d$ respectively. These currents $I_a$ through $I_d$ are sent to the auto-focus control section 521 and converted into voltages $V_a$, $V_b$, $V_c$ and $V_d$ respectively. Then, in the differential circuit, $V_a+V_c$ and $V_b+V_d$ are calculated, and $(V_a+V_c)-(V_b+V_d)$ is calculated. From the calculated value, the position of the image point is detected. When $(V_a+V_c)-(V_b+V_d)$ is zero, it is judged that the image point is on the scanning surface (see FIG. 81). When $(V_a+V_c)-(V_b+V_d)$ is positive, it is judged that the image point is before the scanning surface (see FIG. 80). When $(V_a+V_c)-(V_b+V_d)$ is negative, it is judged that the image point is after the scanning surface (see FIG. 82). The relationship does not change even if the Moire fringes 35 shifts in the main scanning direction due to a shift of the optical path of the laser beam.

Figure 83:
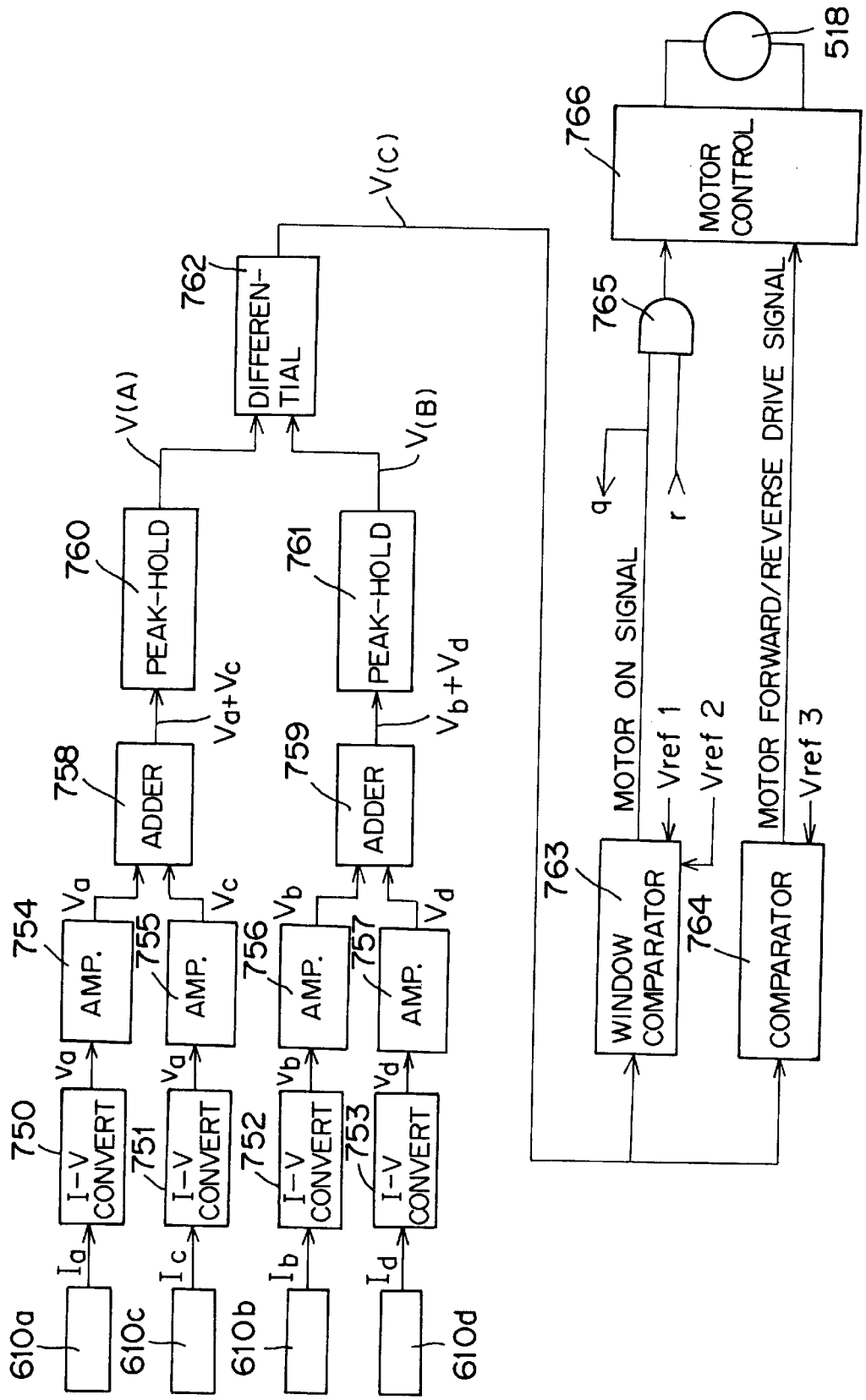
FIG. 83 is an electrical circuit diagram of a control circuitry of the auto-focus control section.

Referring to FIG. 83 which shows the electrical circuitry of the auto-focus control section 521, the procedure of focusing is described.

When the bright region of the Moire fringes 35 is projected on the light receiving surfaces 610a through 610d of the photoelectric element 610, the light receiving surfaces 610a through 610d generate currents $I_a$, $I_b$, $I_c$ and $I_d$ respectively. The current $I_a$ outputted from the light receiving surface 610a is converted into a voltage $v_a$ by a current/voltage (I/V) converting circuit 750, and the voltage $v_a$ is sent to an amplifying circuit 754. The amplifying circuit 754 amplifies the voltage $v_a$ to $V_a$ and sends the voltage $V_a$ to an adding circuit 758. The current $I_b$ outputted from the light receiving surface 610c is converted into a voltage $v_c$ by a current/voltage (I/V) converting circuit 751, and the voltage $v_c$ is sent to an amplifying circuit 755. The amplifying circuit 755 amplifies the voltage $v_c$ to $V_c$ and sends the voltage $V_c$ to the adding circuit 758. The adding circuit 758 adds the voltage $V_c$ to the voltage $V_a$, and the added value is sent to a peak-hold circuit 760.

Likewise, the current $I_b$ outputted from the light receiving surface 610b is converted into a voltage $v_b$ by a current/voltage (I/V) converting circuit 752, and the voltage $v_b$ is sent to an amplifying circuit 756. The amplifying circuit 756 amplifies the voltage $v_b$ to $V_b$ and sends the voltage $V_b$ to an adding circuit 759. The current $I_d$ outputted from the light receiving surface 610d is converted into a voltage $v_d$ by a current/voltage (I/V) converting circuit 753, and the voltage $v_d$ is sent to an amplifying circuit 757. The amplifying circuit 757 amplifies the voltage $v_d$ to $V_d$ and sends the voltage $V_d$ to the adding circuit 759. The adding circuit 759 adds the voltage $V_d$ to the voltage $V_b$, and the added value is sent to a peak-hold circuit 761.

The peak-hold circuit 760 keeps the peak value $(V_a+V_c)$ and sends the value to a differential circuit 762 as V(A). The peak-hold circuit 761 keeps the peak value $(V_b+V_d)$ and sends the value to the differential circuit 762 as V(B). The differential circuit 762 calculates the difference V(C) between the values V(A) and V(B) (V(C)=V(A)−V(B)) and sends the calculated value V(C) to a window comparator circuit 763 and a comparator circuit 764. The differential circuit 762 detects the difference between the quantity of light incident to the light receiving surfaces 610a and 610c and the quantity of light incident to the light receiving surfaces 610b and 610d, and from the difference, the inclination of the Moire fringes 35 can be recognized.

Further, the window comparator circuit 763 and the comparator circuit 764 are used for digital judgment. In the window comparator circuit 763, it is checked whether the output V(C) of the differential circuit 762 is within a reference voltage range from $V_{ref1}$ to $V_{ref2}$. If the output V(C) is within the reference range, the Moire fringes is judged to be substantially perpendicular to the main scanning direction, and it is judged that the image point is on the scanning surface. Therefore, a motor on signal is made inactive. If the output V(C) is out of the reference range, it is judged that the image point is not on the scanning surface, and the motor on signal is made active. The motor on signal is sent to a motor control circuit 766. The comparator circuit 764 compares the output V(C) of the differential circuit 762 with a reference voltage $V_{ref3}$ (in the middle between the reference voltages $V_{ref1}$ and $V_{ref2}$) to judge the direction of the slant of the Moire fringes 35. Then, the comparator circuit 764 generates a signal at a high level or a low level in accordance with the judgment and sends the signal to the motor control circuit 766 as a motor forward/reverse drive signal.

The motor control circuit 766 drives the stepping motor 518 in accordance with the motor on signal and the motor forward/reverse drive signal. Thereby, the cylindrical lens 513 is moved along the optical axis, and the image point is moved onto the scanning surface (photosensitive drum 530). The motor on signal is also sent to the printer body control section 524 as a signal q. A signal r which indicates whether the auto-focus cancel switch 526 (see FIG. 67) is on or off is sent from the printer body control section 524 and inputted to an AND element 765. Thereby, whether or not the auto-focus control is carried out is decided depending on the state of the auto-focus cancel switch 526.

As described, since the light receiving surfaces 610a through 610d of the photoelectric element 610 are triangular, the inclination of the Moire fringes 35 can be detected even if the Moire fringes shift in the main scanning direction due to a shift of the optical path of the laser beam. Consequently, the amount and the direction of a shift of the image point can be detected accurately.

The light receiving surfaces of the photoelectric element 610 can be of other shapes. For example, the photoelectric element 610 may have light receiving surfaces 615a, 615b, 615c and 615d which are trapezoids as shown in FIG. 84. The light receiving surfaces 615a and 615b make a pair, and the light receiving surfaces 615c and 615d make another pair. The light receiving surfaces 615a and 615b are symmetrical with respect to a line 616, and the light receiving surfaces 615c and 615d are symmetrical with respect to the line 616.

The photoelectric element 610 does not have to be a four-segmented photosensor. For example, the photoelectric element 610 can be a two-segmented photosensor which adopts a combination of the light receiving surfaces 610a and 610b or a combination of the light receiving surfaces 610c and 610d. Further, the photoelectric element 610 may be a three-segmented photosensor or a five-segmented photosensor.

Although in the seventh embodiment, the spatial grating A of the grating filter 610 is parallel to the main scanning direction, the spatial grating A may be parallel to the sub scanning direction.

Eighth Embodiment: FIGS. 85 and 86

In the first through seventh embodiments, the beam detector is located after the image point in a state of in-focus. In a laser beam scanning optical apparatus of the eighth embodiment, the beam detector is located before the image point in a state of in-focus. As shown in FIGS. 85 and 86, the beam detector is located out of an image forming area near a position optically equivalent to the scanning surface. The beam detector comprises grating filters 621 and 622, and a photoelectric element 625, and these members 621, 622 and 625 are arranged along the optical axis. The grating filter 621 has spatial grating A which is parallel to the main scanning direction b, and the grating filter 622 has spatial grating B which slants slightly with respect to the main scanning direction b. The image point in a state of in-focus Z1 is located after the beam detector.

The laser beam L which passed through the grating filters 621 and 622 forms Moire fringes on light receiving surfaces 625a and 625b of the photoelectric element 625. The Moire fringes can be expressed by the expression (1) described in the first embodiment. Accordingly, the inclination of the Moire fringes in a state of in-focus is expressed as follows by using the expression (4).

$$\frac{\cos\alpha - \frac{l_1 d_2}{l_2 d_1}}{\sin\alpha} \quad (14)$$

When the image point shifts from Z1 to Z2 by a distance Δl (see the laser beam L' indicated by dashed line in FIG. 86), the image point comes before the scanning surface (comes to a state of front focus), and the inclination of the Moire fringes becomes as follows.

$$\frac{\cos\alpha - \frac{(l_1 - \Delta l)d_2}{(l_2 - \Delta l)d_1}}{\sin\alpha} \quad (15)$$

When the image point shifts and comes after the scanning surface (comes to a state of back focus), the inclination of the Moire fringes can be expressed as follows. ( $$\frac{\cos\alpha - \frac{(l_1 + \Delta l)d_2}{(l_2 + \Delta l)d_1}}{\sin\alpha} \quad (16)$$

As is apparent from the expressions (14), (15) and (16), the inclination of the Moire fringes changes with a shift of the image point. More specifically, the Moire fringes slant to left in a state of front focus and slant to right in a state of back focus.

In the laser beam scanning optical apparatus, the beam detector does not have a reducing optical system. However, the laser beam L can be projected on the light receiving surfaces 625a and 625b while the laser beam L is a convergent light, and the Moire fringes of substantially the same size as the light receiving surfaces 625a and 625b can be formed. Therefore, a lot of bright regions and dark regions can be formed on the light receiving surfaces 625a and 625b, and a detection error can be prevented.

Further referring to specific values, this is described. The beam detector is supposed to have the following values: the pitch $d_1$ of the spatial grating A is 120 μm; the pitch $d_2$ of the spatial grating B is 60 μm; the angle α of the spatial grating B to the spatial grating A is 4°; the distance $l_1$ between the image point in a state of in-focus Z1 and the spatial grating A is 80 mm; the distance $l_2$ between the image point in a state of in-focus Z1 and the spatial grating B is 40 mm; and the distance $l_3$ between the image point in a state of in-focus Z1 and the photoelectric element 625 is 30 mm. In this case, the inclination of the Moire fringes 35 is calculated as follows by using the expression (5) described in the first embodiment.

[cos α−{($l_1 d_2$)/($l_2 d_1$)}]/sin α=−0.035

Accordingly, tan φ=−0.035, and φ=−2°. Therefore, the inclination of the Moire fringes 35 is −88°.

The pitch P of the Moire fringes 35 is calculated as follows by using the expression f=$l_3 d_1/l_1$ and the expression (6) described in the first embodiment.

P=(f/sin α)×cos (φ−α)=0.64 (mm)

If the photoelectric element 625 is a two-segmented photodiode with a width of 3 mm and a height of 1 mm, the Moire fringes 35 formed on the photoelectric element 625 will have about four bright regions and four dark regions.

Thus, a plurality of Moire fringes 35 can be formed on the light receiving surfaces 625a and 625b. As in the first embodiment, by detecting the phase difference ΔT between the output wave of the light receiving surface 625a and the output wave of the light receiving surface 625b, a change of the inclination of the Moire fringes 35 can be recognized.

In the eighth embodiment, since the laser beam L is projected on the photoelectric element 625 while the laser beam L is a convergent light, it is not necessary to provide a reducing optical system (for example, the cylindrical lenses 103 and 104 in the first embodiment) in the beam detector. Therefore, the beam detector can be downsized.

Figure 87:
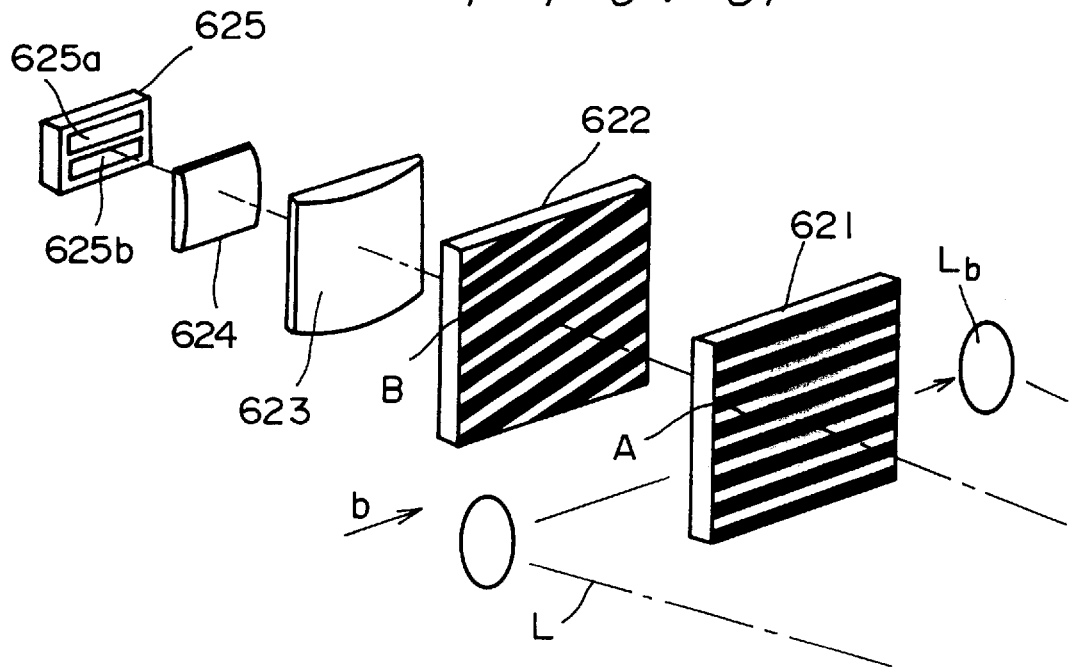
FIG. 87 is an exploded perspective view of a beam detector provided in a laser beam scanning optical apparatus which is a ninth embodiment of the present invention.
Figure 88:
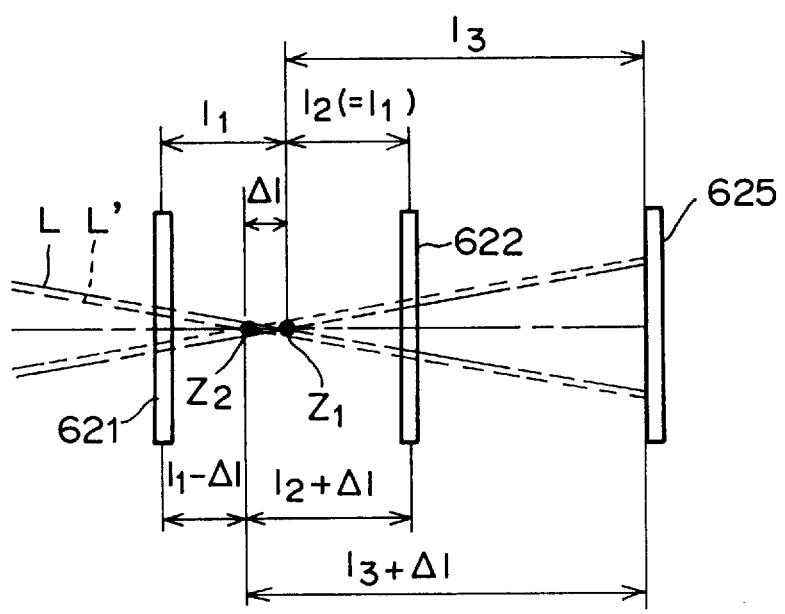
FIG. 88 is a side view which shows the positional relationship between the image point in a state of in-focus and the beam detector.

Ninth Embodiment: FIGS. 87 and 88

In order to improve the accuracy of the detection of a shift of the image point, the beam detector should be so structured that a change of the inclination of Moire fringes due to a shift of the image point is large. In the first through eighth embodiments, the image point in a state of in-focus is not located between the two grating filters. Therefore, when the image point shifts, the pitch of the spatial grating of the both filters projected on the photoelectric element is magnified (or reduced), and a change of the Moire fringes is small.

In order to solve this problem, in the ninth embodiment, the image point in a state of in-focus is located between two grating filters of the beam detector.

As shown in FIG. 87 and 88, the beam detector is located out of an image forming area near a position optically equivalent to the scanning surface. The beam detector comprises grating filters 621 and 622, cylindrical lenses 623 and 624, and a photoelectric element 625, and these members 621 through 655 are arranged along the optical axis. The image point in a state of in-focus Z1 is located between the grating filters 621 and 622.

The cylindrical lenses 623 and 624 form a reducing optical system. The cylindrical lens 623 has a power only in the main scanning direction b, and the cylindrical lens 624 has a power only in the sub scanning direction c. The laser beam which passed through the grating filters 621 and 622 are converged by the cylindrical lenses 723 and 624 and forms Moire fringes on light receiving surfaces 625a and 625b of the photoelectric element 625.

The Moire fringes can be expressed by the expression (1) described in the first embodiment. Accordingly, the inclination of the Moire fringes can be expressed as follows by using the expression (4).

$$\frac{\cos\alpha - \frac{l_1 d_2}{l_2 d_1}}{\sin\alpha} \quad (17)$$

When the image point shifts from Z1 to Z2 by a distance Δl as shown in FIG. 88 (see the laser beam L' indicated by dashed line), the image point comes before the scanning surface (comes to a state of front focus). From the expressions $f=l_3d_1/l_1$ and $g=l_3d_2/l_2$, in a state of front focus, $f=(l_3+\Delta l)d_1/(l_1-\Delta l)$ and $g=(l_3+\Delta l)d_2/(l_2+\Delta l)$ are obtained. In this case, the inclination of the Moire fringes can be expressed as follows.

$$\cos\alpha - \frac{(l_1 - \Delta l) d_2}{(l_2 + \Delta l) d_1} \over \sin\alpha \qquad (18)$$

In a state of back focus, the inclination of the Moire fringes can be expressed as follows.

$$\cos\alpha - \frac{(l_1 + \Delta l) d_2}{(l_2 - \Delta l) d_1} \over \sin\alpha \qquad (19)$$

As is apparent from the expressions (17), (18) and (19), the inclination of the Moire fringes changes with a shift of the image point.

Since the beam detector is so located in the laser beam scanning optical apparatus that the image point in a state of in-focus Z1 is located between the grating filters 621 and 622, the apparatus can be downsized. A change of the inclination of the Moire fringes due to a shift of the image point is large, and the accuracy of the detection of a shift of the image point is improved.

Further referring to specific values, this is described. The beam detector is supposed to have the following values: the pitch $d_1$ of the spatial grating A and the pitch $d_2$ of the spatial grating B are both 125 μm (although the pitches $d_1$ and $d_2$ do not have to be equal to each other, equalizing the pitches $d_1$ and $d_2$ is effective to the improvement of the accuracy of the detection); the angle α of the spatial grating B to the spatial grating A is 7°; the distance $l_1$ between the image point in a state of in-focus Z1 and the spatial grating A is 20 mm; the distance $l_2$ between the image point in a state of in-focus Z1 and the spatial grating B is 20 mm. By using the expression (16), the inclination of the Moire fringes in the initial state is. calculated as ϕ=−3.5°. If the image point shifts by 0.2 mm (Δl=0.2 mm), by using the expression (18), ϕ=5.8° is calculated. In this case, a change of the inclination of the Moire fringes is calculated as −3.5−5.8=−9.3°.

For comparison, a case in which the beam detector is located after the scanning surface as the first embodiment is studied. The beam detector is supposed to have the following values: the pitch $d_1$ of the spatial grating A is 125 μm; the pitch $d_2$ of the spatial grating B is 250 μm; the angle α of the spatial grating B to the spatial grating A is 7°; the distance $l_1$ between the image point in a state of in-focus Z1 and the spatial grating A is 40 mm; the distance $l_2$ between the image point in a state of in-focus Z1 and the spatial grating B is 80 mm. By using the expression (5), the inclination of the Moire fringes in the initial state is calculated as ϕ=−3.5°. If the image point shifts by 0.2 mm (Δl=0.2 mm), by using the expression (7), ϕ=−2.3° is calculated. In this case, a change of the inclination of the Moire fringes is calculated as −3.5−(−2.3)=−1.2°. This is very small compared with the case in which the image point in a state of in-focus Z1 is located between the grating filters 621 and 622.

Tenth Embodiment: FIGS. 89 through 97

In such a beam detector, when a holder of grating filters expands or shrinks due to a change of the environments (especially a change of the temperature), the distances between the image point in a state of in-focus and the respective grating filters change, thereby causing a detection error of the inclination of Moire fringes.

The tenth embodiment is a laser beam scanning optical apparatus in which the inclination of Moire fringes is hardly influenced by a change of the environments (especially temperature).

Figure 89:
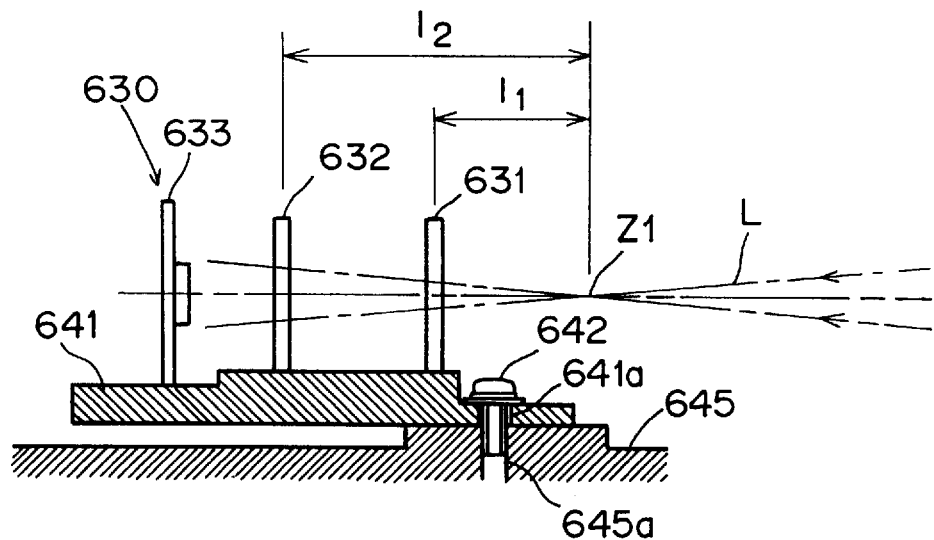
FIG. 89 is a sectional view which shows fitting of a beam detector provided in a laser beam scanning optical apparatus which is a tenth embodiment of the present invention.

A Case of Locating the Beam Detector after the Image Point in a State of In-focus As shown in FIG. 89, a beam detector 630 comprises grating filters 631 and 632, and a photoelectric element 633, and these members 631 through 633 are arranged along the optical axis. The beam detector 630 further has a holder 641 which holds the members 631 through 633. The beam detector 630 is located after the image point in a state of in-focus Z1. The holder 641 has a through hole 641a near a position holding the grating filter 631. A body frame 645 of the laser beam scanning optical apparatus has a tapped hole 645a near the image point in a state of in-focus Z1. By piercing a screw 642 through the through hole 641a and screwing down into the tapped hole 645a, the beam detector 630 is fitted to the body frame 645. In other words, the beam detector 630 is positioned with the part near the grating filter 631 fixed to the body frame 645.

The laser beam L which passed through the grating filters 631 and 632 forms Moire fringes on the photoelectric element 623. The Moire fringes can be expressed by the expression (1) described in the first embodiment. The beam detector 630 is supposed to have the following values: the pitch $d_1$ of the spatial grating A of the grating filter 631 is 125 μm; the pitch $d_2$ of the spatial grating B of the grating filter 632 is 250 μm; the angle α of the spatial grating B to the spatial grating A is 4°; the distance $l_1$ between the image point in a state of in-focus Z1 and the grating filter 631 is 40 mm; the distance $l_2$ between the image point in a state of in-focus Z1 and the grating filter 632 is 80 mm. In this case, the inclination of the Moire fringes in the initial state is calculated as follows by using the expression (5) described in the first embodiment.

$$\tan^{-1}\left(\frac{\cos 4° - \frac{40 \times 0.25}{80 \times 0.125}}{\sin 4°}\right) = -2°$$

If the holder 641 is made of aluminum with a coefficient of linear expansion of $2.3 \times 10^{-5}$, when the temperature rises 25° C., the inclination of the Moire fringes is calculated as follows.

$$\tan^{-1}\left[\frac{\cos 4° - \frac{40 \times 0.25}{\{80 + (80 - 40) \times 2.3 \times 10^{-5} \times 25\} \times 0.125}}{\sin 4°}\right] = 1.78°$$

For comparison, a case in which the through holes 641a of the holder 641 is made near a position holding the grating filter 632, that is, a case in which the beam detector 630 is positioned with the part near the grating filter 632 fixed to the body frame 645 is studied. In this case, when the temperature rises 25° C., the inclination of the Moire fringes is calculated as follows.

$$\tan^{-1}\left[\frac{\cos 4° - \frac{\{40 - (80 - 40) \times 2.3 \times 10^{-5} \times 25\} \times 0.25}{80 \times 0.125}}{\sin 4°}\right] = -1.55°$$

The change of the inclination of the Moire fringes in this case is large compared with the case in which the beam detector 630 is positioned with the part near the grating filter 631 fixed to the body frame 645. Also, a case in which the beam detector 630 is positioned with the part in the middle of the grating filters 631 and 632 fixed to the body frame 645 is studied. When the temperature rises 25° C., the inclination of the Moire fringes is calculated as follows.

$$\tan^{-1}\left[\frac{\cos 4° - \frac{\{40 - ((80-40)/2) \times 2.3 \times 10^{-5} \times 25\} \times 0.25}{\{80 + ((80-40)/2) \times 2.3 \times 10^{-5} \times 25\} \times 0.125}}{\sin 4°}\right] = -1.66°$$

The change of the inclination of the Moire fringes in this case is large compared with the case in which the beam detector 630 is positioned with the part near the grating filter 631 fixed to the body frame 645.

As described above, by positioning the beam detector 630 with the part near the grating filter 631 fixed to the body frame 645, a change of the inclination of the Moire fringes due to a change of the temperature can be minimized. Therefore, the accuracy of the detection of a shift of the image point can be improved.

Figure 90:
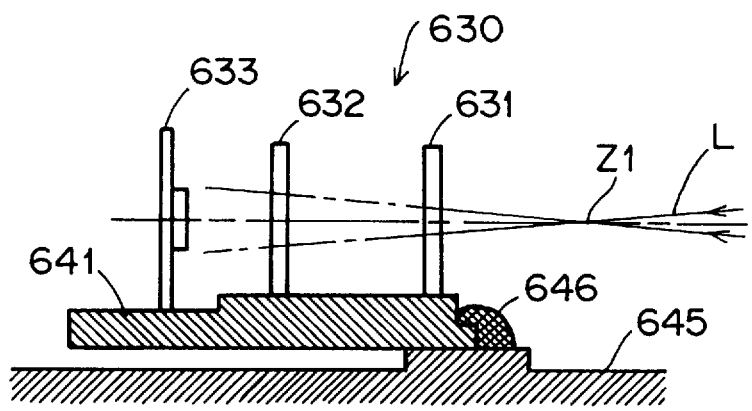
FIG. 90 is a sectional view which shows a modification of the fitting of the beam detector.

There are other ways of positioning the beam detector 630 with the part near the grating filter 631 fixed to the body frame 645. For example, as shown In FIG. 90, adhesive 646 is coated on the part of the holder 641 near the grating filter 631, and thereby, the part is fixed to the body frame 645.

Figure 91:
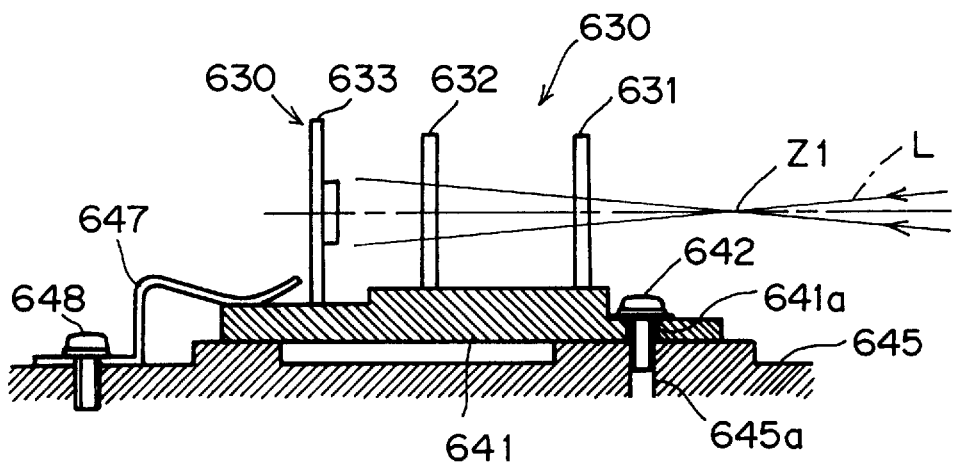
FIG. 91 is a sectional view which shows another modification of the fitting of the beam detector.

Also, a way of fitting as shown in FIG. 91 is possible. The holder 641 is fixed to the body frame 645 by the screw 642 at the position near the grating filter 631. Further, an end of the holder 641 is pressed by an elastic member 647 fitted to the body frame 645 by a screw 648. Thereby, an internal stress due to a thermal expansion or a thermal shrinkage is not caused in the holder 641, and the holder 641 is firmly fitted to the body frame 645.

Figure 92:
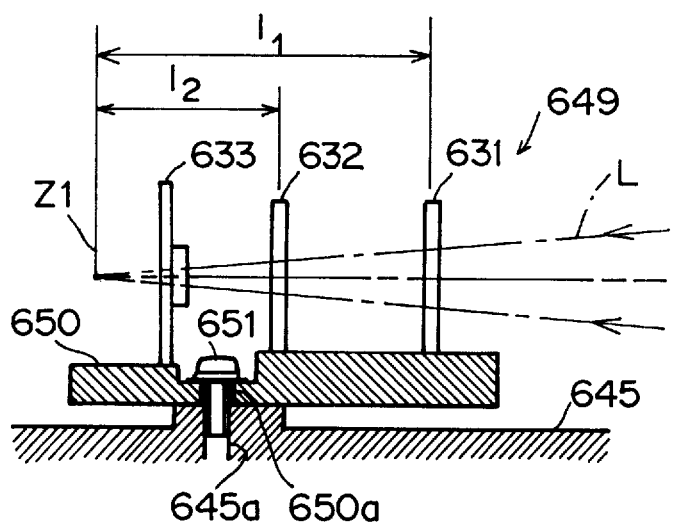
FIG. 92 is a sectional view which shows fitting of the beam detector when the positional relationship between the beam detector and the image point in a state of in-focus is different from that of FIG. 89.

A Case of Locating the Beam Detector before the Image Point in a State of In-focus As shown in FIG. 92, a beam detector 649 comprises grating filters 631 and 632, a photoelectric element 633, and these members 631 through 633 are arranged along the optical axis. The beam detector 649 further has a holder 650 which holds the members 631 through 633. The beam detector 649 is located before the image point in a state of in-focus Z1. The holder 650 has a through hole 650a near a position holding the grating filter 632. The body frame 645 of the laser beam scanning optical apparatus has a tapped hole 645a near the image point in a state of in-focus Z1. By piercing a screw 651 through the through hole 650a and screwing down into the tapped hole 645a, the beam detector 649 is fitted to the body frame 645. In other words, the beam detector 649 is positioned with the part near the grating filter 632 fixed to the body frame 645.

The laser beam L which passed through the grating filters 631 and 632 forms Moire fringes on the photoelectric element 633. The Moire fringes can be expressed by the expression (1) described in the first embodiment. The beam detector 649 is supposed to have the following values: the pitch $d_1$ of the spatial grating A of the grating filter 631 is 120 μm; the pitch $d_2$ of the spatial grating B of the grating filter 632 is 60 μm; the angle α of the spatial grating B to the spatial grating A is 4°; the distance $l_1$ between the image point in a state of in-focus Z1 and the grating filter 631 is 80 mm; the distance $l_2$ between the image point in a state of in-focus Z1 and the grating filter 632 is 40 mm. In this case, the inclination of the Moire fringes in the initial state is calculated as follows by using the expression (5) described in the first embodiment.

$$\tan^{-1}\left(\frac{\cos 4° - \frac{80 \times 0.06}{40 \times 0.120}}{\sin 4°}\right) = -2°$$

If the holder 650 is made of aluminum with a coefficient of linear expansion of $2.3 \times 10^{-5}$, when the temperature rises 25° C., the inclination of the Moire fringes is calculated as follows.

$$\tan^{-1}\left[\frac{\cos 4° - \frac{\{80 + (80-40) \times 2.3 \times 10^{-5} \times 25\} \times 0.06}{40 \times 0.120}}{\sin 4°}\right] = -2.23°$$

For comparison, a case in which the through holes 650a of the holder 650 is made near a position holding the grating filter 631, that is, a case in which the beam detector 649 is positioned with the part near the grating filter 631 fixed to the body frame 645 is studied. In this case, when the temperature rises 25° C., the inclination of the Moire fringes is calculated as follows.

$$\tan^{-1}\left[\frac{\cos 4° - \frac{80 \times 0.06}{\{40 - (80-40) \times 2.3 \times 10^{-5} \times 25\} \times 0.120}}{\sin 4°}\right] = -2.46°$$

The change of the inclination of the Moire fringes in this case is large compared with the case in which the beam detector 649 is positioned with the part near the grating filter 632 fixed to the body frame 645. Also, a case in which the beam detector 649 is positioned with the part in the middle of the grating filters 631 and 632 fixed to the body frame 645 is studied. When the temperature rises 25° C., the inclination of the Moire fringes is calculated as follows.

$$\tan^{-1}\left[\frac{\cos 4° - \frac{\{60 + ((80-40)/2) \times 2.3 \times 10^{-5} \times 25\} \times 0.06}{\{40 - ((80-40)/2) \times 2.3 \times 10^{-5} \times 25\} \times 0.120}}{\sin 4°}\right] = -2.35°$$

The change of the inclination of the Moire fringes in this case is large compared with the case in which the beam detector 649 is positioned with the part near the grating filter 632 fixed to the body frame 645.

As described above, by positioning the beam detector 649 with the part near the grating filter 632 fixed to the body frame 645, a change of the inclination of the Moire fringes due to a change of the temperature can be minimized. Therefore, the accuracy of the detection of a shift of the image point can be improved.

Figure 93:
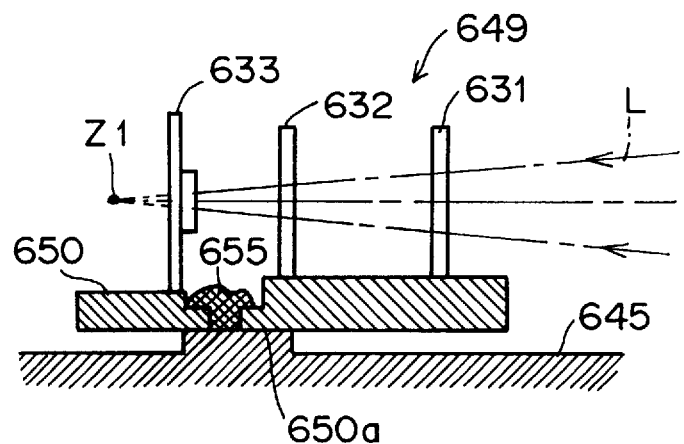
FIG. 93 is a sectional view which shows a modification of the fitting of the beam detector shown by FIG. 92.

There are other ways of positioning the beam detector 649 with the part near the grating filter 632 fixed to the body frame 645. For example, as shown in FIG. 93, adhesive 655 is coated on the part of the holder 650 near the grating filter 632 and filled in the through hole 650a, and thereby, the part is fixed to the body frame 645.

Figure 94:
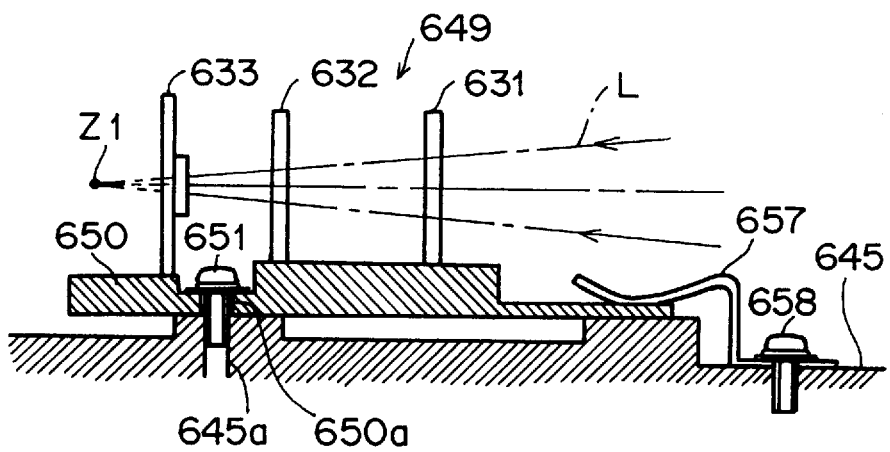
FIG. 94 is a sectional view which shows another modification of the fitting of the beam detector shown by FIG. 92.

Also, a way of fitting as shown in FIG. 94 is possible. The holder 650 is fixed to the body frame 645 by the screw 651 at the position near the grating filter 632. Further, an end of the holder 650 is pressed by an elastic member 657 fitted to the body frame 645 by a screw 658. Thereby, an internal stress due to a thermal expansion or a thermal shrinkage is not caused in the holder 650, and the holder 650 is firmly fitted to the body frame 645.

A Case of Locating the Image Point in a State of In-focus between the Grating Filters 631 and 632

Figure 95:
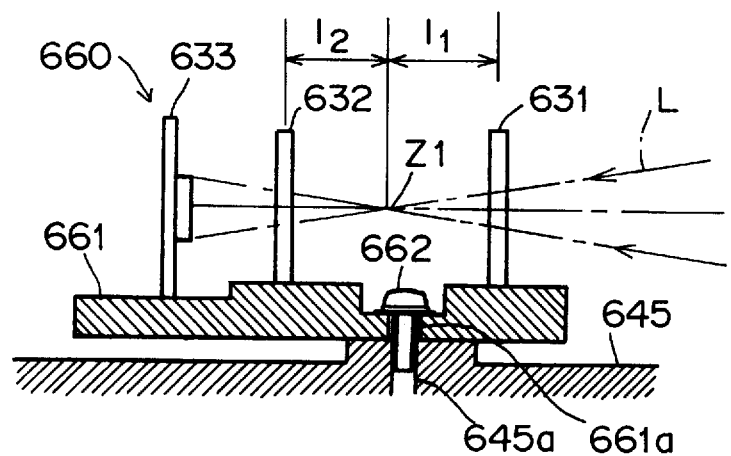
FIG. 95 is a sectional view which shows fitting of the beam detector when the positional relationship between the beam detector and the image point in a state of in-focus is different from that of FIG. 89.

As shown in FIG. 95, a beam detector 660 comprises grating filters 631 and 632, and a photoelectric element 633, and these members 631 through 633 are arranged along the optical axis. The beam detector 660 further has a holder 661 which holds the members 631 through 633. The beam detector 660 is so located that the image point in a state of in-focus Z1 is positioned between the grating filters 631 and 632. The holder 661 has a through hole 661a between the grating filters 631 and 632. The body frame 645 of the laser beam scanning optical apparatus has a tapped hole 645a near the image point in a state of in-focus Z1. By piercing a screw 662 through the through hole 661a and screwing down into the tapped hole 645a, the beam detector 660 is fitted to the body frame 645. In other words, the beam detector 660 is positioned with the part between the grating filters 631 and 632 fixed to the body frame 645.

The laser beam L which passed through the grating filters 631 and 632 forms Moire fringes on the photoelectric element 633. The Moire fringes can be expressed by the expression (1) described in the first embodiment. The beam detector 660 is supposed to have the following values: the pitch $d_1$ of the spatial grating A of the grating filter 631 is 125 μm; the pitch $d_2$ of the spatial grating B of the grating filter 632 is 125 μm; the angle α of the spatial grating B to the spatial grating A is 4°; the distance $l_1$ between the image point in a state of in-focus Z1 and the grating filter 631 is 40 mm; the distance $l_2$ between the image point in a state of in-focus Z1 and the grating filter 632 is 40 mm. In this case, the inclination of the Moire fringes in the initial state is calculated as follows by using the expression (5) described in the first embodiment.

$$\tan^{-1}\left(\frac{\cos 4° - \frac{40 \times 0.125}{40 \times 0.125}}{\sin 4°}\right) = -2°$$

If the holder 661 is made of aluminum with a coefficient of linear expansion of $2.3 \times 10^{-5}$, when the temperature rises 25° C., the inclination of the Moire fringes is calculated as follows.

$$\tan^{-1}\left[\frac{\cos 4° - \frac{\{40 + 40 \times 2.3 \times 10^{-5} \times 25\} \times 0.125}{\{40 + 40 \times 2.3 \times 10^{-5} \times 25\} \times 0.125}}{\sin 4°}\right] = -2°$$

This value is equal to the value in the initial state.

For comparison, a case in which the through holes 661a of the holder 661 is made near a position holding the grating filter 631, that is, a case in which the beam detector 660 is positioned with the part near the grating filter 631 fixed to the body frame 645 is studied. In this case, when the temperature rises 25° C., the inclination of the Moire fringes is calculated as follows.

$$\tan^{-1}\left[\frac{\cos 4° - \frac{\{40 + (40 + 40) \times 2.3 \times 10^{-5} \times 25\} \times 0.125}{40 \times 0.125}}{\sin 4°}\right] = -2.9°$$

This value is different from the value in the initial state. Also, a case in which the beam detector 660 is positioned with the part near the grating filters 632 fixed to the body frame 645 is studied. When the temperature rises 25° C., the inclination of the Moire fringes is calculated as follows.

$$\tan^{-1}\left[\frac{\cos 4° - \frac{40 \times 0.125}{\{40 + (40 + 40) \times 2.3 \times 10^{-5} \times 25\} \times 0.125}}{\sin 4°}\right] = -1.1°$$

This value is different from the value in the initial state.

As described above, by positioning the beam detector 660 with the part between the grating filters 631 and 632 fixed to the body frame 645, a change of the inclination of the Moire fringes due to a change of the temperature can be minimized. Therefore, the accuracy of the detection of a shift of the image point can be improved. Especially when the beam detector 660 is positioned with the middle between the grating filters 631 and 632 fixed to the body frame 645, a change of the distance $l_1$ and a change of the distance $l_2$ due to a change of the temperature are counterbalanced, and the inclination of the Moire fringes is not influenced by the change of the temperature.

Figure 96:
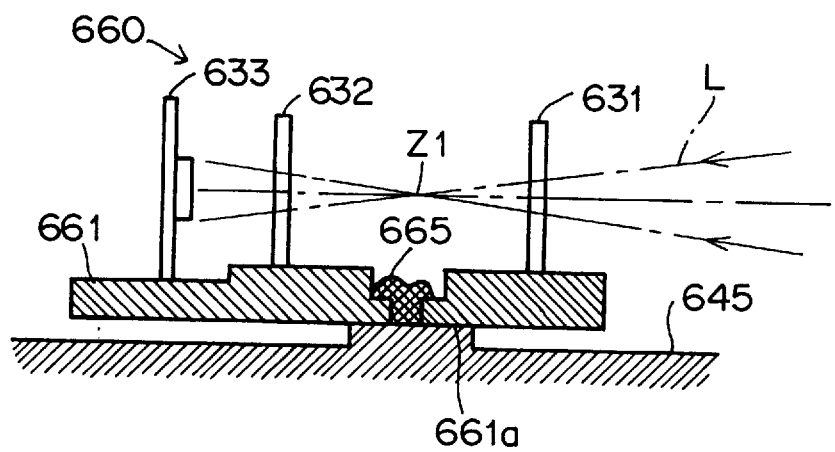
FIG. 96 is a sectional view which shows a modification of the fitting of the beam detector shown by FIG. 95.

There are other ways of positioning the beam detector 660 with the part between the grating filters 631 and 632 fixed to the body frame 645. For example, as shown in FIG. 96, adhesive 665 is filled in the through hole 661a between the grating filters 631 and 632, and thereby, the part is fixed to the body frame 645.

Also, a way of fitting as shown in FIG. 97 is possible. The holder 661 is fixed to the body frame 645 by the screw 662 at the position between the grating filters 631 and 632. Further, an end of the holder 661 is pressed by an elastic member 667 fitted to the body frame 645 by a screw 668. Thereby, an internal stress due to a thermal expansion or a thermal shrinkage is not caused in the holder 661, and the holder 661 is firmly fitted to the body frame 645.

Eleventh Embodiment: FIGS. 98 through 101

As described in the first embodiment, the inclination of the Moire fringes changes with a pitch error of the spatial grating A and the spatial grating B of the grating filters, and thereby causing a detection error. In order to avoid the problem, in the first embodiment, the pitch error $\Delta d_2$ of the spatial grating B is limited. Since the beam detector should be located out of an image forming area, the space for the beam detector is limited. However, in the beam detector, two grating filters have to be provided with a specified space in-between, and there is a limit to downsizing of the beam detector.

In the eleventh embodiment, in order to solve the problems, the beam detector has only one grating filter. Since a laser beam scanning optical apparatus is of the same structure as the first embodiment except the beam detector, the description of the structure is omitted.

As shown in FIG. 98, a beam detector 700 is located out of an image forming area near a position optically equivalent to the scanning surface. The beam detector 700 comprises a half mirror 701, a grating filter 702, a mirror 703 and a photoelectric element 704, and these members 701 through 704 are arranged along the optical axis. The grating filter 702 has spatial grating A which is parallel to the main scanning direction b of the laser beam L. The photoelectric element 704 is a two-segmented sensor which has two light receiving surfaces 704a and 704b. Each of the light receiving surfaces 704a and 704b generates a current in proportional to the quantity of light received.

The mirror 703 is slants slightly with respect to the main scanning direction b.

Next, referring to FIG. 99, the action and the effect of the beam detector 700 is described.

The laser beam L is incident to the half mirror 701, and a half of the quantity of light passes through the half mirror 701 and is incident to the grating filter 702. The other half of the quantity of light is reflected by the half mirror 701 and for example, is incident to the SOS photosensor 17 to make the SOS photosensor 17 generate a vertical synchronization signal for timing a start of printing of each line. The laser beam L incident to the grating filter 702 is partly shut out by the spatial grating A and is incident to the mirror 703 as a stripe pattern 710 which is parallel to the main scanning direction b as shown by FIG. 100.

The mirror 703 rotates the laser beam L on the optical axis by a slight angle and reflects the laser beam L as a stripe pattern 711 which slants slightly with respect to the main scanning direction as shown in FIG. 101. The reflected laser beam L passes through the grating filter 702 again, thereby causing Moire fringes. Then, a half of the laser beam L is reflected by the half mirror 701 and forms Moire fringes on the light receiving surfaces 704a and 704b of the photoelectric element 704.

The Moire fringes is expressed by the expression (1) described in the first embodiment. However, the symbols in the expression (1) are as follows: $\alpha$ is the angle of the stripe pattern 711 to the stripe pattern 710; $l_1$ is the distance between the grating filter 702 which is located upstream in the optical path and the image point in a state of in-focus Z1 which is located downstream in the optical path; $l_2$ is the distance between the image point in a state of in-focus Z1 which is located upstream in the optical path and the grating filter 702 which is located downstream in the optical path; and 13 is the distance between the image point in a state of in-focus Z1 which is located upstream in the optical path and the photoelectric element 704 which is located downstream in the optical path. The inclination of the Moire fringes in a state of in-focus is expressed as follows by using the expression (4).

$$\tan^{-1}\left(\frac{\cos\alpha - \frac{l_1 d_2}{l_2 d_1}}{\sin\alpha}\right) \quad (20)$$

Since $d_1=d_2$, a change of the inclination of the Moire fringes depends on a change of the distance between the image point and the spatial grating A.

From the expressions $f=l_3 d_1/l_1$ and $g=l_3 d_2/l_2$, when the image point shifts from Z1 to Z2 by $\Delta l$ (see the laser beam L' indicated by dashed line in FIG. 99), that is, in a state of front focus, $f=(l_3+\Delta l)d_1/(l_1-\Delta l)$ and $g=(l_3+\Delta l)d_2/(l_2+\Delta l)$. Accordingly, the inclination of the Moire fringes in this case is calculated as follows.

$$\tan^{-1}\left(\frac{\cos\alpha - \frac{l_1 - \Delta l}{l_2 + \Delta l}}{\sin\alpha}\right) \quad (21)$$

The inclination of the Moire fringes in a state of back focus is calculated as follows.

$$\tan^{-1}\left(\frac{\cos\alpha - \frac{l_1 + \Delta l}{l_2 - \Delta l}}{\sin\alpha}\right) \quad (22)$$

As is apparent from the expressions (20), (21) and (22), the inclination of the Moire fringes changes with a shift of the image point.

As described above, the beam detector 700 can form Moire fringes by use of only one grating filter 702. Consequently, the beam detector 700 can solve the problem that the inclination of the Moire fringes changes with a pitch error of the spatial grating of two grating filters. Moreover, because only one grating filter is provided, downsizing is possible.

Twelfth Embodiment: FIGS. 102 and 103

There is a limit to downsize a beam detector which has two grating filters because the two grating filters have to be located with a space in-between. On the other hand, in a laser beam scanning optical apparatus, the beam detector should be located out of an image forming area near a position optically equivalent to the scanning surface, and downsizing of the beam detector is requested.

In the twelfth embodiment, the beam detector does not have any grating filters. Since a laser beam scanning optical apparatus of the twelfth embodiment is of the same structure as the first embodiment, the description of the structure is omitted.

As shown in FIG. 102, a beam detector 720 is located out of an image forming area near a position optically equivalent to the scanning surface. The beam detector 720 comprises reflective mirrors 721 and 722, and a photoelectric element 723, and these members 721 through 723 are arranged along the optical axis. The reflective mirror 721 has spatial grating A in a left side of a reflective surface, and the spatial grating A is parallel to the main scanning direction of the laser beam L. Likewise, the reflective mirror 722 has spatial grating B in a left side of a reflective surface, and the spatial grating B slants slightly with respect to the main scanning direction b. The photoelectric element 723 is a two-segmented sensor which has two light receiving surfaces. Each of the light receiving surfaces generates a current in proportional to the quantity of light received.

Next, the action and the effect of the beam detector 720 is described.

Part of the laser beam L incident to the spatial grating A of the reflective mirror 721 is partly shut out by the spatial grating A and is reflected as a stripe pattern which is parallel to the main scanning direction b. Then, the laser beam L is incident to the spatial grating B of the reflective mirror 722. The spatial grating B shuts out part of the laser beam L, thereby causing Moire fringes. The laser beam L reflected by the reflective mirror 722 forms Moire fringes on the photoelectric element 723. The Moire fringes can be expressed by the expression (1) described in the first embodiment, and the inclination of the Moire fringes changes with a shift of the image point.

Meanwhile, part of the laser beam L incident to the part of the reflective mirror 721 without the spatial grating A is incident to the SOS photosensor 17 via the part of the reflective mirror 722 without the spatial grating B, and thereby, the SOS photosensor 17 generates a vertical synchronization signal for timing a start of printing of each line.

Thus, the beam detector 720 does not have grating filters. The reflective mirrors 721 and 722 for directing the laser beam L to the SOS photosensor 17 has spatial grating A and spatial grating B respectively to be also used as grating filters. Therefore, the arrangement of the optical elements becomes easy, and the number of optical elements can be reduced.

There are other beam detectors which do not use grating filters. For example, as shown in FIG. 103, a beam detector 740 comprises a reflective mirror 741, a window 742 and a photoelectric element 743, and these members 741 through 743 are arranged along the optical axis. The reflective mirror 741 has spatial grating A in a left side of a reflective surface, and the spatial grating A is parallel to the main scanning direction b of the laser beam L. Likewise, the window 742 has spatial grating B on a left side of a surface, and the spatial grating B slants slightly with respect to the main scanning direction b. The window 742 is a transparent glass plate, a transparent film or the like. The photoelectric element 743 is a two-segmented sensor which has two light receiving surfaces 743a and 743b. Each of the light receiving surfaces 743a and 743b generates a current in proportional to the quantity of light received.

The laser beam L incident to the spatial grating A of the reflective mirror 741 is reflected by the mirror 741 and passes through the spatial grating B of the window 742. Then, the laser beam L forms Moire fringes on the light receiving surfaces 743a and 743b of the photoelectric element 743. Meanwhile, part of the laser beam L incident to the part of the reflective mirror 741 without the spatial grating A is incident to the SOS photosensor 17 via the part of the window 742 without the spatial grating B, and thereby, the SOS photosensor 17 generates a vertical synchronization signal for timing a start of printing of each line. It is possible to structure the beam detector such that the laser beam L is first incident to the window 742 and then to the reflective mirror 741.

Other Embodiments

The kind and the arrangement of the optical elements such as the fθ lens are arbitrary. The one of the two grating filters which is located closer to the light source is not necessarily have spatial grating which is parallel to the main scanning direction or the sub scanning direction. The one which is located closer to the photosensitive drum may have spatial grating which is parallel to the main scanning direction or the sub scanning direction. In this case, however, the quantity of light received by the photoelectric element is little smaller.

EXPERIMENTAL EXAMPLE

FIG. 104 shows a laser beam scanning optical apparatus produced by the inventors. The same parts and members as the first embodiment are provided with the same reference symbols. A motor 93 is a linear step actuator of which motor shaft moves linearly when it is driven. A lens holder 92 which holds the focusing lens 3 is connected to the motor shaft and is moved by the motor shaft directly. Thereby, the focusing lens 3 is moved along the optical axis, and in this way, focusing is carried out. Numeral 91 denotes a housing.

An experiment was conducted under the following conditions: the photoelectric element was a two-segmented sensor; the angle α of the spatial grating B to the spatial grating A was 4°; the pitch $d_1$ of the spatial grating A was 125 μm; the pitch $d_2$ of the spatial grating B was 250 μm; the distance $l_1$ between the image point in a state of in-focus and the spatial grating A was approximately 40 mm; the distance $l_2$ between the image point in a state of in-focus and the spatial grating B was approximately 80 mm; the amount of movement of the focusing lens 3 driven by a one-pulse drive of the motor was 25 μm; the amount of a shift of the image point with a change of the temperature by 25° C. was approximately 1.5 mm; and the ratio of the amount of movement of the focusing lens 3 to the amount of movement of the image point was 2 to 1. As a result, detection of a shift of the image point was accurate, and the focusing was carried out very speedily.

When the temperature changes 5° C. between printing of pages, as shown in FIG. 105, the motor 93 was driven by 20 pulses until focusing was completed. The addition of the time of the motor drive and the time of sensing and signal processing was about 70 msec. Generally, in digital copying machines and printers with a printing speed of 30 pages per minute, the non-printing time between pages is about 500 msec. Therefore, this apparatus can be adopted in a machine which has even a higher speed.

Although the present invention has been described in connection with the preferred embodiments above, various changes and modifications are possible to those who are skilled in the art. Such changes and modifications are to be understood as being within the scope of the present invention.

What is claimed is:

1. A laser beam scanning optical apparatus in which a laser beam emitted from a laser source is scanned on a scanning surface linearly at a substantially constant speed by a scanner and an optical element, said laser beam scanning optical apparatus comprising:

focusing means for correcting a position of an image point of the laser beam;

Moire fringes generating means which is located near a position optically equivalent to the scanning surface and modulates the laser beam to generate Moire fringes;

a light receiving element which receives the Moire fringes generated by the Moire fringes generating means; and control means for driving the focusing means in accordance with an output of the light receiving element to correct the position of the image point.

2. A laser beam scanning optical apparatus as claimed in claim 1, wherein the Moire fringes generating means comprises:

a first filter which is located in an upstream side of an optical path of the laser beam, the first filter having spatial grating; and a second filter which is located in a downstream side of the optical path of the laser beam, the second filter having spatial grating which slants slightly with respect to the spatial grating of the first filter.

3. A laser beam scanning optical apparatus as claimed in claim 2, wherein a correct position of the image point of the laser beam is farther from the laser source than the second filter.

4. A laser beam scanning optical apparatus as claimed in claim 2, wherein a correct position of the image point of the laser beam is closer to the laser source than the first filter.

5. A laser beam scanning optical apparatus as claimed in claim 2, wherein a correct position of the image point of the laser beam is between the first filter and the second filter.

6. A laser beam scanning optical apparatus as claimed in claim 2, further comprising:

a frame which supports at least one of the laser source, the scanner and the optical element; and a holder which holds the first filter, the second filter and the light receiving element, the holder being fixed to a part of the frame near a correct position of the image point of the laser beam.

7. A laser beam scanning optical apparatus as claimed in claim 1, wherein the Moire fringes generating means comprises:

a first filter which is located in an upstream side of an optical path of the laser beam, the first filter having spatial grating; and a second filter which is located in a downstream side of the optical path of the laser beam, the second filter having spatial grating which slants slightly with respect to the spatial grating of the first filter;

wherein, either the spatial grating of the first filter or the spatial grating of the second filter is parallel to a main scanning direction of the laser beam.

8. A laser beam scanning optical apparatus as claimed in claim 1, further comprising second control means which controls the laser source to carry out fixed point emission to irradiate a fixed point of the first filter;

wherein the Moire fringes generating means comprises:
a first filter which is located in an upstream side of an optical path of the laser beam, the first filter having spatial grating; and
a second filter which is located in a downstream side of the optical path of the laser beam, the second filter having spatial grating which slants slightly with respect to the spatial grating of the first filter;
wherein either the spatial grating of the first filter or the spatial grating of the second filter is parallel to a sub scanning direction of the laser beam.

9. A laser beam scanning optical apparatus as claimed in claim 1, wherein the Moire fringes generating means comprises:
a first grating member which has spatial grating; and
a second grating member which has spatial grating which slants slightly with respect to the spatial grating of the first grating member;
wherein at least one of the first grating member and the second grating member is a mirror with spatial grating on a surface.

10. A laser beam scanning optical apparatus as claimed in claim 1, wherein the Moire fringes generating means comprises:
a filter which is located in an upstream side of an optical path of the laser beam, the filter having spatial grating; and
a mirror which is located in a downstream side of the optical path of the laser beam, the mirror slants slightly with respect to a main scanning direction of the laser beam.

11. A laser beam scanning optical apparatus as claimed in claim 1, wherein the focusing means is a lens which is located in an optical path of the laser beam to be movable along an optical axis.

12. A laser beam scanning optical apparatus in which a laser beam emitted from a laser source is scanned on a scanning surface linearly at a substantially constant speed by a scanner and an optical element, said laser beam scanning optical apparatus comprising:

focusing means for correcting a position of an image point of the laser beam;

Moire fringes generating means which is located near a position optically equivalent to the scanning surface and modulates the laser beam to generate Moire fringes, the Moire fringes generating means comprising:
a first filter which is located in an upstream side of an optical path of the laser beam, the first filter having spatial grating; and
a second filter which is located in a downstream side of the optical path of the laser beam, the second filter having spatial grating which slants slightly with respect to the spatial grating of the first filter;
a light receiving element which receives the Moire fringes generated by the Moire fringes generating means;

operating means for operating an amount of a drive of the focusing means from an output of the light receiving element; and control means for driving the focusing means in accordance with an output of the operating means to correct the position of the image point.

13. A laser beam scanning optical apparatus as claimed in claim 12, further comprising a reducing optical system for projecting reduced Moire fringes on the light receiving element.

14. A laser beam scanning optical apparatus as claimed in claim 13, wherein the reducing optical system comprises two cylindrical lenses.

15. A laser beam scanning optical apparatus, as claimed in claim 13, wherein the reducing optical system comprises a positive lens.

16. A laser beam scanning optical apparatus as claimed in claim 12, wherein the light receiving element has a plurality of light receiving surfaces.

17. A laser beam scanning optical apparatus as claimed in claim 16, wherein the light receiving element comprises a plurality of line sensors which extend parallel to a main scanning direction.

18. A laser beam scanning optical apparatus as claimed in a claim 16, wherein the light receiving surfaces of the light receiving element are triangles.

19. A laser beam scanning optical apparatus as claimed in a claim 16, wherein the light receiving surfaces of the light receiving element are trapezoids.

20. A laser beam scanning optical apparatus as claimed in a claim 16, wherein the light receiving element is a segmented photodiode.

21. A laser beam scanning optical apparatus as claimed in a claim 16, wherein the light receiving element is an area charge coupled device.

22. A laser beam scanning optical apparatus as claimed in a claim 12, wherein:
the light receiving element has a first light receiving surface and a second light receiving surface which extend in a main scanning direction and are arranged side by side in a sub scanning direction; and
the operating means comprises detecting means for detecting an inclination of the Moire fringes by calculating a phase difference between an output of the first light receiving surface and an output of the second light receiving surface.

23. A laser beam scanning optical apparatus as claimed in claim 12, wherein:
the light receiving element has a first light receiving surface and a second light receiving surface which extend in a main scanning direction and are arranged side by side in a sub scanning direction; and
the operating means comprises:
first amplifying means for amplifying an output of the first light receiving surface;
second amplifying means for amplifying an output of the second light receiving surface;
first delay amplifying means for delaying and amplifying the output of the first light receiving surface;
second delay amplifying means for delaying and amplifying the output of the second light receiving surface;
first comparing means for detecting a phase of the Moire fringes formed on the first light receiving surface by comparing an output of the first amplifying means with an output of the first delay amplifying means;

second comparing means for detecting a phase of the Moire fringes formed on the second light receiving surface by comparing an output of the second amplifying means with an output of the second delay amplifying means; and inclination calculating means for calculating an inclination of the Moire fringes from a phase difference detected by comparing an output of the first comparing means and an output of the second comparing means.

24. A laser beam scanning optical apparatus as claimed in claim 12, wherein the operating means comprises Moire fringe selecting means which selects one from a plurality of Moire fringes formed on the light receiving element as a sample for detection of inclination of the Moire fringes.

25. A laser beam scanning optical apparatus as claimed in claim 24, wherein the Moire fringe selecting means comprises:

signal generating means which generates a signal when the Moire fringes formed on the light receiving element has a quantity of light over a reference value;

a timer which starts counting a specified time when the timer receives the signal generated by the signal generating means; and designating means which designates one from the plurality of Moire fringes formed on the light receiving element as a sample for detection of inclination of the Moire fringes when the timer counts up.

26. A laser beam scanning optical apparatus as claimed in claim 24, wherein the Moire fringe selecting means comprises:

signal generating means which generates a signal when the laser beam is incident to the signal generating means;

a timer which starts counting a specified time when the timer receives the signal generated by the signal generating means; and designating means which designates one from the plurality of Moire fringes formed on the light receiving element as a sample for detection of inclination of the Moire fringes when the timer counts up.

27. A laser beam scanning optical apparatus as claimed in claim 12, wherein the operating means comprises adjusting means which moves crests of an output wave of the light receiving element corresponding to the Moire fringes.

28. A laser beam scanning optical apparatus as claimed in claim 27, wherein the adjusting means is a delay circuit.

29. A laser beam scanning optical apparatus as claimed in claim 12, wherein an interval between the Moire fringes formed by the laser beam after passing through the first filter and the second filter is larger than a diameter of the laser beam spot on the first filter.

30. A laser beam scanning optical apparatus as claimed in claim 29, meeting a condition expressed by the following expression:

$$D_L < (f/\cos \sin \alpha) \cos (\phi - \alpha)$$

$D_L$: diameter of a laser beam spot on the first filter in a direction parallel to the spatial grating of the first filter f: pitch of the spatial grating of the first filter projected on the light receiving element $\phi$: angle of the Moire fringes to a sub scanning direction of the laser beam $\alpha$: angle of the Moire fringes to a direction perpendicular to the spatial grating of the first filter.

31. A laser beam scanning optical apparatus as claimed in claim 12, wherein:

the light receiving element has a plurality of light receiving surfaces; and the operating means comprises:

amplifying means which amplifies an output of each light receiving surface; and amplification factor setting means which decides and sets an amplification factor of the amplifying means in accordance with a difference between peak values of output waves of the light receiving surfaces.

32. A laser beam scanning optical apparatus as claimed in claim 12, meeting a condition expressed by the following expression:

$$d_2\{(l_2-\Delta l_2)/(l_1-\Delta l_1)\}d_1 < \Delta d_2 < d_2 - (l_2/l_1)d_1$$

$l_1$: designed distance between a correct position of the image point and the first filter $l_2$: designed distance between the correct position of the image point and the second filter $\Delta l_1$: amount of an error of the distance between the correct position of the image point and the first filter $\Delta l_2$: amount of an error of the distance between the correct position of the image point and the second filter $d_1$: pitch of the spatial grating of the first filter $d_2$: pitch of the spatial grating of the second filter $\Delta d_2$: error of the pitch of the spatial grating of the second filter.

33. A laser beam scanning optical apparatus as claimed in claim 12, wherein the light receiving element is movable in a direction of rotation of the Moire fringes.

34. A laser beam scanning optical apparatus as claimed in claim 12, wherein:

the light receiving element has not less than three light receiving surfaces; and the operating means comprises:

output wave selecting means which compares output waves of the light receiving surfaces of the light receiving element with each other and selects at least two output waves which have large peak values; and inclination calculating means which calculates an inclination of the Moire fringes from the output waves selected by the output wave selecting means.

35. A laser beam scanning optical apparatus as claimed in claim 12, wherein the operating means comprises:

period detecting means for detecting a period of the Moire fringes; and inclination calculating means which calculates an inclination of the Moire fringes from the period of the Moire fringes.

36. A laser beam scanning optical apparatus as claimed in claim 12, further comprising:

position detecting means for detecting a position of the laser beam in a sub scanning direction; and moving means for moving the light receiving element along the sub scanning direction in accordance with the position of the laser beam detected by the position detecting means.

* * * * *